(12) United States Patent
Glazer et al.

(10) Patent No.: US 11,614,955 B2
(45) Date of Patent: *Mar. 28, 2023

(54) SYSTEM AND METHOD FOR DEVELOPING AN APPLICATION

(71) Applicant: Taplytics Inc., Toronto (CA)

(72) Inventors: Aaron Glazer, Toronto (CA); Jonathan Norris, Toronto (CA); Jacob Druxerman, Toronto (CA); Andrew Norris, Toronto (CA)

(73) Assignee: Taplytics Inc., Toronto (CA)

( * ) Notice: Subject to any disclaimer, the term of this patent is extended or adjusted under 35 U.S.C. 154(b) by 330 days.

This patent is subject to a terminal disclaimer.

(21) Appl. No.: 17/005,371

(22) Filed: Aug. 28, 2020

(65) Prior Publication Data

US 2021/0081226 A1 Mar. 18, 2021

Related U.S. Application Data

(63) Continuation of application No. 16/198,961, filed on Nov. 23, 2018, now Pat. No. 10,802,845, which is a
(Continued)

(51) Int. Cl.
*G06F 9/451* (2018.01)
*G06F 3/0484* (2022.01)
*G06F 3/04812* (2022.01)

(52) U.S. Cl.
CPC ............ *G06F 9/452* (2018.02); *G06F 3/0484* (2013.01); *G06F 3/04812* (2013.01)

(58) Field of Classification Search
None
See application file for complete search history.

(56) References Cited

U.S. PATENT DOCUMENTS

| 4,882,681 A | 11/1989 | Brotz |
| 5,268,839 A | 12/1993 | Kaji |

(Continued)

FOREIGN PATENT DOCUMENTS

| EP | 485934 A1 | 5/1992 |
| EP | 801342 A2 | 10/1997 |

(Continued)

*Primary Examiner* — Isaac Tuku Tecklu
(74) *Attorney, Agent, or Firm* — Bereskin & Parr LLP/S.E.N.C.R.L., s.r.l.

(57) ABSTRACT

In some aspects, the present embodiments provide a system, server, and computing device for building and modifying a user interface of an application executable on a computing device. The method may be performed by a server that is remote from the computing device. In some embodiments the method comprises: receiving parameters for updating a user interface element of the application, the user interface element being identified at the server by a programming language unit for the user interface element in the program code of the application; and sending the parameters to the computing device, wherein the computing device receives the parameters, updates the user interface element of the application with the parameters, and displays a modified user interface for the application, the modified user interface comprising the updated user interface element.

20 Claims, 32 Drawing Sheets

Related U.S. Application Data continuation of application No. 15/279,587, filed on Sep. 29, 2016, now Pat. No. 10,169,057, which is a continuation of application No. 14/499,702, filed on Sep. 29, 2014, now Pat. No. 9,507,609.

(60) Provisional application No. 61/988,597, filed on May 5, 2014, provisional application No. 61/884,061, filed on Sep. 29, 2013.

(56) References Cited

U.S. PATENT DOCUMENTS

| | | | |
|---|---|---|---|
| 5,533,183 | A | 7/1996 | Henderson, Jr. et al. |
| 5,613,122 | A | 3/1997 | Burnard et al. |
| 5,623,681 | A | 4/1997 | Rivette et al. |
| 5,831,664 | A | 11/1998 | Wharton et al. |
| 5,841,852 | A | 11/1998 | He |
| 5,985,747 | A | 11/1999 | Taguchi |
| 6,049,711 | A | 4/2000 | Ben-Yehezkel et al. |
| 6,100,885 | A | 8/2000 | Donnelly et al. |
| 6,124,856 | A | 9/2000 | Bryan et al. |
| 6,260,187 | B1 * | 7/2001 | Cirne .................. G06F 9/4488 717/110 |
| 6,292,187 | B1 * | 9/2001 | Gibbs ................ H04N 21/4351 348/E7.063 |
| 6,292,798 | B1 | 9/2001 | Dockter et al. |
| 6,330,006 | B1 | 12/2001 | Goodisman |
| 6,429,882 | B1 * | 8/2002 | Abdelnur ............ G06F 16/2428 715/744 |
| 6,564,246 | B1 | 5/2003 | Varma et al. |
| 6,571,279 | B1 | 5/2003 | Herz et al. |
| 6,690,932 | B1 | 2/2004 | Barnier et al. |
| 6,879,838 | B2 | 4/2005 | Rankin et al. |
| 6,907,256 | B2 | 6/2005 | Hokao |
| 7,020,494 | B2 | 3/2006 | Spriestersbach et al. |
| 7,155,381 | B2 | 12/2006 | Ryzl |
| 7,200,651 | B1 | 4/2007 | Niemi |
| 7,257,583 | B2 | 8/2007 | Hofmeister et al. |
| 7,283,846 | B2 | 10/2007 | Spriestersbach et al. |
| 7,331,035 | B2 | 2/2008 | Loos et al. |
| 7,340,716 | B1 | 3/2008 | Chansler |
| 7,383,302 | B2 | 6/2008 | Cohen et al. |
| 7,636,574 | B2 | 12/2009 | Poosala |
| 7,646,297 | B2 | 1/2010 | Aaron |
| 7,669,244 | B2 | 2/2010 | Smith |
| 7,716,634 | B2 | 5/2010 | Ross et al. |
| 7,721,104 | B2 | 5/2010 | Salo et al. |
| 7,721,223 | B2 | 5/2010 | Ben-Shachar et al. |
| 7,738,891 | B2 | 6/2010 | Tenhunen et al. |
| 7,747,719 | B1 | 6/2010 | Horvitz et al. |
| 7,756,534 | B2 | 7/2010 | Anupam et al. |
| 7,809,582 | B2 | 10/2010 | Wessling et al. |
| 7,812,814 | B2 | 10/2010 | Foxenland |
| 7,827,242 | B2 | 11/2010 | Cohen et al. |
| 7,831,278 | B2 | 11/2010 | Want et al. |
| 7,844,548 | B2 | 11/2010 | Robbin et al. |
| 7,890,124 | B2 | 2/2011 | Smith et al. |
| 7,890,926 | B2 | 2/2011 | Balathandapani et al. |
| 7,907,966 | B1 | 3/2011 | Mammen |
| 7,908,580 | B2 | 3/2011 | Stubbs et al. |
| 7,920,852 | B2 | 4/2011 | Neil et al. |
| 7,962,634 | B2 | 6/2011 | Cortos et al. |
| 7,992,189 | B2 | 8/2011 | Griffin et al. |
| 8,042,158 | B2 | 10/2011 | Larsen |
| 8,239,239 | B1 * | 8/2012 | Malhotra ........... G06Q 10/0633 705/7.27 |
| 8,260,859 | B2 | 9/2012 | Boyer et al. |
| 8,261,231 | B1 | 9/2012 | Hirsch et al. |
| 8,271,683 | B2 | 9/2012 | Munson et al. |
| 8,271,889 | B1 | 9/2012 | Beckert et al. |
| 8,274,377 | B2 | 9/2012 | Smith et al. |
| 8,275,836 | B2 | 9/2012 | Beaven et al. |
| 8,316,011 | B2 | 11/2012 | He et al. |
| 8,316,036 | B2 | 11/2012 | Walters et al. |
| 8,332,402 | B2 | 12/2012 | Forstall et al. |
| 8,352,903 | B1 | 1/2013 | Friedman |
| 8,365,083 | B2 | 1/2013 | Martin et al. |
| 8,365,144 | B1 | 1/2013 | Webb |
| 8,386,233 | B2 | 2/2013 | Khuda |
| 8,392,498 | B2 | 3/2013 | Berg et al. |
| 8,407,760 | B2 | 3/2013 | Rose et al. |
| 8,412,510 | B2 | 4/2013 | Zhou et al. |
| 8,417,678 | B2 | 4/2013 | Bone et al. |
| 8,448,240 | B2 | 5/2013 | Hammoutene et al. |
| 8,458,337 | B2 | 6/2013 | Corley et al. |
| 8,458,608 | B2 | 6/2013 | Raiz et al. |
| 8,464,161 | B2 | 6/2013 | Giles et al. |
| 8,561,012 | B1 | 10/2013 | Holler et al. |
| 8,839,093 | B1 * | 9/2014 | Siroker ................. H04L 67/10 715/234 |
| 9,397,844 | B2 * | 7/2016 | Howard ............... G06F 3/0484 |
| 9,400,774 | B1 * | 7/2016 | Kim ..................... G06F 40/14 |
| 9,507,609 | B2 | 11/2016 | Glazer et al. |
| 9,880,701 | B2 | 1/2018 | Hyun et al. |
| 9,880,710 | B1 * | 1/2018 | Mackinlay .......... G06F 3/04847 |
| 10,169,057 | B2 | 1/2019 | Glazer et al. |
| 10,372,285 | B2 | 8/2019 | Ramadge et al. |
| 10,802,845 | B2 | 10/2020 | Glazer et al. |
| 2001/0030667 | A1 | 10/2001 | Kelts |
| 2002/0077130 | A1 | 6/2002 | Owensby |
| 2002/0087300 | A1 | 7/2002 | Patwar |
| 2002/0089526 | A1 | 7/2002 | Buxton et al. |
| 2002/0099801 | A1 | 7/2002 | Ishii |
| 2002/0116293 | A1 | 8/2002 | Lao et al. |
| 2002/0124182 | A1 | 9/2002 | Bacso et al. |
| 2002/0131404 | A1 | 9/2002 | Mehta et al. |
| 2002/0171668 | A1 | 11/2002 | Samra |
| 2002/0199029 | A1 | 12/2002 | Williamson et al. |
| 2003/0006913 | A1 | 1/2003 | Joyce et al. |
| 2003/0008661 | A1 | 1/2003 | Joyce et al. |
| 2003/0016246 | A1 | 1/2003 | Singh |
| 2003/0095143 | A1 | 5/2003 | Lauris |
| 2003/0236657 | A1 | 12/2003 | Ryzl |
| 2004/0015445 | A1 | 1/2004 | Heaven et al. |
| 2004/0046789 | A1 | 3/2004 | Inanoria |
| 2004/0111302 | A1 | 6/2004 | Falk et al. |
| 2004/0176080 | A1 | 9/2004 | Chakravorty et al. |
| 2004/0209602 | A1 | 10/2004 | Joyce et al. |
| 2004/0216042 | A1 | 10/2004 | Consolatti et al. |
| 2004/0230559 | A1 | 11/2004 | Newman et al. |
| 2004/0254949 | A1 | 12/2004 | Amirthalingam |
| 2005/0021935 | A1 | 1/2005 | Schillings et al. |
| 2005/0091224 | A1 | 4/2005 | Fisher et al. |
| 2005/0091672 | A1 | 4/2005 | Debique et al. |
| 2006/0074915 | A1 | 4/2006 | Bhandarkar et al. |
| 2006/0077941 | A1 | 4/2006 | Alagappan et al. |
| 2006/0089932 | A1 | 4/2006 | Buehler et al. |
| 2006/0090130 | A1 | 4/2006 | Bent et al. |
| 2006/0090208 | A1 | 4/2006 | Smith |
| 2006/0129972 | A1 | 6/2006 | Tyburski et al. |
| 2006/0140141 | A1 | 6/2006 | Moon et al. |
| 2006/0149751 | A1 | 7/2006 | Jade et al. |
| 2006/0179042 | A1 | 8/2006 | Bram et al. |
| 2006/0195794 | A1 | 8/2006 | Sun et al. |
| 2006/0200767 | A1 | 9/2006 | Glaeske et al. |
| 2007/0067373 | A1 | 3/2007 | Higgins et al. |
| 2007/0168918 | A1 | 7/2007 | Metherall et al. |
| 2007/0168947 | A1 | 7/2007 | Halbedel et al. |
| 2007/0202898 | A1 | 8/2007 | Bae et al. |
| 2007/0220494 | A1 | 9/2007 | Spooner |
| 2008/0003991 | A1 | 1/2008 | Sievers et al. |
| 2008/0005235 | A1 | 1/2008 | Hegde et al. |
| 2008/0065634 | A1 | 3/2008 | Krinsky |
| 2008/0082572 | A1 | 4/2008 | Ballard et al. |
| 2008/0092109 | A1 | 4/2008 | Kinnucan et al. |
| 2008/0127036 | A1 | 5/2008 | Kadur et al. |
| 2008/0201453 | A1 | 8/2008 | Assenmacher |
| 2008/0243856 | A1 | 10/2008 | Corley et al. |
| 2008/0263462 | A1 | 10/2008 | Mayer-Ullmann et al. |
| 2008/0276182 | A1 | 11/2008 | Leow |
| 2008/0313282 | A1 | 12/2008 | Warila et al. |
| 2009/0019522 | A1 | 1/2009 | Cudich et al. |
| 2009/0099895 | A1 | 4/2009 | Carrier et al. |
| 2009/0204944 | A1 | 8/2009 | Williams et al. |

(56) References Cited

U.S. PATENT DOCUMENTS

| | | |
|---|---|---|
| 2009/0254824 A1 | 10/2009 | Singh |
| 2009/0254912 A1 | 10/2009 | Roundtree et al. |
| 2009/0300656 A1 | 12/2009 | Bosworth et al. |
| 2009/0305687 A1 | 12/2009 | Baldan |
| 2009/0327911 A1 | 12/2009 | Ningune et al. |
| 2010/0058197 A1 | 3/2010 | Chee et al. |
| 2010/0064208 A1* | 3/2010 | Valtchev ................. G06F 40/14 709/219 |
| 2010/0174974 A1 | 7/2010 | Brisebois et al. |
| 2010/0205274 A1 | 8/2010 | Gharabally et al. |
| 2010/0262958 A1 | 10/2010 | Clinton et al. |
| 2010/0281475 A1 | 11/2010 | Jain et al. |
| 2010/0313180 A1 | 12/2010 | Madkour et al. |
| 2011/0072370 A1* | 3/2011 | Mitchell ................. G06F 9/451 715/762 |
| 2011/0185342 A1 | 7/2011 | Argue et al. |
| 2011/0197267 A1 | 8/2011 | Gravel et al. |
| 2011/0238496 A1 | 9/2011 | Gurbuxani et al. |
| 2011/0288941 A1 | 11/2011 | Chandra et al. |
| 2012/0036457 A1 | 2/2012 | Perlman et al. |
| 2012/0046069 A1 | 2/2012 | Cupala et al. |
| 2012/0054664 A1 | 3/2012 | Dougall et al. |
| 2012/0066601 A1 | 3/2012 | Zazula et al. |
| 2012/0089669 A1 | 4/2012 | Berg et al. |
| 2012/0089933 A1 | 4/2012 | Garand et al. |
| 2012/0117534 A1 | 5/2012 | Hershenson et al. |
| 2012/0166985 A1 | 6/2012 | Friend et al. |
| 2012/0215753 A1 | 8/2012 | Gravit |
| 2012/0220314 A1 | 8/2012 | Altman et al. |
| 2012/0233103 A1 | 9/2012 | Ashrafi |
| 2012/0244861 A1 | 9/2012 | Agarwal et al. |
| 2012/0250106 A1 | 10/2012 | Kiran Kannambadi et al. |
| 2012/0254768 A1 | 10/2012 | Aggarwal et al. |
| 2012/0254853 A1 | 10/2012 | Aggarwal et al. |
| 2012/0260232 A1 | 10/2012 | Hirsch et al. |
| 2012/0278192 A1 | 11/2012 | Shirron et al. |
| 2012/0311659 A1 | 12/2012 | Narain et al. |
| 2013/0067208 A1 | 3/2013 | Brinkman et al. |
| 2013/0117313 A1 | 5/2013 | Miao et al. |
| 2013/0165151 A1 | 6/2013 | Gits et al. |
| 2014/0013247 A1 | 1/2014 | Beechuk et al. |
| 2014/0245199 A1 | 8/2014 | Belotti et al. |
| 2014/0258970 A1 | 9/2014 | Brown et al. |
| 2014/0297516 A1 | 10/2014 | Brown et al. |
| 2015/0160931 A1 | 6/2015 | Glazer et al. |
| 2015/0205450 A1 | 7/2015 | Howett et al. |
| 2016/0306502 A1 | 10/2016 | Ramadge et al. |

FOREIGN PATENT DOCUMENTS

| | | |
|---|---|---|
| EP | 915417 A2 | 5/1999 |
| EP | 1143334 A2 | 10/2001 |
| EP | 1148695 A2 | 10/2001 |
| EP | 1335620 A1 | 8/2003 |
| EP | 1821203 A2 | 8/2007 |
| EP | 1855186 A2 | 11/2007 |
| EP | 2189898 A1 | 5/2010 |
| EP | 2378474 A2 | 10/2011 |
| WO | 9531773 A1 | 11/1995 |
| WO | 03067396 A2 | 8/2003 |
| WO | 2004049110 A2 | 6/2004 |
| WO | 2004084082 A1 | 9/2004 |
| WO | 2005039160 A1 | 4/2005 |
| WO | 2005050441 A1 | 6/2005 |
| WO | 2006089254 A2 | 8/2006 |
| WO | 2006094117 A2 | 9/2006 |
| WO | 2007027064 A1 | 3/2007 |
| WO | 2007096848 A2 | 8/2007 |
| WO | 2007131003 A2 | 11/2007 |
| WO | 2008084397 A1 | 7/2008 |
| WO | 2008115644 A1 | 9/2008 |
| WO | 2010035214 A1 | 4/2010 |
| WO | 2010082077 A1 | 7/2010 |
| WO | 2010111148 A2 | 9/2010 |
| WO | 2010118506 A1 | 10/2010 |
| WO | 2011092635 A1 | 8/2011 |
| WO | 2012021267 A2 | 2/2012 |
| WO | 2012026753 A2 | 3/2012 |
| WO | 2012148867 A1 | 11/2012 |

* cited by examiner

SYSTEM AND METHOD FOR DEVELOPING AN APPLICATION

CROSS REFERENCE TO RELATED APPLICATIONS

The present application is a continuation of application Ser. No. 16/198,961 filed Nov. 23, 2018, which is a continuation of application Ser. No. 15/279,587 filed Sep. 29, 2016 (U.S. Pat. No. 10,169,057), which is a continuation of application Ser. No. 14/499,702 filed Sep. 29, 2014 (U.S. Pat. No. 9,507,609), which claims the benefit of the filing date of U.S. provisional patent application Ser. No. 61/884,061 filed on Sep. 29, 2013, and U.S. provisional patent application Ser. No. 61/988,597 filed on May 5, 2014, the disclosures of which are incorporated herein by reference.

FIELD

The described embodiments relate to systems and methods for developing an application, and in particular, systems and methods for developing an application for a computing device.

BACKGROUND

When creating a user interface (UI) for an application (e.g., mobile applications that may be executable on mobile devices running the iOS™ or Android™ operating system), a programmer or software developer typically writes source code using an Integrated Development Environment (IDE) or text editor. To generate the application, the source code is translated (e.g., via a compilation or interpretation process) into machine code which can be executed by a processor on the computing device.

When creating a user interface for the application, programmers are typically required to manually code the user interface using programming language units (e.g., class definitions) provided by the operating system. For example, they may manually code the user interface by entering the parameters for the programming language units into the source code. Alternatively, an interface editor (such as Interface Builder™ for iOS™) may be used to visually construct the user interface. Source code may be generated from the interface editor which can then be compiled into executable code. In further embodiments, eXtensible Markup Language (XML) may be manually coded, and the resultant XML data may be used to generate the user interface. Using these traditional methods, any changes desired to be made to parameters of the user interface elements would typically require a re-compilation of the source code and the generation of a new executable.

There is thus a need for improved systems and methods for developing an application.

SUMMARY

In one aspect, some embodiments of the present disclosure provide a method of modifying a user interface of an application executable on a computing device, the method to be performed by a server that is remote from the computing device, the method including: receiving parameters for updating a user interface element of the application, the user interface element being identified at the server by a programming language unit for the user interface element in the program code of the application; and sending the parameters to the computing device, wherein the computing device: receives the parameters; updates the user interface element of the application with the parameters; and displays a modified user interface for the application, the modified user interface including the updated user interface element.

In various embodiments, the application on the computing device includes executable code corresponding to the programming language unit for the user interface element, and the parameters are received by the executable code.

In various embodiments, the programming language unit includes a class definition.

In various embodiments, the class definition includes a subclass of a user interface class provided by an operating system of the computing device.

In another aspect, some embodiments of the present disclosure provide a computer readable medium including instructions which, when executed by a processor of a server, causes the processor to perform one or more of the methods of modifying a user interface of an application executable on a computing device, as described herein.

In another aspect, some embodiments of the present disclosure provide a server including a processor and a memory storing instructions which, when executed by the processor, cause the processor to perform the methods of modifying a user interface of an application executing on a computing device, as described herein.

In another aspect, some embodiments of the present disclosure provide a method of modifying a user interface of an application executable on a computing device, the method including the computing device: receiving parameters for updating a user interface element of the user interface from a server, the user interface element being identified at the server by a programming language unit for the user interface element in the program code of the application; updating the user interface element of the application with the parameters; and displaying a modified user interface for the application, the modified user interface including the updated user interface element.

In various embodiments, the application on the computing device includes executable code corresponding to the programming language unit for the user interface element, and the parameters are received by the executable code.

In various embodiments, the programming language unit includes a class definition.

In various embodiments, the class definition includes a subclass of a user interface class provided by an operating system of the computing device.

In another aspect, some embodiments of the present disclosure provide a computer readable medium including instructions which, when executed by a processor of a computing device, causes the processor to perform the methods of modifying a user interface of an application executing on a computing device, as described herein.

In another aspect, some embodiments of the present disclosure provide a computing device including a processor and a memory storing instructions which, when executed by the processor, cause the processor to perform the methods of modifying a user interface of an application executable on a computing device, as described herein.

In another aspect, some embodiments of the present disclosure provide a system for modifying a user interface of an application, the system including: a server including a first processor and a first memory storing first instruction which, when executed by the first processor, cause the first processor to perform various methods described herein; and a computing device for executing the application, the computing device including a second processor and a second memory storing instructions which, when executed by the second processor, cause the second processor to perform various method described herein.

In another aspect, some embodiments of the present disclosure provide a method of controlling modifications made to a user interface of an application, the method including: providing a plurality of development roles; associating at least one user interface element of the application with one development role of the plurality of development roles, the user interface element being identified by a programming language unit for the user interface element in the program code of the application; and when a user identity associated with the one development role attempts to modify the user interface of the application, allowing parameters for updating the at least one user interface element associated with the one development role to be received, and disallowing access to the remaining user interface elements of the application not associated with the one development role.

In various embodiments, the method may include: receiving first login information for the user identity associated with the one development role; receiving the parameters for updating the at least one user interface element associated with the one development role; and storing the parameters so that the received parameters can be reviewed prior to being sent to a computing device where the application is being executed.

In various embodiments, the method may include: receiving second login information for a user identity associated with another development role of the plurality of development roles; and displaying the stored parameters for updating the at least one user interface element associated with the one development role.

In various embodiments, the method may include: receiving input approving of the stored parameters for updating the at least one user interface element associated with the one development role; and sending the approved parameters to the computing device where the application is being executable, wherein the computing device receives the parameters updates the user interface element of the application with the parameters and displays a modified user interface for the application, the modified user interface including the updated user interface element.

In various embodiments, the method further includes: receiving input disapproving of the stored parameters for updating the at least one user interface element associated with the one development role; and storing information indicating that the stored parameters for updating the at least one user interface element has been disapproved, the information being retrievable by the user identity associated with the one development role.

In various embodiments, the one development role includes a role selected from: a design role, a marketing role, a brand role, and a legal role.

In another aspect, some embodiments of the present disclosure provide a computer readable medium including instructions which, when executed by a processor of a server, causes the processor to perform the methods for controlling modifications made to a user interface of an application, as described herein.

In another aspect, some embodiments of the present disclosure provide a server including a processor and a memory storing instructions which, when executed by the processor, cause the processor to perform the methods of controlling modifications made to a user interface of an application, as described herein.

In another aspect, some embodiments of the present disclosure provide a method of configuring a user interface of an application, the method including: receiving input selecting a user interface element of the application, the user interface element being identified by a programming language unit for the user interface element in the program code of the application; associating the user interface element with a first geographic location setting; and receiving first parameters for use in updating the user interface element of the application, when the application is executing on a first computing device that satisfies the first geographic location setting.

In various embodiments, the method further includes: receiving a first device geographic location from the first computing device; determining that the first device geographic location satisfies the first geographic location setting; and sending the first parameters to the first computing device, wherein the first computing device: receives the first parameters; updates the user interface element of the application with the first parameters; and displays a modified user interface for the application, the modified user interface including the updated user interface element.

In various embodiments, the method further includes: associating the user interface element with a second geographic location setting; and receiving second parameters for use in updating the user interface element of the application, when the application is executing on a second computing device that satisfies the second geographic location setting.

In various embodiments, the method further includes: receiving a second device geographic location from the second computing device; determining that the second device geographic location satisfies the second geographic location setting; and sending the second parameters to the second computing device, wherein the second computing device: receives the second parameters; updates the user interface element of the application with the second parameters; and displays a modified user interface for the application, the modified user interface including the updated user interface element.

In various embodiments, the user interface element is simultaneously associated with the first geographic location setting and with the second geographic location setting, so that the application executing on the first computing device located at the first device geographic location displays the user interface element updated with the first parameters and simultaneously, the application executing on the second computing device located at the second device geographic location displays the user interface element updated with the second parameters.

In various embodiments, the user interface element is one of a plurality of user interface elements belonging to a theme, and wherein the associating of the user interface element with the first geographic location setting is performed by associating the theme with the first geographic location setting.

In another aspect, some embodiments of the present disclosure provide a computer readable medium including instructions which, when executed by a processor of a server, causes the processor to perform the methods of configuring a user interface of an application, as described herein.

In another aspect, some embodiments of the present disclosure provide a server including a processor and a memory storing instructions which, when executed by the processor, cause the processor to perform the methods of configuring a user interface of an application, as described herein.

In another aspect, some embodiments of the present disclosure provide a method of modifying a user interface of an application executable on a computing device, the method including the computing device: sending a device geographic location of the computing device to a server; receiving parameters for use in updating a user interface element of the user interface from the server, the server having associated the user interface element with a geographic location setting and determined that the device geographic location satisfies the geographic location setting, wherein the user interface element is identified at the server by a programming language unit for the user interface element in the program code of the application; updating the user interface element of the application with the parameters; and displaying a modified user interface for the application, the modified user interface including the updated user interface element.

In various embodiments, the parameters are for use in updating a plurality of user interface elements of the user interface, the plurality of user interface elements belonging to a theme.

In various embodiments, the server has associated the theme with the geographic location setting, and the user interface was associated with the geographic location setting by virtue of belonging to the theme.

In various embodiments, the method further includes: updating the plurality of user interface elements of the application with the parameters; and displaying a modified user interface for the application, the modified user interface including the plurality of updated user interface elements.

In another aspect, some embodiments of the present disclosure provide a computer readable medium including instructions which, when executed by a processor of a computing device, causes the processor to perform the methods of modifying a user interface of an application executing on a computing device, as described herein.

In another aspect, some embodiments of the present disclosure provide a computing device including a processor and a memory storing instructions which, when executed by the processor, cause the processor to perform the methods of modifying a user interface of an application executable on a computing device, as described herein.

In another aspect, some embodiments of the present disclosure provide a system for configuring a user interface of an application, the system including: a server including a first processor and a first memory storing first instruction which, when executed by the first processor, cause the first processor to perform the methods of configuring a user interface of an application, as described herein; and a computing device for executing the application, the computing device including a second processor and a second memory storing instructions which, when executed by the second processor, cause the second processor to perform the methods of modifying a user interface of an application executable on a computing device, as described herein.

In another aspect, some embodiments of the present disclosure provide a method of processing usage information about a user interface of an application, the method including: identifying first parameters used by a user interface element in a first instance of the application at a first computing device, the user interface element being identified by a programming language unit for the user interface element in the program code of the application; receiving first usage information from the first computing device; and processing the first usage information as being associated with the first parameters.

In various embodiments, the method further includes: associating the first parameters with a first test configuration, so that when the first usage information is processed, the first usage information is processed as being associated with the first test configuration.

In various embodiments, the processing includes storing the usage information.

In various embodiments, the processing includes transmitting the first usage information to an external server providing analytics services.

In various embodiments, the user interface element is part of a plurality of user elements belonging to a theme, the theme being associated with the first test configuration, and wherein the first parameters are associated with the first test configuration by virtue of the theme being associated with the first test configuration.

In various embodiments, the method further includes: identifying second parameters used by the user interface element in a second instance of the application at a second computing device; receiving second usage information from the second computing device; and processing the second usage information as being associated with the second parameters.

In various embodiments, the method further includes: associating the second parameters with a second test configuration, so that when the second usage information is processed, the second usage information is processed as being associated with the second test configuration.

In various embodiments, the processing includes storing the usage information.

In various embodiments, the processing includes transmitting the second usage information to an external server providing analytics services.

In various embodiments, the user interface element is part of a plurality of user elements belonging to a theme, the theme being associated with the second test configuration, and wherein the second parameters are associated with the second test configuration by virtue of the theme being associated with the second test configuration.

In various embodiments, the first usage information is comparable to the second usage information to determine whether one of the first parameters and the second parameters is preferable to the other of the first parameters and the second parameters.

In various embodiments, the first parameters and the second parameters are simultaneously deployed on the first computing device and the second computing device respectively.

In another aspect, some embodiments of the present disclosure provide a computer readable medium including instructions which, when executed by a processor of a server, causes the processor to perform the methods of processing usage information about a user interface of an application, as described herein.

In another aspect, some embodiments of the present disclosure provide a server including a processor and a memory storing instructions which, when executed by the processor, cause the processor to perform the methods of processing usage information about a user interface of an application, as described herein.

In another aspect, some embodiments of the present disclosure provide a method of providing usage information about a user interface of an application, the method including: providing the user interface of the application, the user interface including a user interface element that is identified by a programming language unit for the user interface element in the program code of the application, wherein the user interface element is configured with parameters; and sending usage information so that the usage information can be processed as being associated with the parameters.

In various embodiments, the usage information is sent to a server, and the server processes the usage information as being associated with the parameters.

In various embodiments, the usage information is sent to an external server providing analytics services, and the external server processes the usage information as being associated with the parameters.

In various embodiments, the parameters are associated with a test configuration, so that when the usage information is processed, the usage information is processed as being associated with the test configuration.

In various embodiments, the user interface element is part of a plurality of user elements belonging to a theme, the theme being associated with the test configuration, and wherein the parameters are associated with the test configuration by virtue of the theme being associated with the test configuration.

In various embodiments, the method further includes: receiving information indicating that the parameters are associated with a test configuration.

In various embodiments, the information indicating that the parameters are associated with the test configuration is received from the server.

In various embodiments, the information indicating that the parameters are associated with the test configuration is received as input via a user interface provided on the computing device executing the application.

In another aspect, some embodiments of the present disclosure provide a computer readable medium including instructions which, when executed by a processor of a computing device, causes the processor to perform the methods of providing usage information about a user interface of an application, as described herein.

In another aspect, some embodiments of the present disclosure provide a computing device including a processor and a memory storing instructions which, when executed by the processor, cause the processor to perform the methods of providing usage information about a user interface of an application, as described herein.

In another aspect, some embodiments of the present disclosure provide a system for processing usage information about a user interface of an application, the system including: a server including a first processor and a first memory storing first instruction which, when executed by the first processor, cause the first processor to perform the methods of processing usage information about a user interface of an application, as described herein; and a computing device for executing the application, the computing device including a second processor and a second memory storing instructions which, when executed by the second processor, cause the second processor to perform the methods for providing usage information about a user interface of an application, as described herein.

In another aspect, some embodiments of the present disclosure provide a method of configuring a user interface of an application, the method including: receiving input selecting a user interface element of the application, the user interface element being identified by a programming language unit for the user interface element in the program code of the application; associating the user interface element with a setting; and receiving parameters for use in updating the user interface element of the application, when the application is executing on a first computing device that satisfies the setting.

In various embodiments, the method further includes: receiving information from the first computing device; determining that the information satisfies the setting; and sending the first parameters to the first computing device, wherein the first computing device receives the first parameters, updates the user interface element of the application with the first parameters, and displays a modified user interface for the application, the modified user interface including the updated user interface element.

In another aspect, some embodiments of the present disclosure provide a computer readable medium including instructions which, when executed by a processor of a server, causes the processor to perform the methods of configuring a user interface of an application, as described herein.

In another aspect, some embodiments of the present disclosure provide a server including a processor and a memory storing instructions which, when executed by the processor, cause the processor to perform the methods of configuring a user interface of an application, as described herein.

In another aspect, some embodiments of the present disclosure provide a method of modifying a user interface of an application executable on a computing device, the method including the computing device: sending information to a server; receiving parameters for use in updating a user interface element of the user interface from the server, the server having associated the user interface element with a setting and determined that the information satisfies the setting, wherein the user interface element is identified at the server by a programming language unit for the user interface element in the program code of the application; updating the user interface element of the application with the parameters; and displaying a modified user interface for the application, the modified user interface including the updated user interface element.

In another aspect, some embodiments of the present disclosure provide a computer readable medium including instructions which, when executed by a processor of a computing device, causes the processor to perform the methods of modifying a user interface of an application executing on a computing device, as described herein.

In another aspect, some embodiments of the present disclosure provide a computing device including a processor and a memory storing instructions which, when executed by the processor, cause the processor to perform the methods of modifying a user interface of an application executing on a computing device, as described herein.

BRIEF DESCRIPTION OF THE DRAWINGS

Embodiments of the present disclosure will now be described in detail with reference to the drawings, in which.

DESCRIPTION OF EXEMPLARY EMBODIMENTS

Figure 1:
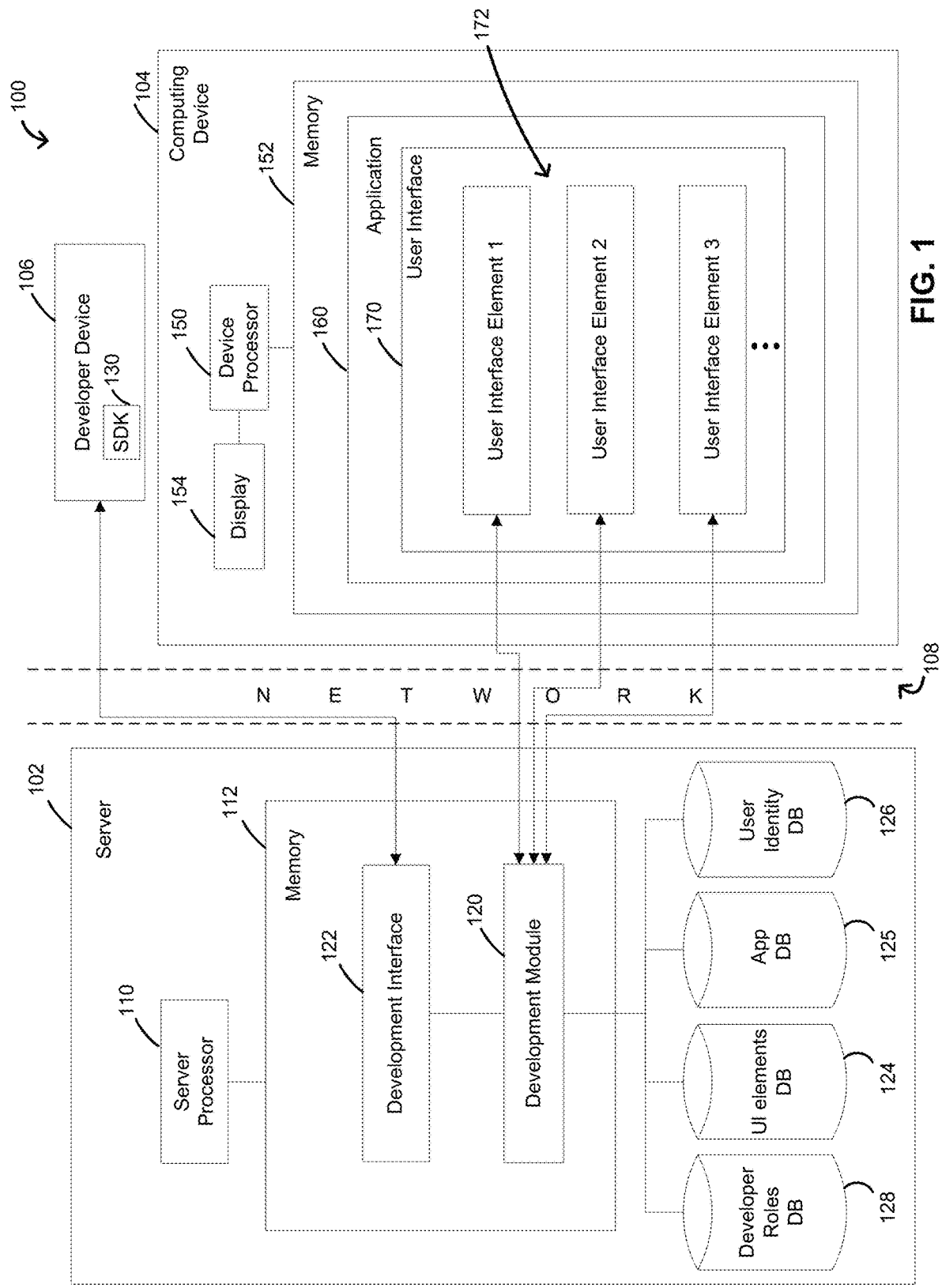
FIG. 1 is a block diagram for a system for developing an application, in accordance with at least one example embodiment.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments.

The embodiments of the methods described herein may be implemented in hardware or software, or a combination of both. In some cases, embodiments may be implemented in one or more computer programs executing on one or more programmable computing devices including at least one processor (e.g., a microprocessor), a data storage device (including in some cases volatile and non-volatile memory and/or data storage elements), at least one input device, and at least one output device. For example and without limitation, the programmable computing devices may be a personal computer, laptop, personal data assistant, cellular telephone, smartphone device, tablet computer, and/or wireless device. Additional examples of programmable computing devices are also discussed below. Program code is applied to input data to perform the functions described herein and generate output information. The output information is applied to one or more output devices.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the computing devices and methods as described herein may also be implemented as a transitory or non-transitory computer-readable storage medium configured with a computer program, wherein the storage medium so configured causes a computing device to operate in a specific and predefined manner to perform at least some of the functions as described herein. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Moreover, the subject system may be implemented as one or more software components stored on one or more computer servers that are accessible via one or more client machines in a client-server architecture. In such case, the system can be considered to be a hosted software offering or a software service in a software-as-a-service deployment.

From a high-level perspective, the present embodiments provide a platform for developing applications that allow developers to dynamically update user interface elements of a deployed application. In particular, the server may provide the ability to modify parameters of user interface elements of the application as they are defined at the programming language level of the application. In doing so, a software developer may be able to alter the appearance of the user interface of an application with a granularity that would typically require a re-generation (e.g., a re-compilation) of the machine code.

In various embodiments, the server may control the scenarios in which the modifications are made to the user interface.

For example, in some embodiments, the system may be able to provide different development roles that user identities can be associated with. In such case, the system may be configured to associate certain user interface elements or groups of user interface elements (that are modifiable on the application) with a development role, so that only user identities associated with the development role are allowed to update the user interface elements. Additionally, the system may provide workflows where modifications made by a user identity associated with one development role (e.g., a 'Designer' role) can be reviewed and approved by another user identity associated with another development role (e.g., a 'Reviewer' or 'Manager' role) prior to being transmitted to a computing device.

In another aspect, the system may send different parameters for updating a given user interface element or a group of user interface elements on an application based on the various information (e.g., the geographical location) of the computing device. For example, in such an embodiment, the server may associate certain user interface elements (that are modifiable on the application) with a setting (e.g., geographic location setting). In the example case where the setting is a geographic location setting, the server may then receive device geographic location information from computing devices. If the device geographic location information received from the computing devices match the geographic location settings associated with the user interface element, then the server can send parameters for updating the user interface element to the computing device. In some configurations, a given user interface element may be associated with multiple geographic location settings, and different parameters may be provided to the same user interface element of an application, if the application is being executed on computing devices which are in different geographic locations.

In yet another aspect, the system may allow usage information relating to whether one set of parameters used with a given user interface element is preferable to another set of parameters used with the same user interface element. For example, when updating usage elements with two different sets of parameters for a given user interface element, the server may record that the different sets of parameters are each deployed to different computing devices. The server may then receive usage information from a first computer device executing the application in which the user interface element uses the first set of parameters. As well, the server may receive usage information from a second computing device executing the application in which the user interface element uses the second set of parameters. When the usage information is received from the different computing devices, the server may then associate the usage information with the particular set of parameters that the computing device is using. The different usage information resulting use of the different parameters may then be compared to each other to determine if one set of parameters is preferable to the other (e.g., if one set of parameters resulted in higher user engagement, etc.)

Referring to FIG. 1, shown there generally as 100 is a block diagram for a system for developing an application, in accordance with at least one example embodiment. The system may include a server 102, a computing device 104, a developer device 106, all connected to each other via a network 108.

The server may include a server processor 110 connected to a memory 112 which stores instructions for providing a development module 120 and a development interface 122. The development module 120 may be a software module including instructions which, when executed by the server processor 110 causes the server processor 110 to provide the software application development functionality described herein. The development module 120 may communicate with a development interface 122 that allows external developer devices 106 to access the functionality of the development module 120.

In various embodiments, the development interface 122 may be a web portal or a web interface that may be accessible by a developer device 106 via a web browser such as Google™ Chrome™, Microsoft™ Internet Explorer™, or Mozilla™ Firefox. In other examples, the development interface 122 may be an Application Programing Interface (API) that allows functionality of the development module 120 to be accessed via a client application (e.g., a desktop or mobile application) provided on developer device 106. As will be understood, other mechanisms of providing access to the functionality of the development module 120 may also be possible. For example, access to the functionality of the development module 120 may be accessed locally via user input/output mechanism provided on the server 102 itself.

When creating an application using the system 100, the software development module 120 may allow a developer device 106 to register an application for use (or intended for use, if it has not been created yet) with the system 100. The server may, for example, store an identifier for an application in the application database 125 that may later be submitted by a software developer to register their application to the development module 120.

At the developer device 106, the software developer may use a Software Development Kit (SDK) 130 associated with the present system 100 when writing source code for that application. As will be discussed below, the SDK 130 may include programming language units (e.g., class definitions, library functions, etc.) that are usable by a software developer to create user interface elements 172 that are able to communicate with the development module 120. To register the created program with the development module 120, the development device 106 may provide the application identifier generated earlier at the development module 120 back to the development module 120 so that the particular application identifier can be associated with that particular application.

The application can then be compiled and generated so as to be deployed on the computing device 104. As will be understood, the deployment process may be performed in a variety of ways. Depending on the nature of the operating system and/or platform of the computing device 104, an application 160 may be deployed directly to the computing device, and/or the application 160 may be downloaded from an application marketplace. For example, if the computing device 104 executes the iOS™ operating system provided by Apple Inc., a compiled application 160 may first be submitted to an application approval process hosted by the provider of the operating system prior to the application 160 being made available on the application store (e.g., the App Store™) provided by the operating system. Other example application deployment platforms include Google™ Play™ provided on the Android™ operating system, the Windows Phone Store™ provided on the Windows Phone™ operating system, and BlackBerry World™ provided on the Black- Berry™ platform. It will be understood that as used herein, the word "app" may be a short form for the word "application".

The development module 120 may store references to the various user interface elements of a given application 160 in a user interface (UI) elements database 124. In operation, the development module 120 may read the UI elements database 124, and present a user interface (e.g., via the development interface 122) that allows parameters of the user interface elements to be updated. Examples of such a user interface is shown in FIGS. 4A-4D, and discussed in greater detail below.

The server 102 also contains a user identity database 126 for storing user information such as user profiles, usernames, password, security credentials, and so forth. As discussed above, in some embodiments, the user identities may be associated with various developer roles, such that access to certain user interface elements of a given application 160 may be controlled based on a developer role that a given user identity is associated with. A developer roles database 128 may also be provided on the server 102 to store information associated with the developer roles.

The computing device 104 may contain a device processor 150, a device memory 152, and a display 154. The device memory 152 may generally store instructions which, when executed by the device processor 150 causes, the device processor 150 to provide functionality of various applications 160 stored thereon. As noted above, an application 160 may have been generated at the developer device 106 using the SDK 130 which provides programming language units that allow user interface elements 172 of the user interface 170 of the application 160 to communicate with the development module 120 of the server 102.

It will be understood that the server 102 need not be a dedicated physical computer for executing the development module 120 and/or development interface 122. For example, in various embodiments, the various logical components that are shown as being provided on server 102 may be hosted by a third party "cloud" hosting service such as Amazon™ Web Services™ Elastic Compute Cloud (Amazon EC2).

As will be understood, a computing device 104 may be any suitable computing device 104 capable of executing an application 160 that is created at the developer device 106. For example, in various embodiments, the computing device 104 may include mobile devices such as smartphones, tablets or laptops, as well as less conventional computing devices such as: smart appliances (e.g., computers embedded within refrigerators, thermostats, stoves, microwaves, televisions); wearable computing devices such as smartwatches, smart glasses, and/or smart clothing; computers embedded into automobiles, cars or vehicles (e.g., as may have been provided for navigation and/or entertainment purposes). Further examples of computing devices include digital media receivers, programmable billboards, advertising displays, and/or medical diagnostic equipment.

A network 108 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

It will be understood that the different components shown in FIG. 1 can be provided in a variety of ways. For example, the server processor 110 and/or the device processor 150 may be any type of processor, such as, any type of general-purpose microprocessor or microcontroller, a digital signal processing (DSP) processor, an application-specific integrated circuit (ASIC), a programmable read-only memory (PROM), or any combination thereof.

Similarly, the server memory 112 and/or the device memory 152 may include any type of computer memory that is located either internally or externally to the computing device 104 such as, for example, random-access memory (RAM), read-only memory (ROM), compact disc read-only memory (CDROM), electro-optical memory, magneto-optical memory, erasable programmable read-only memory (EPROM), electrically-erasable programmable read-only memory (EEPROM), a hard disk drive, a solid-state drive or any other form of suitable computer readable medium that may be used in electronic devices.

Additionally, the server 102 and/or computing device 104 may include one or more input devices (not shown), such as a keyboard, mouse, camera, touch screen and/or a microphone, and may also include one or more output devices such as a display screen (e.g., display 154) and/or a speaker. The server 102 and/or computing device 104 may also have a network interface for connecting to a network 108 in order to communicate with other components.

It will be understood that although each of data stores 124, 125, 126, 128 of server 102 are illustrated in FIG. 1 separately, they can be stored together as separate tables within the same or multiple databases both locally and/or remotely. Additionally, other persistent storage methods such as encrypted or unencrypted files may also be used to provide persistent storage.

Figure 2:
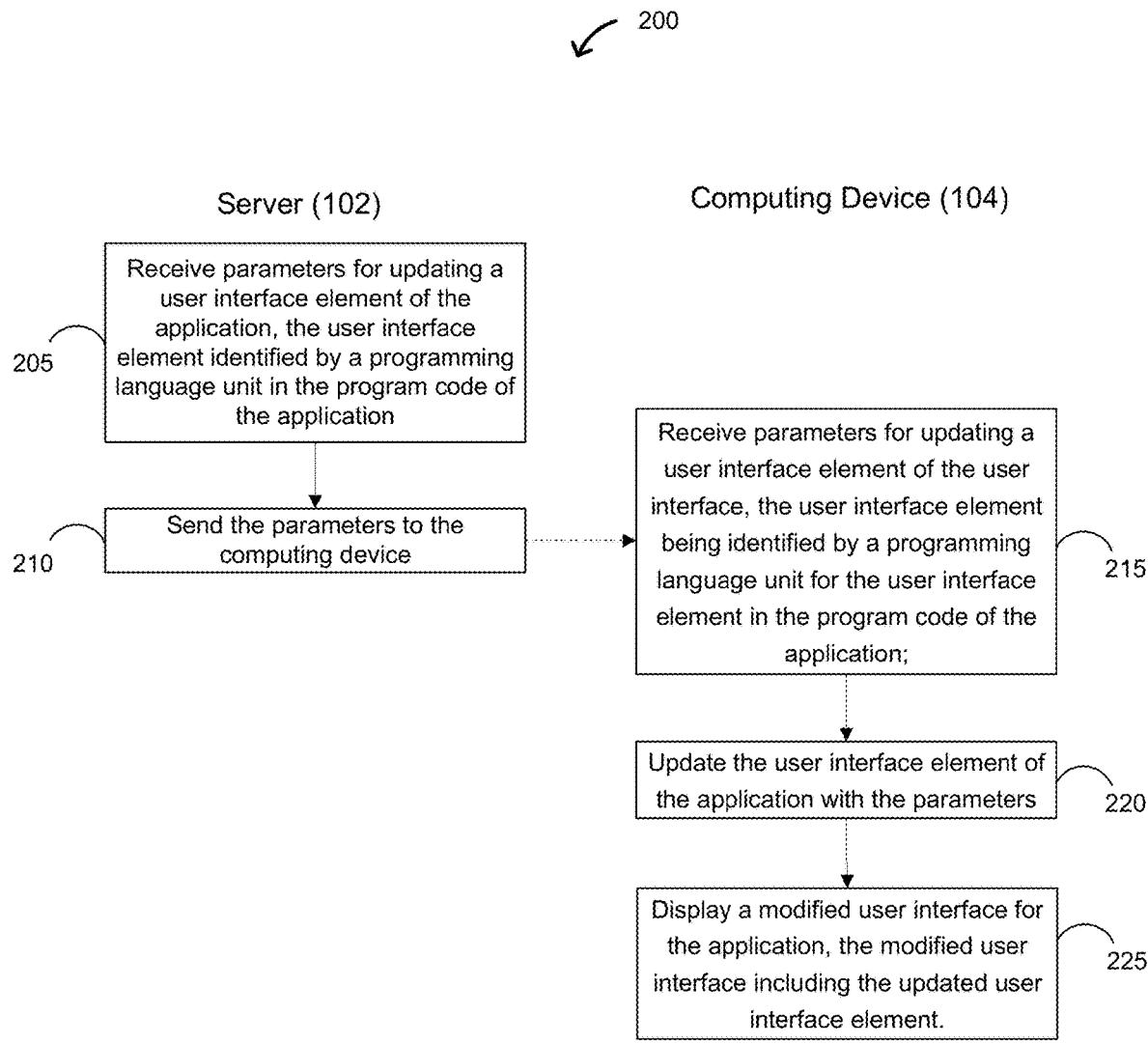
FIG. 2 is a flowchart diagram illustrating a method for developing an application in which the user interface of an application executable on a computing device can be modified, in accordance with at least one example embodiment.

Remotely Modifying User Interface Elements that are Identified by their Respective Programming Language Units Referring to FIG. 2, shown there generally as 200 is a flowchart diagram illustrating a method for developing an application in which the user interface of an application executing on a computing device can be modified, in accordance with at least one example embodiment. For ease of illustration, reference may also simultaneously be made to the components of FIG. 1. In describing the flowchart of FIG. 2, reference will further simultaneously be made to FIGS. 3, 4A-4D, and 5. The acts illustrated in FIG. 2 may be performed by various components of FIG. 1, such as the server 102 and the computing device 104.

At step 205, the server 102 may receive parameters for updating a user interface element of the application 160. As noted above, the user interface element may be identified at the server 102 by a programming language unit in the program code of the application 160 executing on the computing device 104. In various embodiments, the programming language unit may be a class definition provided in the SDK 130. For example, the various classes provided in the SDK 130 may include classes for views, labels, buttons, or various other UI controls with which a developer may construct a user interface 170 for an application 160 by writing code that uses the class definitions provided in the SDK 130.

In various embodiments, programming language units for the user interface elements in the SDK 130 may map onto corresponding programming language units for the user interface elements that may be provided in the Application Programming Interface (API) of an operating system of the computing device 104.

Figure 3:
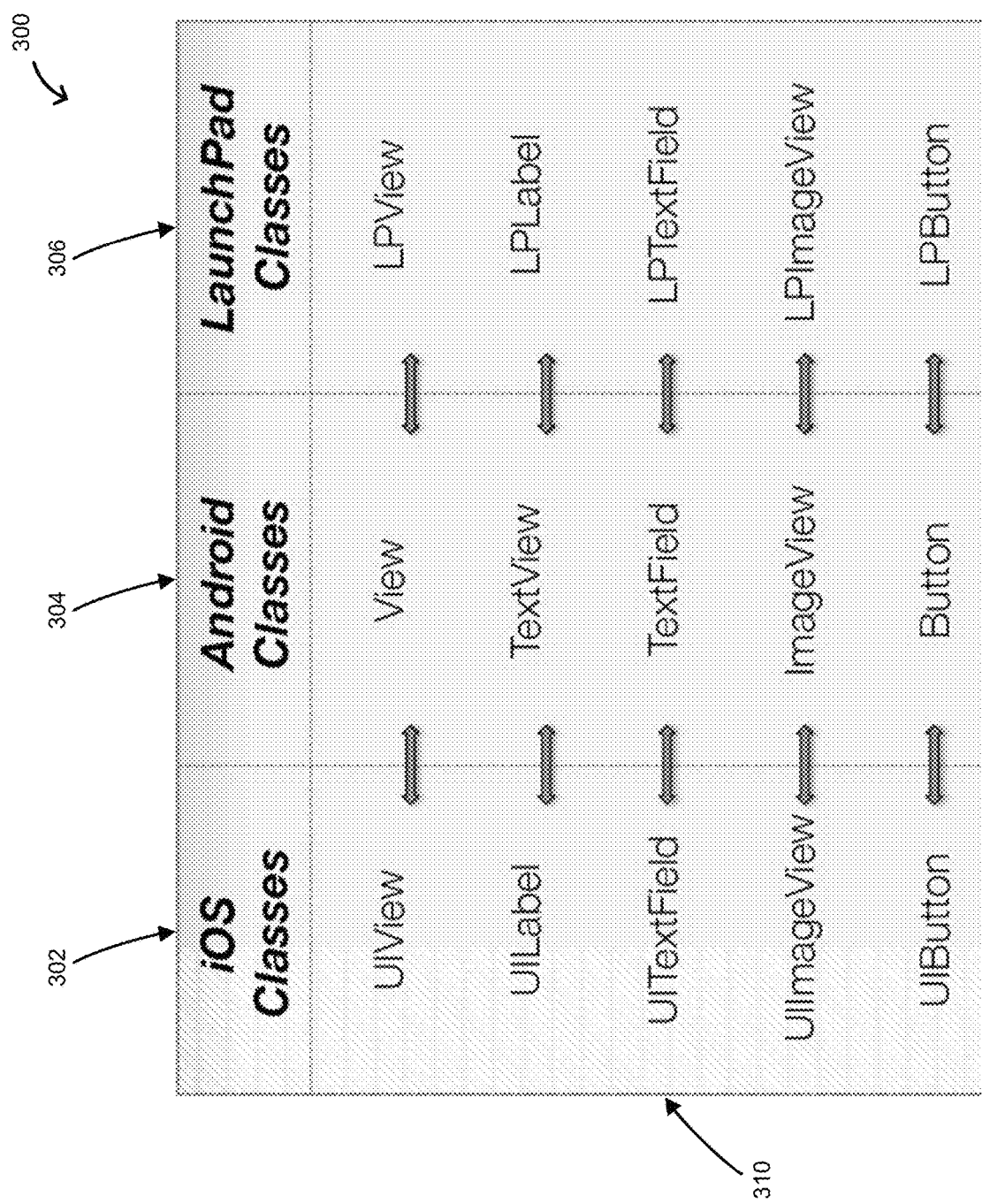
FIG. 3 is a diagram illustrating a mapping amongst example user interface programming language units of an operating system and corresponding user interface programming language units provided by the present embodiments, in accordance with at least one example embodiment.

For example, referring to FIG. 3, shown there generally as 300 is an example mapping amongst native programming language units for given user interface elements provided on an operating system and corresponding programming language units for the same user interface elements that may be provided by the SDK 130. As illustrated, the programming language units 310 are names of classes that provide various UI controls such as Views, Labels, Text Fields, Image Views, and/or Buttons. In the left-hand column 302, there is shown the names of the classes that the iOS™ operating system provides for the UI controls. In the middle column 304, names of classes for the analogous UI elements on the Android™ operating system are shown. In the right-hand column 306, the corresponding classes provided by the SDK 130 of the present system are shown (e.g., called "LPView", "LPLabel", "LPTextField", "LPImageView", and "LPButton"). In various figures, the word "LaunchPad" is used generally to refer to the system of the present embodiments. However, it will be understood that the name is used merely for illustrative purposes.

In some other embodiments, a technique of method swizzling is used to modify user interface elements for an application executing on the computing device. In such embodiments, an SDK 130 with launch pad or LP programming language units (e.g. LP classes) providing various UI controls for the user interface elements are no longer required. Method swizzling provides a technique within the context of object-oriented programming to set the properties of any native UI class of a given operating system without needing to subclass.

Unlike subclassing, as discussed below, method swizzling can be used to exchange a native UI element class implementation with another implementation during runtime. Method swizzling can also be used to add a new class implementation to the native UI element classes during runtime Method swizzling can be further used to exchange any existing method in the application with an alternate method. This can be used to provide an additional or replacement implementation of the method being swizzled.

Some uses of replacement methods may include, but are not limited to, a replacement method code that replaces or protects the existing method from creating exceptions or crashing the application. Additional uses may include replacing the existing code with new code-based functionality, algorithms, payment mechanisms, gameplay mechanics or any other elements of the application that are defined in code.

In some further embodiments, a technique of view hierarchy observing is used to modify user interface elements for an application executing on the computing device. In such embodiments, an SDK 130 observes changes to the UI View hierarchy of the complied application and modifies UI elements during runtime. This may be achieved by the SDK 130 identifying UI elements contained with a view hierarchy by observing the positioning, superclass, subclass, location and any other attributes of the view within the view hierarchy. Once identified, the SDK 130 may apply modified view properties to the unique UI element, thereby changing the elements appearance, functionality, positioning and location, and any other attributes specified within the view hierarchy. This method may be applied to applications built for the iOS™ operating system, Android™ operating system and any other applicable operating system or programming platform.

Referring back to FIG. 3, chart shown in illustrating an example for the programming classes that may be provided by the iOS™ operating system and the Android™ operating system. However, it will be understood that any number of native UI control classes (and in some embodiments, all the native UI control classes) for any operating system may be mapped to UI classes provided in the SDK 130.

When constructing an application, instead of creating a user interface element using the typical native classes provided by an operating system of the computing device, the developer may use the classes provided by the SDK 130. As noted above, these classes may contain code that allows the development module 120 to identify the user interface element 172 when it is present in a complied application 160 executing on the computing device 104. In this way, the development module 120 may provide a user interface that allows a developer device 106 to enter parameters for updating the user interface element 172 of an application 160 that is identified by the programming language unit in the application code of the application 160.

In various embodiments, the UI classes provided by the SDK 130 may be configured to appear and behave in a manner that is substantially similar to the counterpart classes provided by the operating system on which the application 160 is to be executed. For example, an "LPButton" classes used to construct a user interface in an application 160 that is for execution on the iOS™ operating system can appear and behave like the "UIButton" class that is natively provided by the iOS™ operating system. This may be done so that an application 160 created using the SDK 130 of the present embodiments may generally appear according to the design aesthetics that a user would typically expect on a computing device 104. However, by constructing the application 160 using the SDK 130, the various user interface elements 172 of the application 160 may additionally be provided with the ability to be updated remotely via the development module 120.

In various embodiments, a developer need not initialize a given user interface element 172 with parameters when writing code using the SDK 130 for the application 160. Instead, the developer may be able to leave the various parameters of the user interface element 172 uninitialized, and the parameters can be defined through the server 102 via the processes explained below.

Figure 4A:
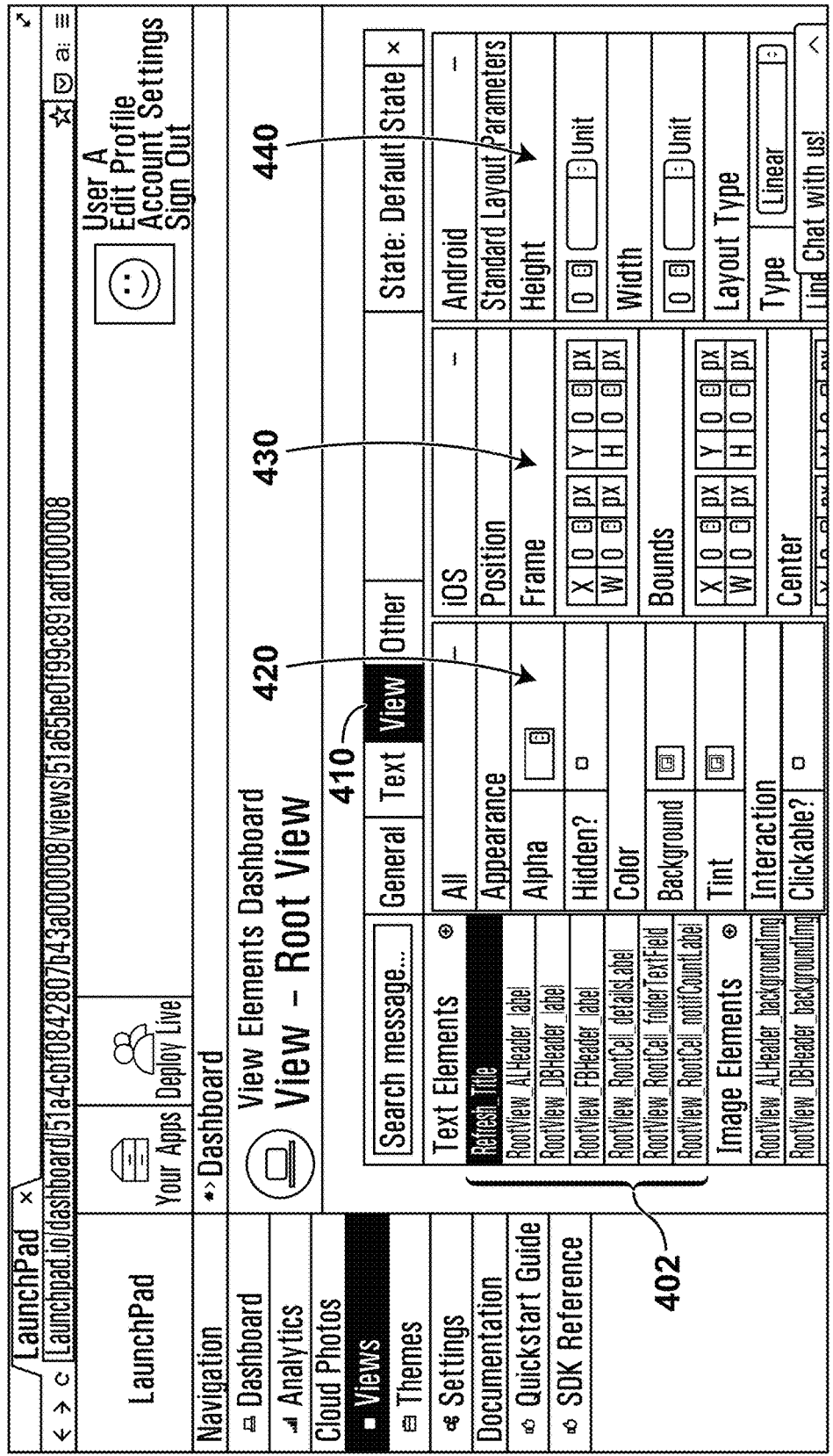
FIGS. 4A-4D are screenshots of an example user interface for updating user interface elements for an application executable on the computing device, in accordance with at least one example embodiment.

It will be understood that as you herein, the term "parameters" includes not only the various data properties that are associated with the programming language unit of the user interface element 172 (e.g., X, Y position properties of a class). Rather, the term "parameters" may include the actual content that is used by the user interface element 172. For example, such actual content may include an updated image, a font that is desired to be used, and/or audio files. Referring now simultaneously to FIG. 4A, shown there generally as 400a is a screenshot of an example user interface for updating user interface elements for an application executing on the computing device, in accordance with at least one example embodiment. In various embodiments, the user interface shown in FIG. 4A may be provided by the development module 120 through the development interface 122, and may be accessible by the developer device 106.

As illustrated, the user interface 400a may show a list 402 of user interface elements 172 that can be selected by a developer for modification. As illustrated, a user interface element 172 entitled 'Refresh_Title' is selected. To organize the various parameters of the user interface element 172 that can be modified, a series of tabs (e.g., labeled 'General', 'View', and 'Other') may also be provided. In the user interface 400a, the 'View' tab 410 is selected, and a number of controls for modifying the parameters of the 'Refresh_Title' UI element 172 is shown. In various embodiments, the parameters of the UI element 172 that can be modified are substantially similar to the parameters that would be normally be entered by a developer when they are writing program code to construct a user interface 170 using the corresponding UI element programming language unit provided natively provided by an operating system on the computing device 104. As will be understood, the various parameters that a user interface element programming language unit (e.g., a UI class) is configured with can affect how the user interface element 172 appears in the user interface 170 of an application 160.

For example, these include parameters associated with color, interaction, the position (e.g., X and Y coordinates) of the UI element 172 within the UI 170. Specifically, the parameters available for modification illustrated in the 'View' tab 410 are divided into several panes based whether the given parameters are common to the corresponding native class in both the operating systems supported by the example embodiment (e.g., by the iOS™ and Android™ operating systems), or whether the parameters are unique to the native class of each of the operating systems. As shown, the parameters that can be modified for both operating systems are shown in pane 420, the parameters that are unique to the iOS™ operating system are provided on pane 430, and the parameters that are unique to the Android™ operating system are provided on pane 440.

Referring back to FIG. 2, once various parameters for updating a user interface element 172 have been received by the server 102 (e.g., have been entered by a software developer via the user interface 400a of FIG. 4A), at step 210, the parameters may be transmitted to the computing device 104. The transmission may be performed via network 108 using standard network protocols, for example.

At step 215, the computing device 104 may receive the parameters for updating a user interface element 172. In various embodiments, the application 160 on the computing device 104 may include executable code corresponding to the programming language unit for the user interface element 172, and the parameters may be received by this executable code. As noted, the user interface elements 172 may correspond to compiled code from UI element classes provided in the SDK 130, with this compiled code configuring the computing device 104 to receive the parameters.

At step 220, the computing device 104 may update the user interface element 172 of the application 160 with the parameters that were received at step 215. As discussed above with respect to FIG. 4A, the various parameters that can be modified at the server 102 may include various properties of the UI programming language unit that would typically only be modifiable when the UI is being constructed. The UI programming language units of the present embodiments are configured to receive such parameters, and internally update the UI elements 172 with those parameters.

At step 225, after a given UI element 172 internally updates its own properties with the parameters, it can instruct the application 160 to redraw its UI 170 so that the modified user interface 170 for the application 160, which includes the updated user interface element 172, can be displayed.

Figure 5:
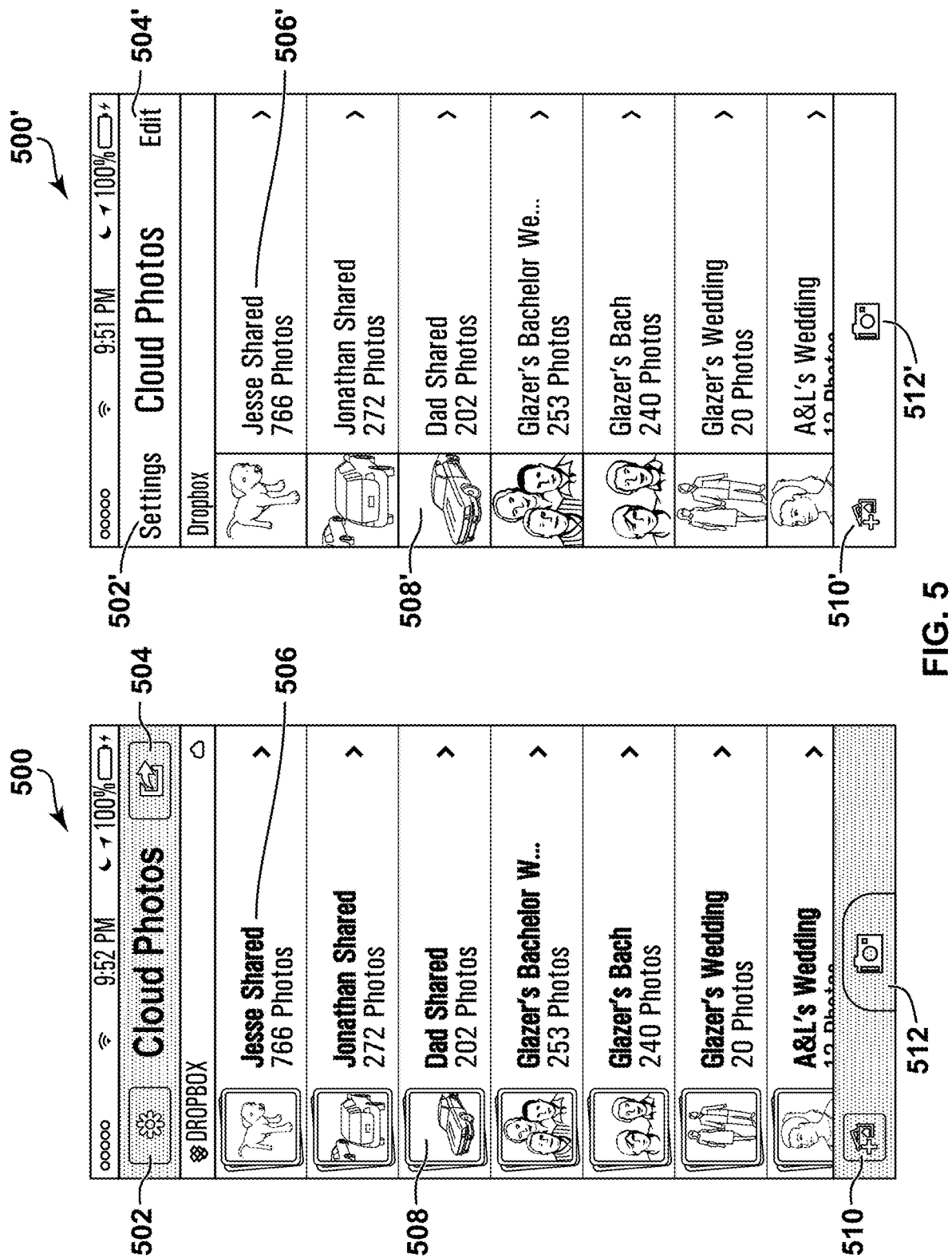
FIG. 5 are example screenshots of a user interface for an application executable on the computing device, before and after parameters for user interface elements of the application executable on a computing device have been updated, in accordance with at least one example embodiment.

Referring now simultaneously to FIG. 5, shown there generally as 500 and 500' are example screenshots of a user interface for an application executing on the computing device, before and after parameters for user interface elements of the application executing on a computing device have been updated, in accordance with at least one example embodiment. As illustrated, the example application 160 (entitled "Cloud Photos") may provide access to a number of albums containing photos which can be accessed.

As shown, the screenshot 500 shows the appearance of a user interface 170 of the application 160 with a number of user interface elements 172 prior to their appearance being updated when parameters are provided to the computing device 104. For example, there is a "settings" button 502, a "reply" button 504, album labels 506, thumbnail previews 508 for the photos, a button 510 to add additional albums, and a button 512 to access the camera functionality of the computing device 104. As can be seen, the appearance of each of the individual user interface elements 172 shown in the user interface is modified after new parameters have been provided to the user interface elements 172. For example, in the example screenshot 500', the same user interface elements 172 have an updated appearance based on the received parameters. For example, for the "settings" button 502', the border and background surrounding the button has been removed and the icon on the button showing a gear has been replaced with the word "Settings". Similarly, for the "edit" button 504', similar changes have been made to replace the icon with the word "Edit" and as well, to remove the border and background from the button. For the album labels 506', it can be seen that the font has been changed from a thicker font to one that appears more streamlined. For the thumbnail preview 508', it can be seen that the image has been expanded to fill the entirety of the space allocated for the thumbnail, and the borders and background around the thumbnail image have been removed. Further, the button 510' to add additional albums and the button 512' to access the camera functionality has been modified to remove the borders and background.

As discussed above, the present embodiments allow parameters for each of these UI elements 172 to be updated individually so as to be able to provide a granular amount of control over each of the UI elements 172 as is desired.

Figure 4B:
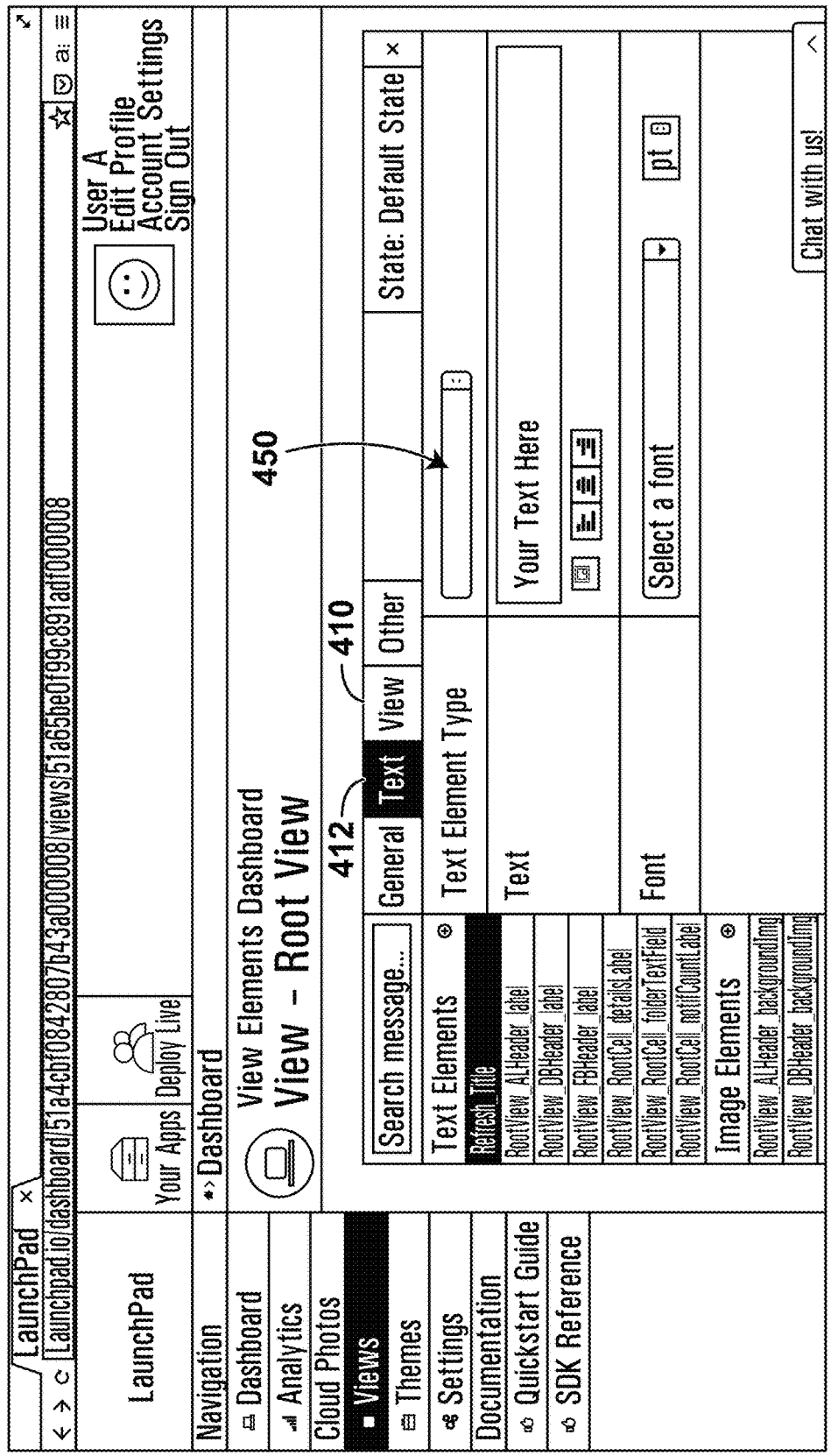

Referring now to FIG. 4B, shown there generally as 400b is another screenshot of an example user interface for updating user interface elements 172 for an application 160 executable on the computing device 104, in accordance with at least one example embodiment. Similar to the user interface 400a shown in FIG. 4A, the user interface 400b of FIG. 4B may also be provided by the development module 120 (e.g., as may be accessible by the developer device 106 through the development interface 122).

The user interface 400b of FIG. 4B shows the user interface shown in FIG. 4A, but with another tab 412 (labeled "Text") selected. In this tab 412, controls 450 may be provided that allows users to modify the text of a given selected UI element 172 (e.g., as illustrated, the UI element 172 entitled "Refresh_Title" is selected). As shown, a developer accessing such an interface may, for example, enter or modify the text of the user interface element 172, modify the justification of the text, and/or change the font or the font size for the text.

Figure 4C:
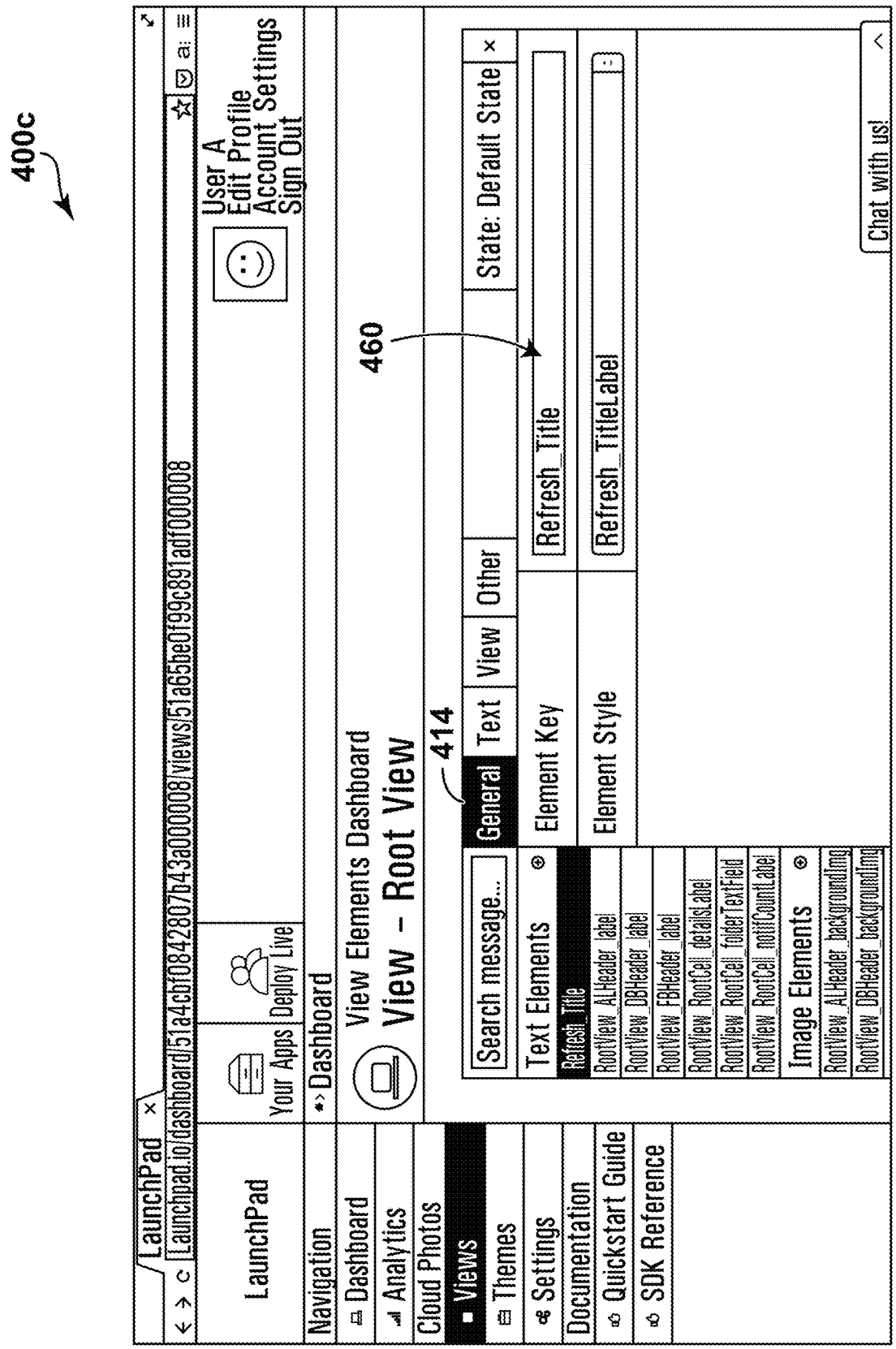

Referring to FIG. 4C, shown there generally as 400c is a further screenshot of an example user interface for updating user interface elements 172 for an application 160 executable on the computing device 104, in accordance with at least one example embodiment. The illustrated user interface 400c illustrates the user interfaces shown in FIGS. 4A and 4B, but with yet another tab 414 selected. As shown, the "General" tab 414 is shown where the development module 120 can receive input to update the identifier used by the development module 120 to identify a given user interface element 172. As illustrated, the term "Element Key" is used to refer to a user interface element identifier for a particular user interface element 172. As discussed above, the particular user interface element 172 being selected in the illustrated screenshot is entitled "Refresh_Title". The controls 460 shown on the "General" tab 414 allow the "Refresh_Title" identifier to be modified and saved (e.g., onto the UI elements database 124 shown in FIG. 1), so that the updated identifier may subsequently be used to identify the particular UI element 172.

In embodiments where method swizzling or view hierarchy observing techniques are used, modifying the UI element properties by setting or controlling properties of element keys is not required. That is, in such embodiments, defining a user interface element identifier for a particular user interface element 172 as well as the providing controls 460 associated with the identifier are not required. Instead, method swizzling or view hierarchy observing allows the developer to replace or exchange existing implementation of the user interface element with another by, for example, adding a new UI element class or replacing an existing UI element class during runtime.

Figure 4D:
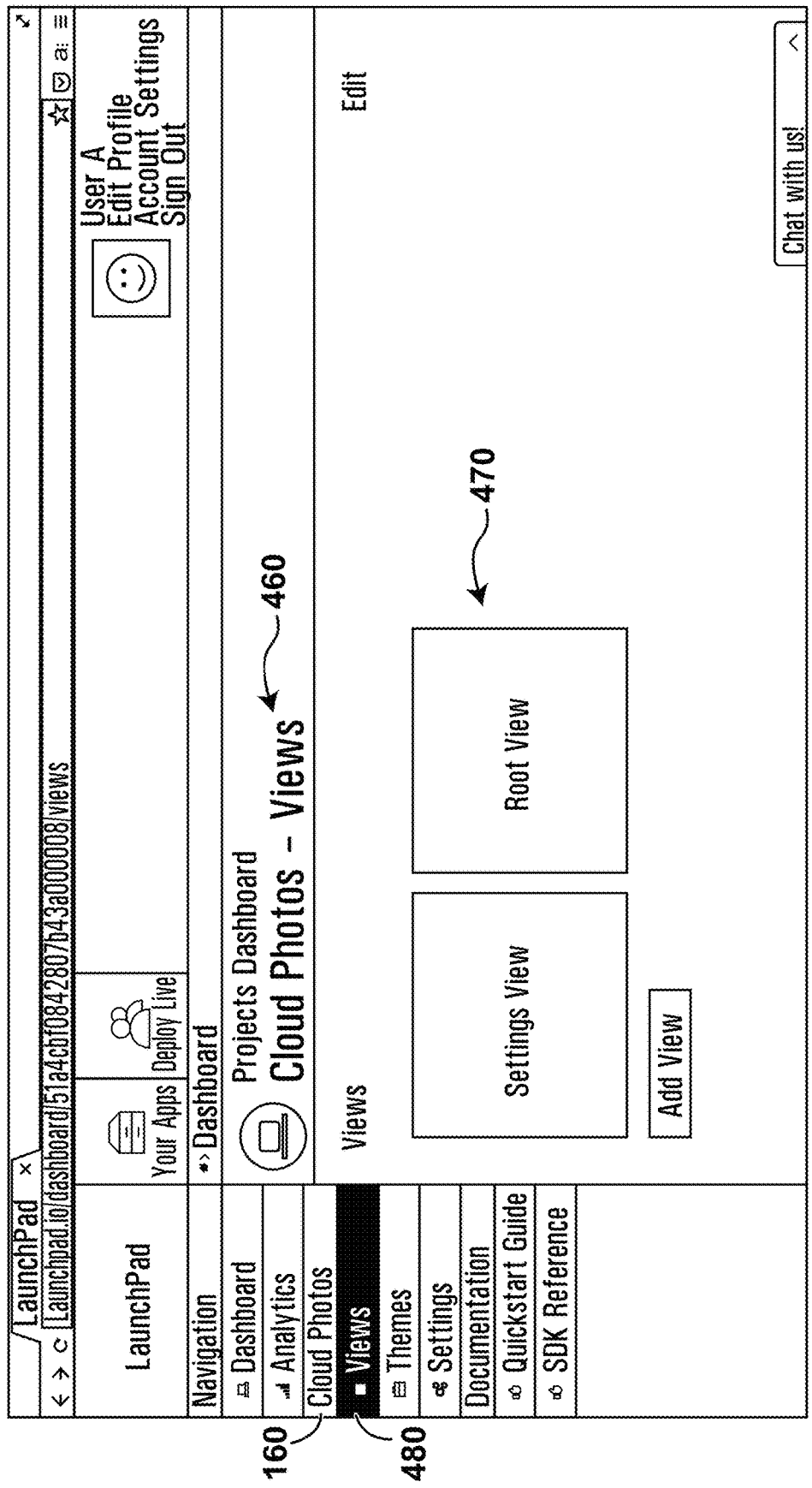

Referring to FIG. 4D, shown there generally as 401 is still a further screenshot of an example user interface for updating user interface elements 172 for an application 160 executable on the computing device 104, in accordance with at least one example embodiment. As with the user interfaces shown in FIGS. 4A, 4B, and 4C, the user interface shown in FIG. 4D may similarly be made available by the development module 120 for access by a developer device 106.

The user interface 401 provides an example layout of the higher-level aspects of the user interface provided by the development module 120. As there may be a large number of individual user interface elements 172 that can be incorporated into the user interface 170 of the application 160, searching for any particular one user interface element 172 may be difficult.

The user interface 401 illustrates one example way in which such information can be organized. As shown, the left-hand pane of the user interface may provide a list of applications 160 that a developer can work on. For each application 160, there may be different selectable functionality that the development module 120 can provide. As illustrated, the 'Views' option 480 is selected, as is indicated by the title 460 suggesting the navigational path a developer may have taken when accessing the development module 120. When this option is selected, controls 470 provide access to different 'Views' for the application 160. As shown, there are two views that can be selected: a "Settings" view and a "Root" view. Generally, a view may be a particular screen provided by the user interface 170 of the application 160. If any one of these views is selected, the development module 120 may display a user interface similar to that which is shown in FIG. 4A, 4B, or 4C, which allows selection and modification of the parameters of the UI elements 172 used on that particular view. For example, referring briefly back to FIG. 4A, the title for the user interface shows that the "Root View" has been selected, such that the list 402 of available UI elements 172 to be modified are the ones that would appear on the selected view in the application 160.

It will be noted that in various embodiments, modifications may be made to the method of FIG. 2 and the user interfaces shown in FIGS. 4A to 4D.

For example, in the user interfaces of FIGS. 4A to 4D, it may be possible to select multiple user interface elements 172 at once so as to allow modification of the common parameters amongst the selected user interface elements 172. For example, in such an embodiment, the user interface provided by the server in each of FIGS. 4A to 4D may be configured to only show the common parameters amongst the selected user interface elements 172 that can be modified.

Another modification that can be made is with respect to how step 210 in FIG. 2 can be performed. For example, instead of immediately "pushing" the parameters to the computing device 104 upon the entering of the parameters at the server 102, the parameters may be collected in a staging area until they are ready to be deployed to the computing device 104. Once the parameters are ready to be deployed, in various embodiments, an option to "Deploy Live" may be provided which, if selected, makes the parameters available for access to the computing device 104. In various embodiments, the parameters may be distributed via content delivery networks, or directly from the server 102. In such embodiments, the computing device 104 may periodically check for whether there are any new updates that have been deployed (e.g., this may happen at the computing device 104 upon the opening of the application 160 or as a background process of the application 160). If there are updates, then the parameters may be retrieved or "pulled" by the computing device 104. It will be understood that whether the parameters are in fact actively "pushed" from the server 102 or whether they are "pulled" by the computing device 104, both scenarios (along with any other scenarios that result in the parameters being provided to the computing device 104) are within the contemplation of the sending step 210 shown in FIG. 2.

Mapping Programming Language Units Provided for UI Elements in the SDK to Corresponding Native UI Elements Provided on an Operating System As discussed above with respect to FIG. 3, the SDK 130 may be able to provide programming language units (e.g., class definitions) for UI elements that map onto corresponding UI elements that have been provided natively by a given operating system of the computing device 104.

In various embodiments, the programming language units in the SDK 130 may be provided as class definitions that "extend" or "subclass" the native classes that are provided by the operating system. As will be understood, subclassing or extending a class is a technique used within the context of object-oriented programming that allows the subclass to retain the functionality (e.g., the methods) and data properties of the parent class, but at the same time, also allows additional functionality to be added to the subclass. In various embodiments, each of the UI element classes provided in the SDK 130 may extend one or more corresponding native UI class of a given operating system, so as to be able to insert functionality into the subclass that allows the particular user interface element 172 to communicate with the development module 120 (e.g., to receive updated parameters).

Since the subclass contains all the properties of the parent operating system-provided UI element class, when parameters for updating those properties are received by an object corresponding to the subclass, the UI element object can access and update the properties accordingly. After the properties have been updated, the subclass can similarly invoke methods provided in the parent class for the UI element to redraw itself.

In the example class names discussed above with respect to FIG. 3, the "LPButton" class may, for example, extend or subclass the native "UIButton" class provided by the iOS™ operating system so that when the "LPButton" class is used in an application 160, the instance of the "LPButton" class will appear and behave as if it were an instance of the "UIButton" class, but the additional functionality provided in the "LPButton" subclass will enable the instance of the "LPButton" class (e.g., a "LPButton" object) to receive parameters from the development module 120.

In various embodiments, a given UI class provided in the SDK 130 may inherit from corresponding classes for each operating system that an application 160 is intended to execute on. For example, this may allow the UI class in the SDK 130 to inherit the properties of the corresponding classes in each operating system (e.g., the properties in both the iOS™ and the Android™ operating systems). During compilation, it may then be possible to select which exact parent class to inherit from so that the resultant executable can run on the intended operating system. In this manner, the UI classes in the SDK 130 may provide for a platform-neutral way of developing an application 160 that reduces the work involved with porting an application from one operating system to another. This platform-neutrality feature may encourage adoption of the development methods of the present embodiments.

While the programming technique of subclassing a native UI element class provided at an operating system is discussed herein, it will be appreciated that any way of mapping a UI element class in the SDK 130 to the native UI element class of an operating system may be possible. For example, the UI element class in the SDK 130 may encapsulate the UI element class of an operating system and replicate the external interface of the UI element class of an operating system.

As well, in various embodiments, it may not be necessary for the software developer to construct their user interface 170 using classes provided in the SDK 130. For example, in an alternative embodiment, pre-existing source code may be processed to identify references to the native UI element classes of an operating system. When such references are found, it may be possible to replace such references with references to the corresponding UI element classes in the SDK 130. After this is done, a recompilation of the code may result in the program code of the UI element classes of the SDK 130 being included in the generated application 160.

Figure 6:
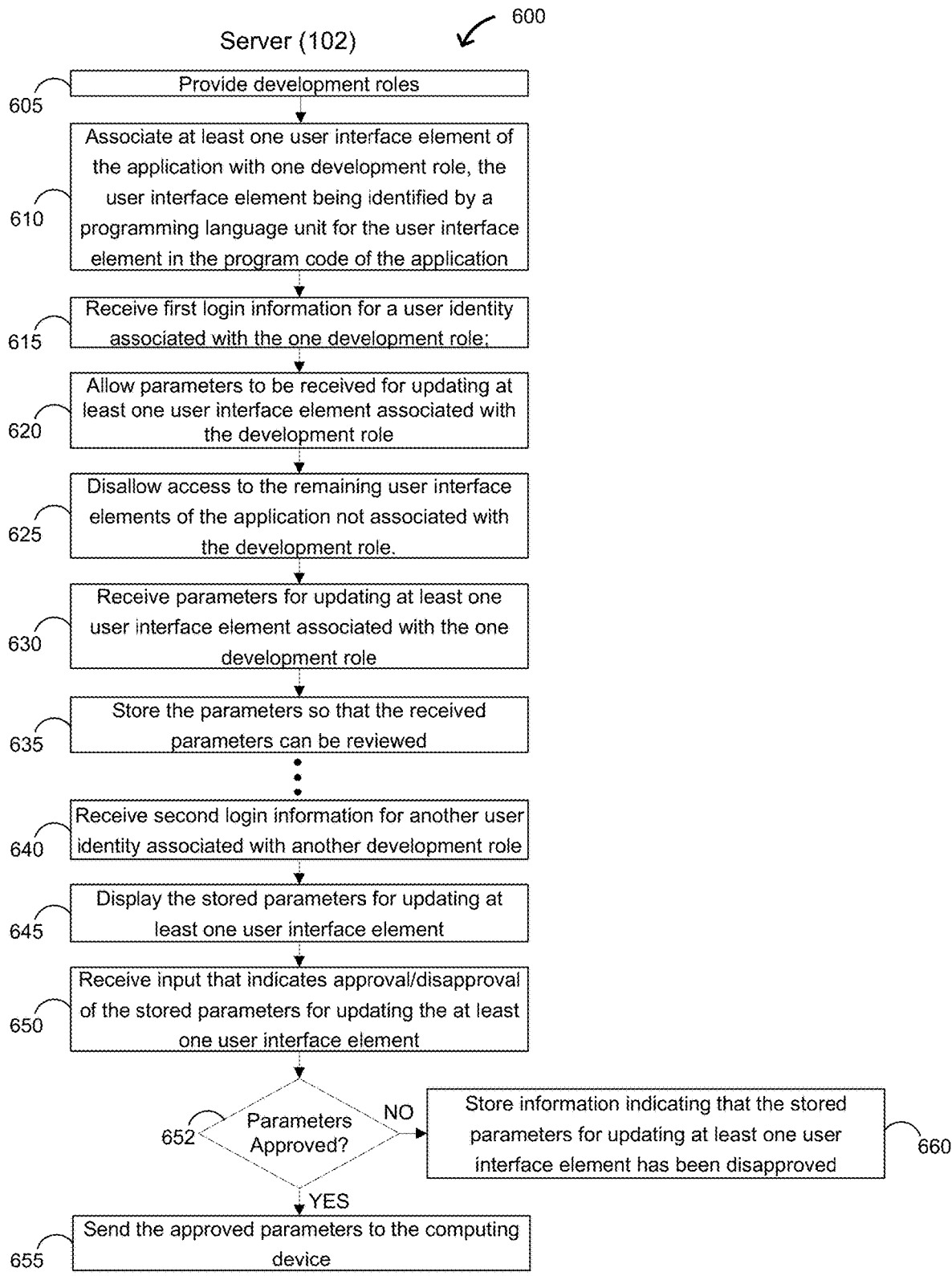
FIG. 6 is a flowchart diagram illustrating a method of developing an application in which modifications made to a user interface of an application are controlled according to development roles, in accordance with at least one example embodiment.

Controlling Modifications Made to User Interface Elements Based on Development Roles Referring to FIG. 6, shown there generally as 600 is a flowchart diagram illustrating a method of developing an application in which modifications made to a user interface of an application are controlled according to development roles, in accordance with at least one example embodiment. The method may be embodied in instructions provided in the development module 120. In discussing the various steps of the method of FIG. 6, reference will simultaneously also be made to the components of FIG. 1. Also, reference will be simultaneously made to the example screenshots shown in FIGS. 7A and 7B.

As noted above, in various embodiments, the server 102 may control the scenarios in which modifications are made to the user interface elements 172 provided on an application 160 executing on the computing device 104. In particular, in some embodiments, the server 102 may be able to provide different development roles that user identities can be associated with. In such case, the server 102 may be configured to associate certain user interface elements 172 with a development role, so that only user identities associated with the development role are allowed to update the user interface elements 172. Additionally, the system may provide workflows where modifications made by a user identity associated with one development role (e.g., a 'Modifier' role) can be reviewed and approved by another user identity associated with another development role (e.g., a 'Reviewer' or 'Manager' role) prior to being transmitted to a computing device 104.

At step 605, the server 102 may provide a plurality of development roles. For example, these roles may be associated with different areas of expertise for individuals that may provide input into the development of application 160. For example, these roles may include a 'Legal' role, a 'Design' role, a 'Marketing' role, and/or a 'Brand' role. Additionally or alternatively, these roles may be associated with a seniority level. For example, an inexperienced person in the 'Design' role may be associated with a regular 'Modifier' role, whereas a more experienced, senior designer may be associated with a 'Design' role that has a seniority level of 'Reviewer' or 'Manager'. As discussed above with respect to FIG. 1, the various development roles may be stored in the Developer Roles database 128.

At step 610, the server 102 may associate at least one user interface element 172 of the application 160 with one development role of the plurality of development roles, the user interface element being identified by a programming language unit for the user interface element in the program code of the application 160. As described above, the user interface elements 172 can be identified at the server 102 at the granular level of the programming language unit (e.g., the class definition in the SDK 130) that was used to create the UI element 172. As the various UI elements 172 used by a given application 160 may be stored in the UI elements database 124 (as shown in FIG. 1), the server 102 may be able to associate a developer role to a given UI element 172.

Figure 15A:
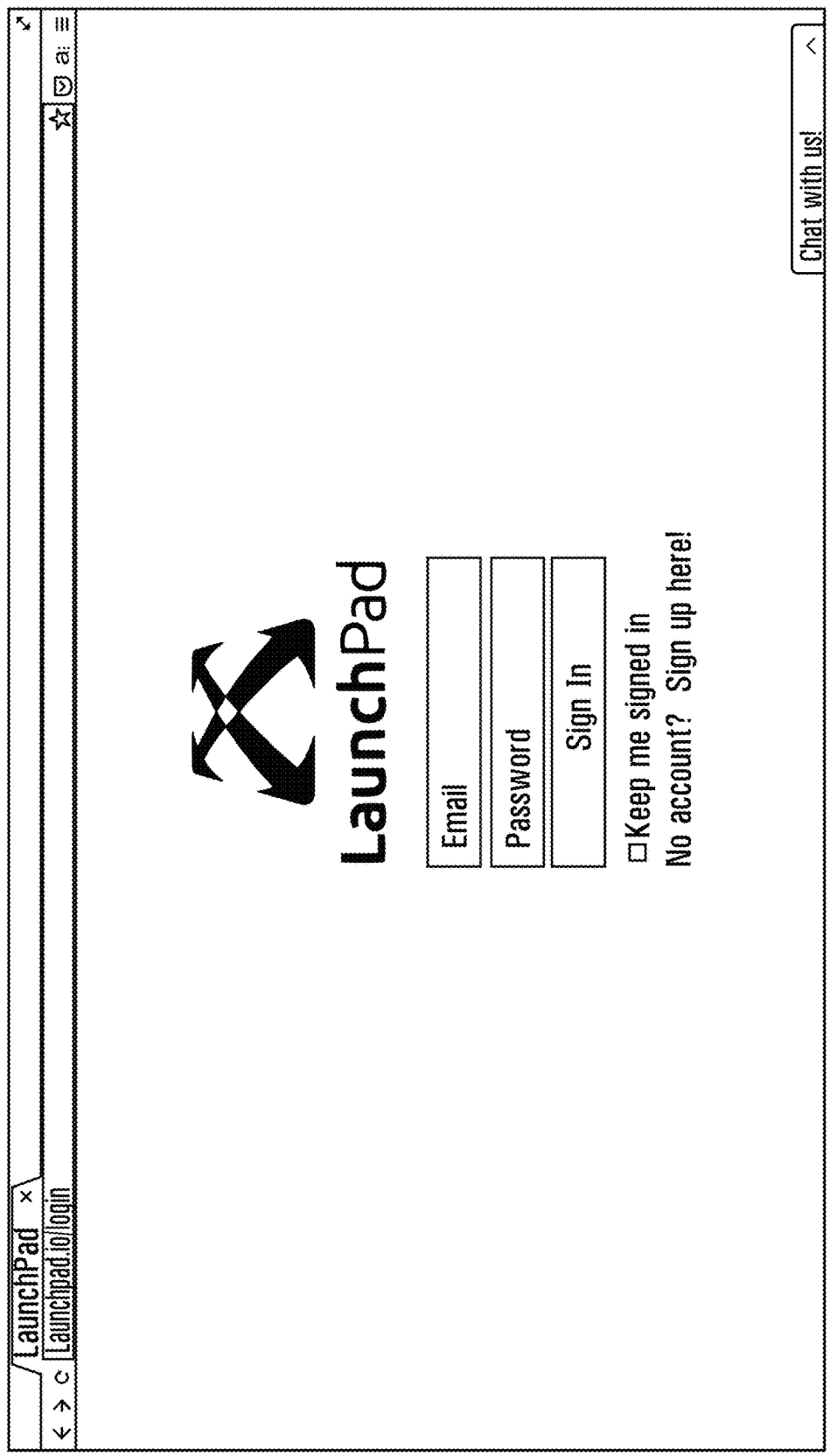
FIGS. 15A and 15B are screenshots of example sign-in user interfaces, in accordance with at least one example embodiment.
Figure 15B:
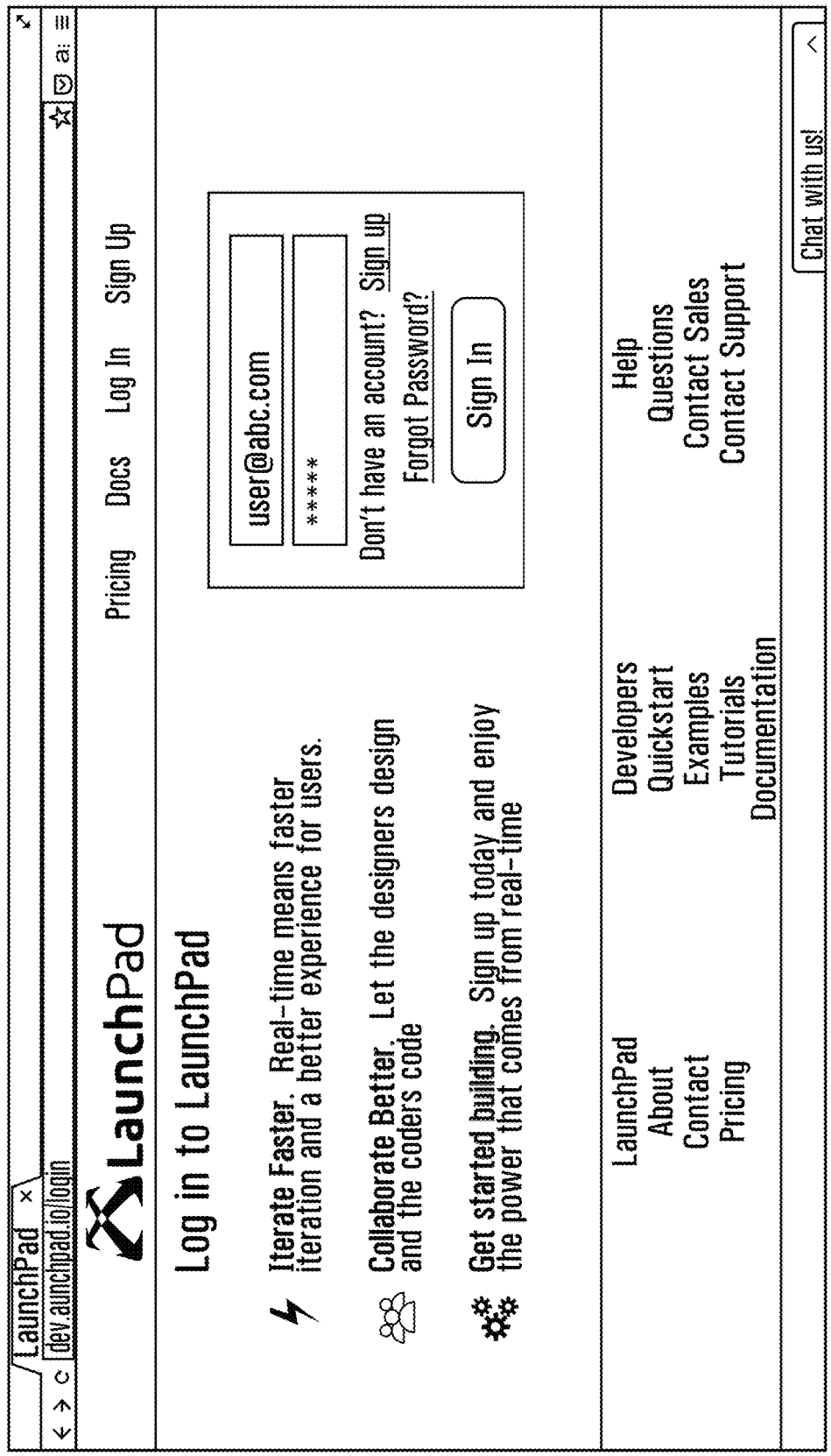

At step 615, the server 102 may receive first login information for the user identity associated with the one development role. For example, when registering to use the system 100 of the present embodiments, a given developer may create a username and password for logging into the server 102. The username and password may then be associated with a development role by an administrator user who can assign development roles to different user identities. Example log-in user interfaces are shown in FIGS. 15A and 15B, and are discussed below.

Figure 7A:
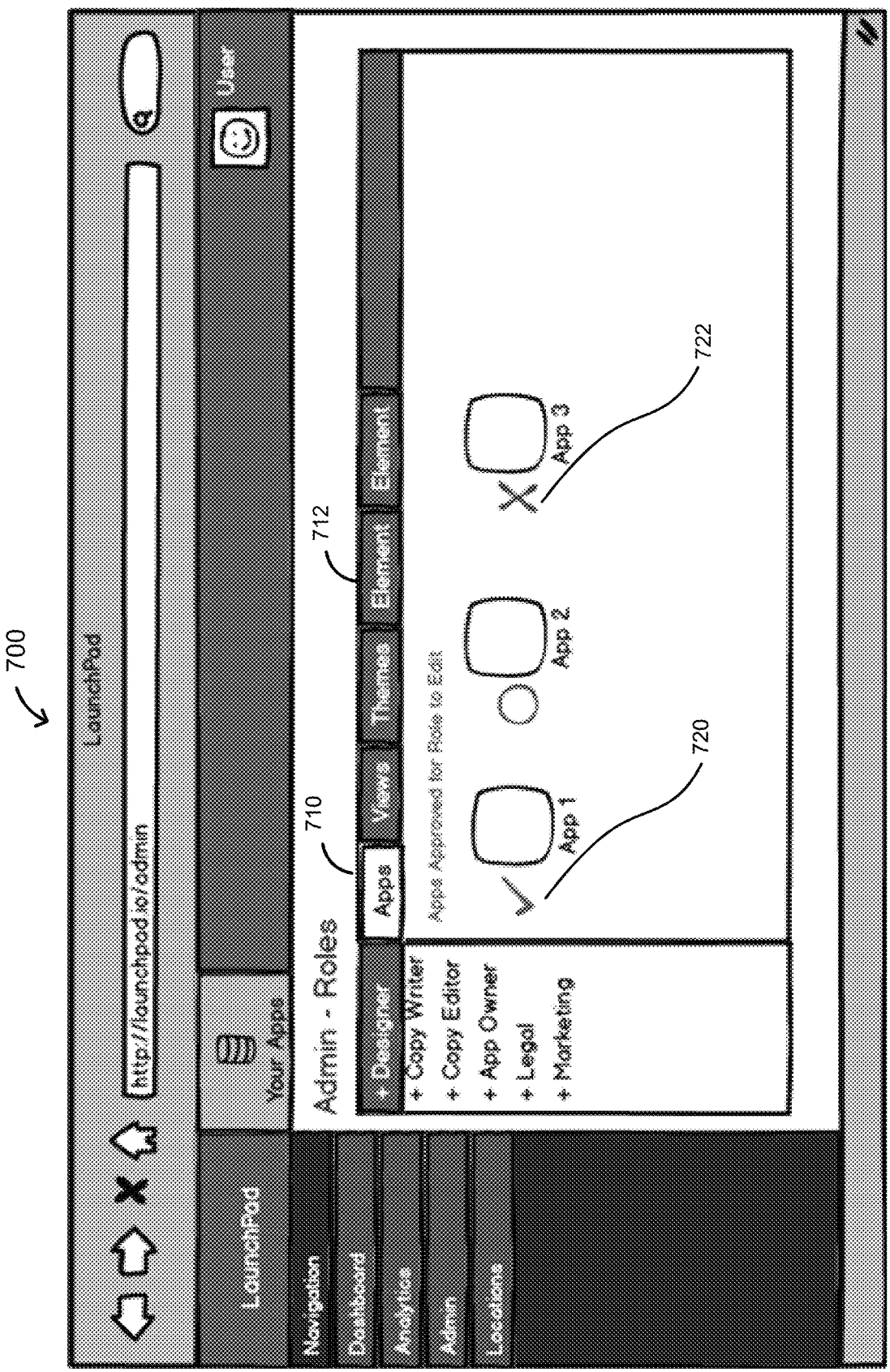
FIGS. 7A and 7B are screenshots of an example user interface for controlling modifications made to a user interface of an application executing on a computing device, in accordance with at least one example embodiment.

Referring simultaneously to FIG. 7A, shown there generally as 700 is a screenshot of an example user interface for associating user interface elements 172 with a development role. For example, the screenshot may be displayed if a logged-in user has an "Administrator" user identity. As shown, there is a pane that provides a number of different development roles have already been created. These are illustrated as 'Designer', 'Copy Writer', 'Copy Editor', 'App Owner', 'Legal', and 'Marketing'. In particular, the 'Designer' role is shown as being selected, and a number of tabs (e.g., the 'Apps' tab 710 and the 'Element' tab 712) are provided that allow the selection of different aspects of application (at varying levels of granularity) to be allowed to be modified by a user of the selected development role. As shown, the 'Apps' tab 710 is selected, and the example is illustrated as providing a control 720 that indicates that the 'Designer' role is allowed to edit user interface elements 172 associated with 'App1' (e.g., a checkmark indicating that access is allowed). Additionally, there is a control 722 that indicates that the 'Designer' role is not allowed to edit user interface elements 172 associated with 'App3' (e.g., an 'X' indicating the access is disallowed). As will be understood, if the 'Elements' tab 712 is selected, a more granular listing of the available user interface elements 172 to be edited for each application 160 may be displayed, and UI controls may be provided that allows an administrator to individually select whether a given UI element 172 is allowed or disallowed to be accessed by a user identity associated with the 'Designer' role. It will be understood that although various example roles have been discussed herein, the server 102 may allow an administrator to create any role that is desired and the access level and permissions of each role may be customized.

Once logged in, the server 102 may be able to control the user interface elements 172 that are modifiable by a given user based on the development role associated with the user's user identity. In particular, referring back to FIG. 6, at step 620, the server 102 may allow parameters for updating at least one user interface element 172 associated with the development role of the user identity to be received. At the same time, at step 625, the server 102 may disallow access to the remaining user interface elements of the application that are not associated with the development role of the user identity of the logged in user. In this way, the development roles may act as a layer of security that prevents unauthorized modification of the user interface elements 172 of a deployed application 160.

Continuing on, if a user sees a number of UI elements 172 that he/she can access, at step 630, the server 102 may receive parameters for updating at least one user interface element associated with the development role. In various embodiments, the development role may have been associated with a role of a lower security level, and as such, review of the suggested modifications to the UI elements 172 may be required. At step 635, the server 102 may then store the parameters so that the parameters can be reviewed.

In some embodiments, the parameters received at step 630 may be immediately transmitted to the appropriate user interface element 172 for the application 160 executable on the computing device 104, so as to immediately update the appearance of the user interface element 172 on the application 160. However, it is recognized that such ease in updating the appearance of UI elements on a deployed application 160 executable on the computing device 104 may result in negative user experiences if, for example, the parameters to be transmitted does not meet quality standards for the developer. Accordingly, step 635 provides for the storage of the parameters entered at step 630, so that the parameters can be reviewed and approved prior to being transmitted to the computing device 104.

At step 640, the server 102 receives second login information for a user identity associated with another development role of the plurality of development roles. For example, as noted above, the second login information may be associated with a role that is of the 'Manager' or 'Reviewer' security level.

At step 645, the server 102 may display the stored parameters (e.g., as stored at step 635) for updating the user interface element 172 that was entered by the user associated with the first login information. As the first login information was associated with a user identity with a lower security level, and the second user login information is associated with a role with a higher security level, the user of the second login information may be presented with the ability to review and approve/disapprove the parameters entered by the first user.

Figure 7B:
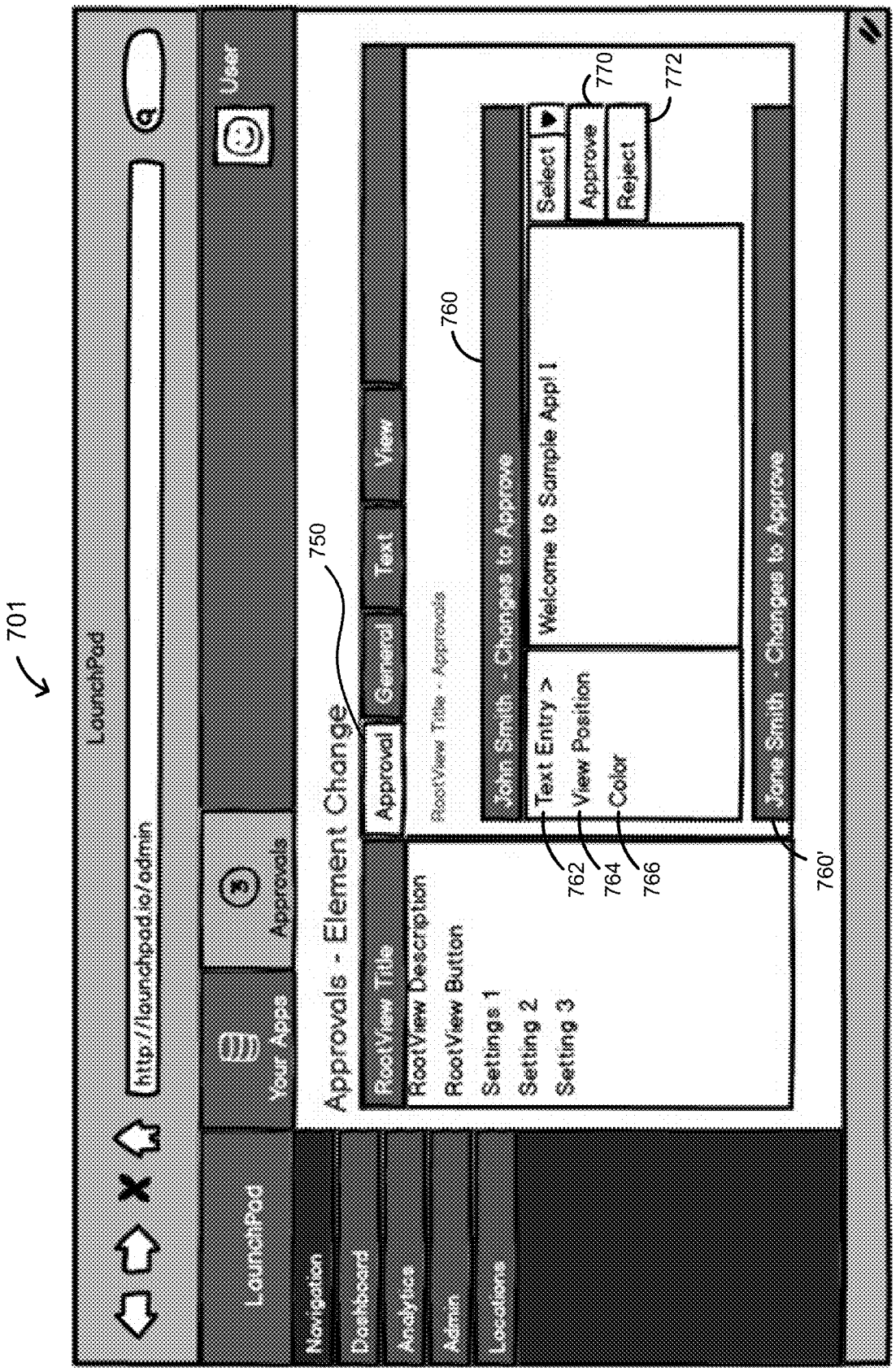

Referring briefly to FIG. 7B, shown there generally as 701 is a screenshot of an example user interface for approving/disapproving parameters inputted by a first user. As illustrated, in addition to the ability to select the applications 160 that the second user himself can modify via the 'Your Apps' button in the topmost menu bar, there is also a button for accessing the 'Approvals' that are pending for the user. When selected, a pane is provided that may show the various user interface elements 172 for which users subordinate to the second user has entered parameters to be approved. Within the pane, a UI element 172 entitled "RootView Title" is shown as being selected, and for that element, a tab 750 is provided which, when selected, shows the pending approvals. As illustrated, the parameters entered by a first user named 'John Smith' are shown and collected in a window 760 that further lists the specific parameters edited by the first user. In particular, it is shown that 'John Smith' edited the text 762, the view position 764 and the color 766 of the particular 'RootView Title' user interface element 172. When any of the modified parameters 762, 764, 766 are selected, user input may be provided to 'Approve' 770 or 'Reject' 772 the selected inputted parameter. As illustrated, additional approvals from user 'Jane Smith' in a second window 760' are also shown, and further input may be received via this window 760' to approve/disapprove the parameters submitted by the user 'Jane Smith'.

Using a user interface such as is illustrated in FIG. 7B, for example, at step 650, the server 102 may receive input indicating approval/disapproval of the parameters as stored by the first user at step 635.

If the submitted parameters are approved (the 'YES' branch at 652), the server 102 may proceed to send the approved parameters to the computing device 104 (step 655). The computing device 104 may then proceed to update the user interface 170 of the application 160, in accordance with the acts described above. It will be understood that step 655 is generally analogous to step 210 in FIG. 2 where parameters for a user interface element 172 can be sent to a computing device 104. Accordingly, the discussion above explaining that the parameters may be "pushed" from the server 102 or "pulled" by the computing device 104 is also applicable to step 655.

If the modifications are not approved (the 'NO' branch at 652), the server 102 may proceed to store information indicating that the stored parameters for updating the user interface element 172 has been disapproved. This information may then be viewable by the first user so that they may be informed that their suggested modification has been denied.

Figure 8:
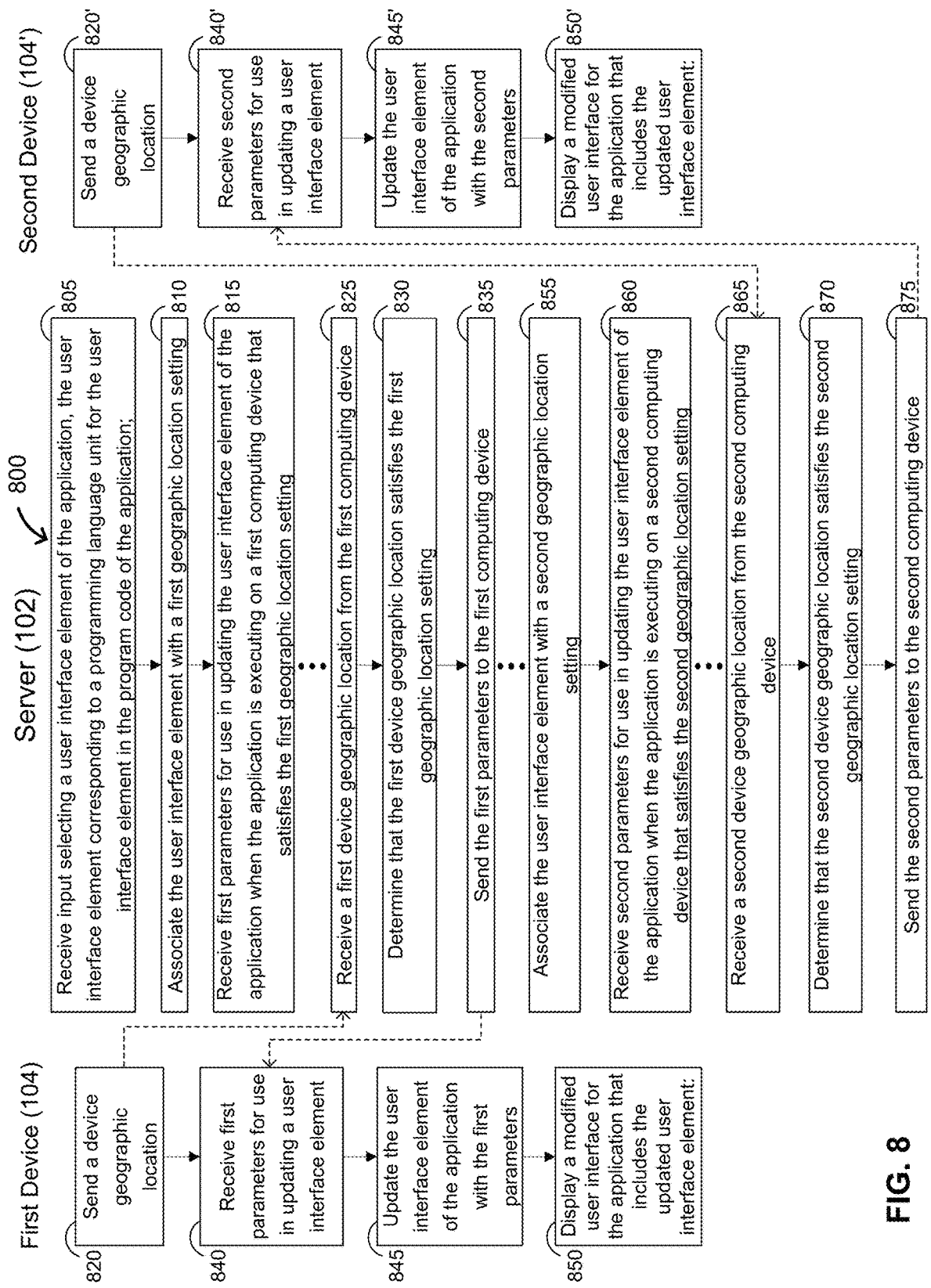
FIG. 8 is a flowchart diagram illustrating a method of configuring a user interface of an application executing on a computing device based on a setting, in accordance with at least one example embodiment.

Configuring User Interface Elements Based on a Setting that can be Satisfied by Information from a Computing Device Referring to FIG. 8, shown there generally as 800 is a flowchart diagram illustrating a method of configuring a user interface of an application executing on a computing device based on a setting, in accordance with at least one example embodiment. In particular, FIG. 8 shows an example embodiment in which the setting is a geographic location setting that can be satisfied by geographic location information from a computing device 104. As noted above, in various embodiments, the server 102 may change the parameters that are sent to a given user element 172 depending on information that can be received from a computing device 104 (e.g., the geographic location of the computing device on which the application 160 is residing). As illustrated, in FIG. 8, the server 102 may perform a number of acts to interact with a first computing device 104 and a second computing device 104'. For ease of illustration, reference will also simultaneously be made to the components shown in FIG. 1, as well as the example screenshots shown in FIGS. 9, 10A, and 10B.

At step 805, a server 102 may receive input selecting a user interface element 172 of the application 160, the user interface element 172 being identified by a programming language unit for the user interface element 172 in the program code of the application 160. This may be performed, for example, by the development module 120 providing a user interface that allows the selection of UI elements 172 of the user interface 170 on the application 160. In various embodiments, the user interface provided by the development module 120 in this regard may appear similar to FIG. 4A-4C or 7B, where there is shown a pane for selecting user interface elements 172 of a given application 160 on a computing device 104.

Figure 9:
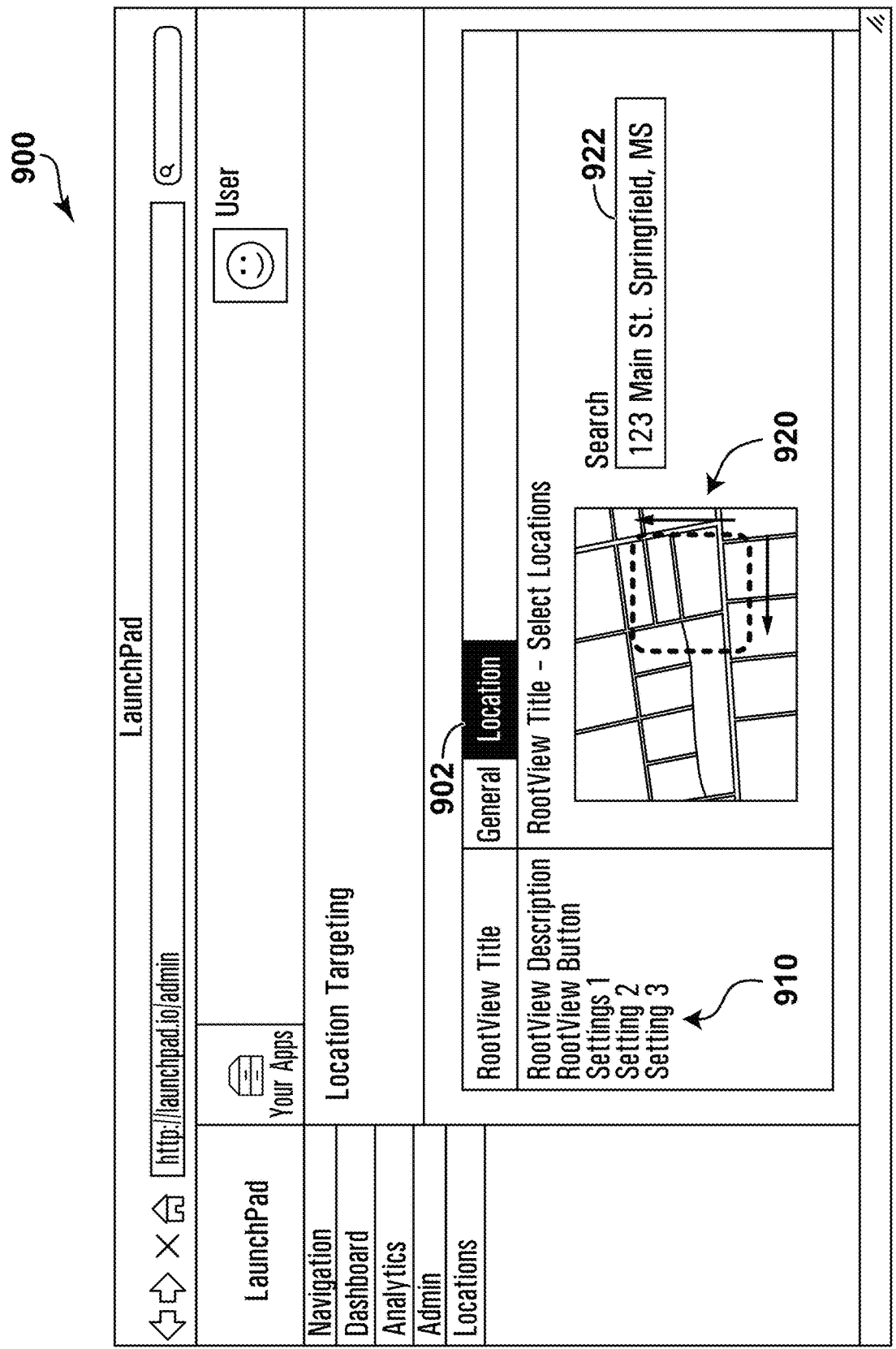
FIG. 9 is a screenshot of an example user interface for configuring a user interface of an application executing on a computing device based on a geographic location setting, in accordance with at least one example embodiment.

Referring now simultaneously to FIG. 9, shown there generally as 900 is a screenshot of an example user interface for configuring a user interface 170 of an application 160 executing on a computing device 104 based on geographic location, in accordance with at least one example embodiment. As illustrated, there is a pane 910 for selecting a user interface element 172, similar to what is provided in the user interface 701 shown in FIG. 7B. The 'RootView Title' user interface element 172 is again shown as being selected. However, the user interface 900 shows a tab 902 that allows the development module 120 to receive a geographic location setting to be associated with the selected user interface element 'RootView Title'.

At step 810, the server 102 may associate the user interface element with a first geographic location setting. As shown in the user interface 900 of FIG. 9, a geographical map control 920 may be provided to allow a developer to enter a geographic location setting. For example, the control 920 may provide a search box 922 that allows location information such as street addresses to be entered. As shown, an example street address of "123 Main Street, Springfield, Miss." is shown as being entered in the search box 922, and the map control may 920 shows the corresponding geographic location of the entered street address. The map control 920 may allow for entry of markups on the map to indicate the geographic boundaries of the geographic location setting. As will be understood, such boundaries may be considered a 'geofence', and may be defined in any number of ways. For example, the boundaries may be specified by a series of longitude and latitude coordinates that form an enclosed geographic area; a central geographic point and the area within a defined radius from that central geographic point; and/or the known boundaries of any political entity such as a country, city, province, state, county, region, or any combination thereof.

At step 815, after a given user interface element 172 has been associated with a first geographic location setting, the development module 120 may proceed to receive parameters for updating the user interface element 172. In particular, the parameters would be for use in updating the user interface element 172 of the application 160 when the application is executing on a computing device 104 that satisfies the geographic location setting that has been associated with the user interface element 172.

Once received, the parameters may be stored at the server 102 until the server 102 can determine that a given computing device 104 satisfies the geographic location setting associated with the user interface element 172.

At some time after step 815, at step 820, a first computing device 104 may send a device geographic location to the server 102. The device geographic location may be received at the server at step 825. In various embodiments, to perform step 820, the application 160 may be provided with functionality that is able to transmit the device geographic location of the computing device 104 to the server 102. For example, the SDK 130 that is provided to build an application 160 may include functionality that can be included into each application 160 that is usable with the system 100 of the present embodiments. The application 160 may then be able to provide the geographic location of the computing device 104 to the development module 120.

It will be understood that the sending of the device geographic location at step 820 may or may not be prompted by the server 102. For example, in various embodiments, the application 160 may be configured to periodically 'check in' with the development module 120 so as to provide the development module 120 with updated device geographic location information for a computing device 104. Alternatively, the development module 120 may be configured to periodically poll the application 160 for the device geographic location of the computing device 104. In further embodiments, the device geographic location may be transmitted to the development module 120 when an application 160 is activated and/or when the user interface 170 of the application is redrawn (e.g., when an active application 160 is brought to the foreground from the background).

At step 830, the server 102 may determine whether the device geographic location received at step 825 satisfies the first geographic location setting that a user interface element 172 was associated with at step 810. If so, at step 835, the server may send the parameters inputted at step 815 to the first computing device 104. As noted above, the parameters inputted at step 815 were for use in updating the user interface element 172 of the application 160 when the application is executing on a computing device 104 that satisfies the first geographic location setting that has been associated with the user interface element 172.

At step 840, the first computing device 104 may receive the parameters transmitted from the server 102 at step 830.

At steps 845, the first computing device 104 may then update the user interface element 172 for which the parameters were intended, and at step 850, the first computing device 104 may display a modified user interface 170 for the application 160 that includes the updated user interface element 172.

As will be understood, steps 840 to 850 can be considered to be analogous to steps 215 to 225 of FIG. 2, where a computing device 104: receives parameters for a given user interface element 172, updates the user interface element 172 with the parameters, and displays a modified user interface which includes the updated UI element 172. Similarly, step 835 (and step 875, discussed below) are analogous to step 210 in FIG. 2 where parameters for a user interface element 172 can be sent to a computing device 104. Accordingly, the discussion above explaining that the parameters may be "pushed" from the server 102 or "pulled" by the computing device 104 is also applicable to steps 835 and 875.

As noted above, the server 102 may associate a user interface element 172 with one or more geographic location settings, so that the same user interface element 172 may appear differently depending on the geographic location of the computing device 104 on which it is executing. To illustrate this, steps 855 to 875 illustrate interactions between a server 102 and a second computing device 104'. As will be understood, steps 855 to 875 are generally analogous to the earlier described steps 810 to 835, except that they are performed with respect to a second geographic location setting and a second computing device 104'.

At step 855, the server 102 may associate the user interface element with a second geographic location setting. As noted above, a geographic location setting may be inputted via a user interface similar to that which is shown as 900 in FIG. 9. For example, the user interface 900 in FIG. 9 may be modified to include a second tab beside tab 902 which, when selected, provides controls similar to controls 920, 922 to allow an additional, second geographic location setting to be entered. Such second location tab would be a setting that is also associated with a given selected user interface element 172 in the pane 910 (e.g., the selected 'RootView Title' UI element 172). As a result, when the second geographic location setting is entered, the second geographic location setting may be associated with the same user interface element 172 that the first geographic location setting was associated with at step 810.

At step 860, the server 102 may receive a second set of parameters to be associated with the user interface element 172. Similar to step 815, these second parameters are for use in updating the user interface element 172 of the application 160 when the application is executing on a computing device 104 that satisfies the second geographic location setting that has been associated with the user interface element 172 at step 855.

This second set of parameters may then be stored at the server 102 until the server 102 can determine that a given computing device 104 satisfies the second geographic location setting associated with the user interface element 172.

At some time after step 860, at step 820', a second computing device 104' may send its device geographic location to the server 102. This may be performed, for example, in a manner similar to which the first computing device 104 sent its device geographic location to the server at step 820. The second device geographic location may then be received at the server 102 at step 865.

At step 870, the server 102 may determine whether the device geographic location received at step 865 satisfies the second geographic location setting that the user interface element 172 was associated with at step 855. If so, at step 875, the server may send the second parameters inputted at step 860 to the second computing device 104'. As noted above, the second parameters inputted at step 860 were for use in updating the user interface element 172 of the application 160 when the application is executing on a computing device 104' that satisfies the second geographic location setting that has been associated with the user interface element 172.

Steps 840' to 845' then involves the second computing device 104' receiving the second parameters transmitted from the server 102 at step 875, updating the UI element 172 (step 845'), and displaying a modified UI for the application that includes the updated UI element 172 (step 850'). As will be understood, these steps may be performed in a manner that is similar to 840 to 845 discussed above for the first computing device 104 (which, as noted, are also analogous to steps 215 to 225 in FIG. 2).

Figure 10A:
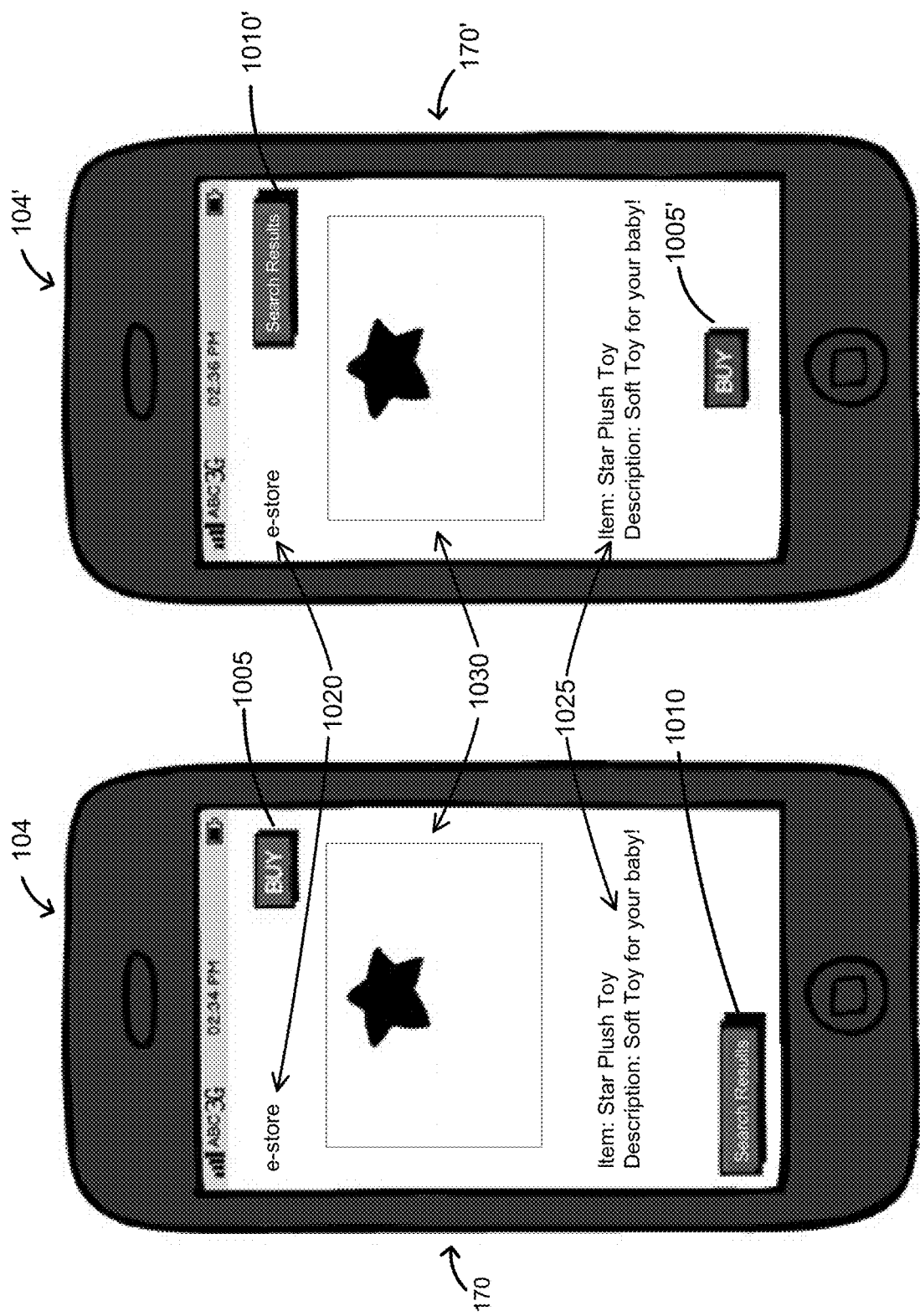
FIGS. 10A and 10B are example screenshots of two computing devices executing the same application, but with different user interfaces, in accordance with at least one embodiment.

Referring to FIG. 10A, shown there are example screenshots of two computing devices executing the same application, but with different user interfaces, in accordance with at least one embodiment. As shown, there may be a first computing device 104 that is geographically located in one location (e.g., in one city such as San Francisco), and a second computing device 104' that is geographically located in another location (e.g., in another city such as Los Angeles). In the illustrated example, the application 160 is for an electronic commerce store, and the specific screenshot shown may be for purchasing a given item. It can be seen that generally, the UI 170 shown on the first computing device 104 and the UI 170' shown on the second computing device 104' appear similar. For example, both UIs may provide a title 1020 that indicates the store (e.g., "e-Store") on the top left-hand corner of the screen, an image 1030 of the item for sale in the middle of the screen, and a description 1025 that identifies the item for sale below the image 1030.

Certain UI elements 172 of the application 160, however, may be able to receive parameters that differ depending on the geographic location of the computing device 104, 104'. For example, according to the method of FIG. 9 discussed above, the 'Buy' button 1005 user interface element 172 on the first computing device 104 may be have been provided with a first set of parameters that indicate that it is to appear on the top right hand corner of the screen. In contrast, the 'Buy' button 1005' user interface element 172 on the second computing device 104' may have been provided with a second set of parameters that indicate that it is to appear on the bottom of the screen. Similarly, a 'Search Results' button 1010 user interface element 172 on the first computing device 104 may have been provided with a first set of parameters that indicate that it is to appear on the bottom left corner of the screen. At the same time, the same 'Search Results' button 1010' user interface element 172 on the second computing device 104' may have been provided with a second set of parameters that indicate that it is to appear on the top right hand corner of the screen.

In the above manner, a given user interface element 172 may be associated with multiple geographic location settings, and different parameters may be provided to the same user interface element 172 of an application 160 if the application 160 is being executed on computing devices 104, 104' which are in different geographic locations. In this way, there may be multiple versions of a given user interface 170 that is simultaneously deployed for a given application 160.

This may be beneficial, for example, if it is desired to deploy or "roll out" a new user interface design in a staggered fashion. In an example scenario, a given test UI design may be desired to be deployed in a limited geographic area to test if such UI design is acceptable. In such case, the parameters for the UI elements 172 used in that design may be associated with a particular geographic location setting, so that only computing devices 104 having a device geographic location that satisfies the geographic location setting will be provided with that design. The same UI elements 172 may also be associated with a second geographic location setting that is defined as being outside the first geographic location setting for testing the UI design, so that computing devices 104 that are located outside the first geographic location setting may be provided with the original, unmodified UI design. If the UI design results in poor acceptance, then only a limited number of computing devices 104 with a geographic location that satisfies the first "test" geographic location setting will have been affected. If the UI design results in positive acceptance, then the first "test" geographic location setting may be expanded to include more computing devices 104.

It will be appreciated that various modifications can be made to the method shown in FIG. 8. For example, although steps 825 to 835 are illustrated as being immediately performed after steps 810 to 815 and before steps 855 to 860, it will be appreciated that it may be possible that steps 855 to 860 can be performed before steps 825 to 835 so that the different sets of parameters are available to be transmitted once the server 102 receives a device geographic location that satisfies either geographic location setting.

Also, while the above discussion has been with respect to two different computing devices 104, 104' each sending their own device location, it will be appreciated that the server 102 may be able to receive the first and second device location information from the same computing device 104. For example, this may happen if the first computing device 104 which sent the first device location moves to a second device location, and that second device location is then transmitted to the server 102. The server 102 may then determine that the second device location (as transmitted from the first computing device 104) satisfies the second device location setting, and the server 102 may transmit the second parameters for the user interface element 172 to the first computing device 104 in response. The first computing device 104 may then receive the second parameters for the given user interface element 172 that is associated with the second geographic location setting, and modify its user interface 170 accordingly.

Figure 10B:
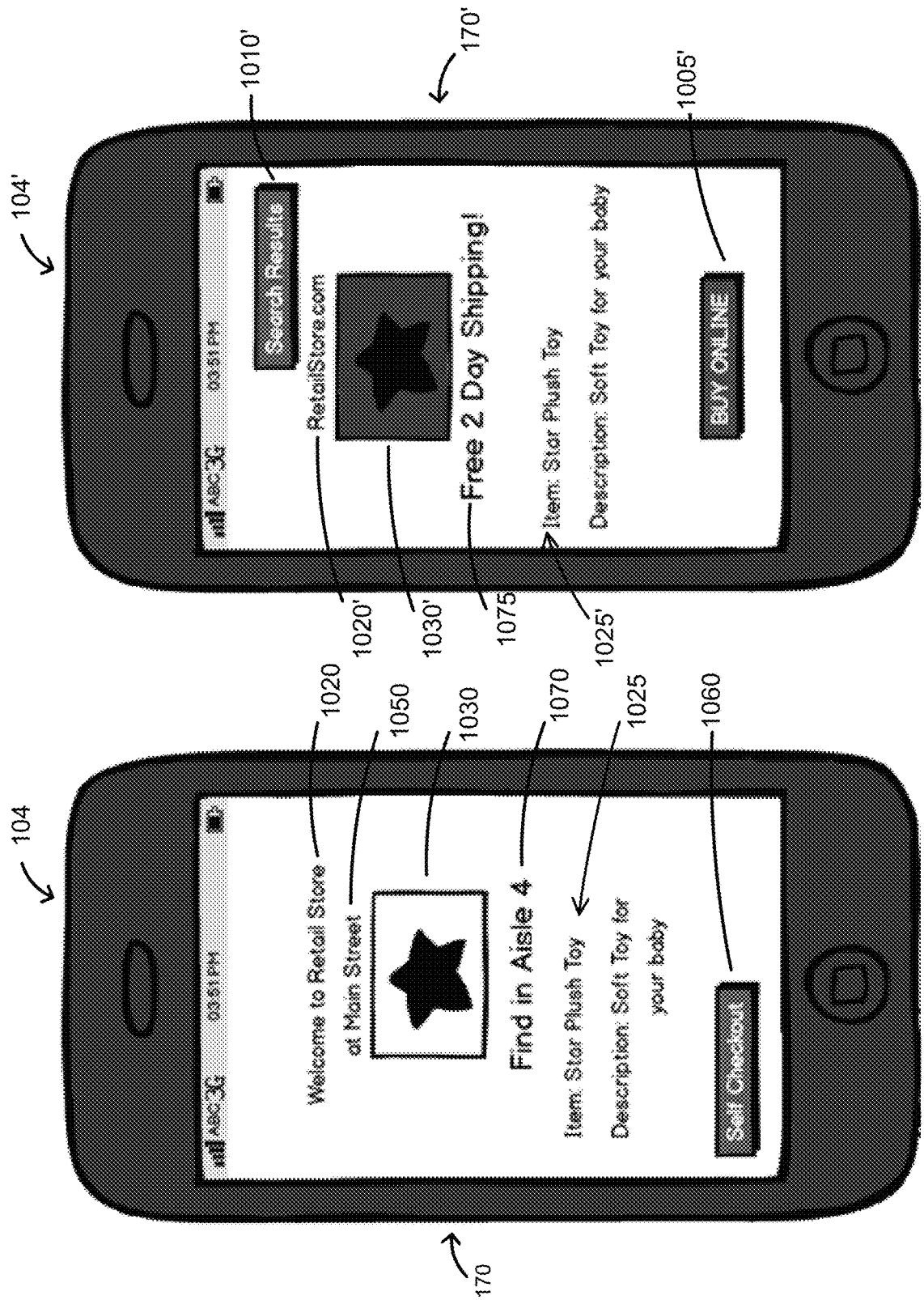

Referring to FIG. 10B, shown there are additional example screenshots of two computing devices executing the same application, but with different user interfaces, in accordance with at least one embodiment. The screenshots shown in FIG. 10B are similar to the ones shown in FIG. 10A, except that they are shown for a different scenario where the geographical location settings have been set for whether the geographic location of a computing device 104 is within a physical store and whether the geographic location of a computing device 104 is outside of a physical store.

In FIG. 10B, there may be a first computing device 104 that is geographically located within the physical store location and a second computing device 104' that is geographically located outside of a physical store location. Based on previously-set geographic location settings, an execution of the method of FIG. 8 may result in various user interface elements 172 being updated according to the geographic location of the computing device 104, 104'. For example, the user interface 170 on the first computing device 104 generally provides information about a physical in-person retail experience. As illustrated, such information includes a title 1020 welcoming a person to the physical retail store, an indication 1050 of the of the physical address of the retail store (e.g., 'at Main Street'), location information 1070 that identifies the location within the physical store of where a given product (e.g., the 'Star Plush Toy') can be found, and an option 1060 for performing a self-checkout.

In contrast, since the computing device 104' is outside of the geographic location of a physical store, the user interface 170' provided on the second computing device 104' may provide different information that is directed to an online or e-commerce retail experience. For example, the title 1020' may provide an indication of the name of the electronic store (e.g., 'RetailStore.com'), shipping information 1075 (e.g., 'Free 2 Day Shipping'), an option 1010' to display 'Search Results' and an option 1005' to 'Buy online'.

As can be seen, for analogous user interfaces 170 and 170' which both are showing a product page for a selling a given item (e.g., the 'Star plush toy' described using the text at 1025, 1025' and images 1030, 1030'), the user interface 170, 170' may be specifically targeted and updated based on the geographic location of the given computing device 104, 104'.

While FIGS. 8, 9, 10A and 10B have been discussed with respect to configuring parameters of a user interface element based on geographic location settings that can be satisfied with geographic location information provided from computing devices 104, 104' it will be appreciated that the present embodiments may allow for the creation of any type of setting that can be satisfied by some corresponding information received from the computing device 104 (even if the setting is unrelated to geographic locations).

An example of such an alternative type of setting may include a timed setting. In such example, the timed setting may be associated with some sort of time configuration (e.g., certain times of the day, certain days of the week/month, holidays, etc.) and the server 102 may receive date/time information from the computing device 104. If the server 102 determines that the date/time information from the computing device 104 satisfies the timed setting, then certain parameters for various user interface elements 172 may be provided to the computing device 104. As discussed below, such feature may be used if a developer desires to test a certain version of a user interface at a certain time of day (e.g., in the middle of the night when there are typically fewer users).

In this manner, the present embodiments may generally allow the parameters that are sent to the computing device 104 for updating user interface elements 172 to be targeted/customized according to any characteristic of the user and/or the computing device 104.

For example, in addition to geographic location and timed settings, further additional examples of settings that parameters for user interface elements 172 can be associated with include: the age and/or demographic of a user of a computing device 104, the social network information for a user of a computing device 104 (e.g., the job or interests of a user that may be stored as information available on a social network), various characteristics associated with the computing device 104 (e.g., the operating system, wireless carrier, hardware manufacturer, model number, and/or whether the computing device is using WiFi or a cellular signal), and/or previous usage patterns associated with the computing device 104.

Processing Usage Information Based on User Interface Element Configurations

Figure 11:
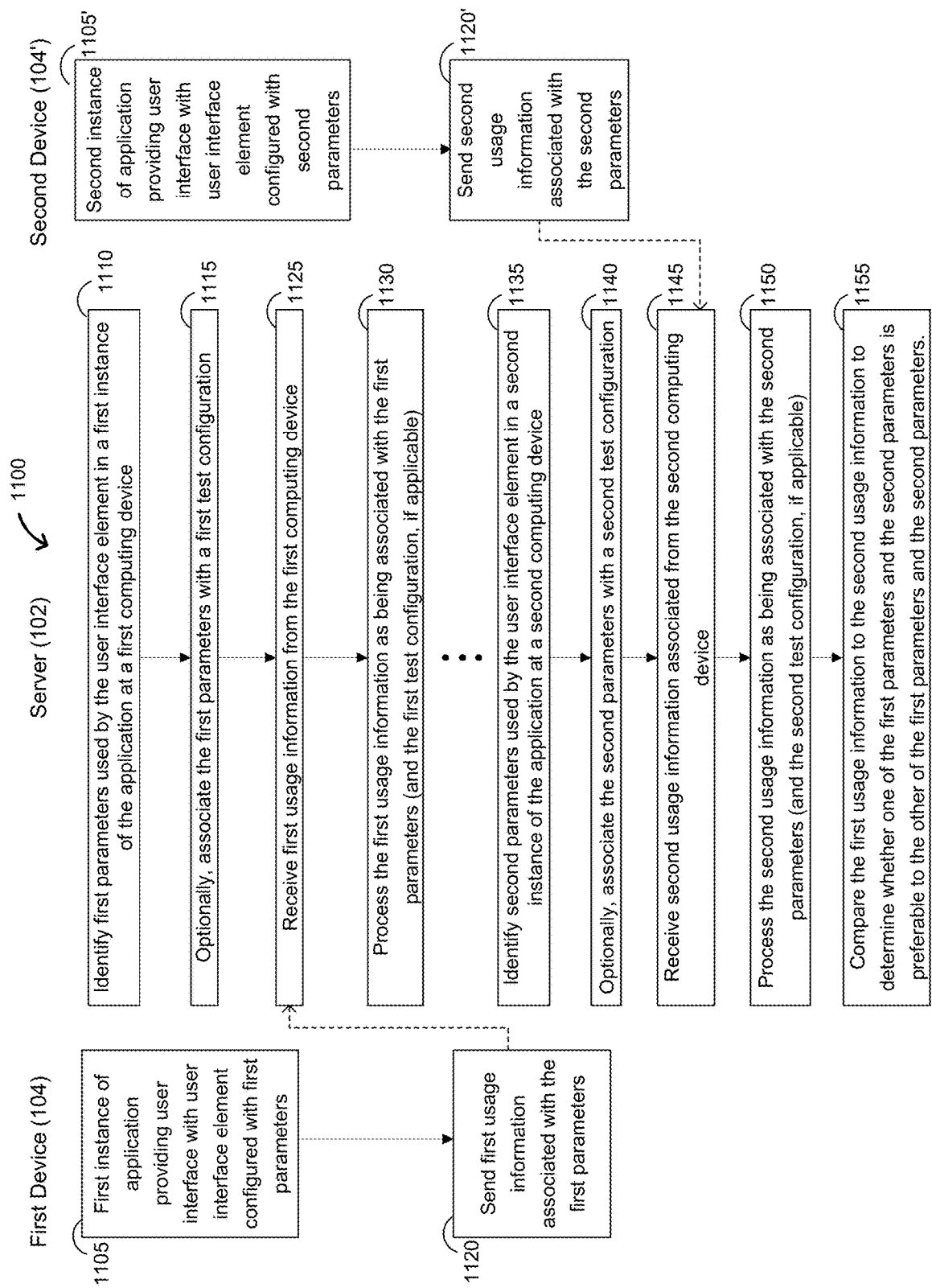
FIG. 11 is a flowchart diagram for processing usage information about a user interface executing on a computing, in accordance with at least one example embodiment.

Referring to FIG. 11, shown there generally as 1100 is a flowchart diagram for processing usage information about a user interface 170 of an application 160 executable on a computing device 104, in accordance with at least one example embodiment. As noted above, in various embodiments, the server 102 may process usage information relating to whether one set of parameters used with a given user interface element 172 is preferable to another set of parameters used with the same user interface element 172. As illustrated, in FIG. 11, the server 102 may perform a number of steps to interact with a first computing device 104 and a second computing device 104'. For ease of illustration, reference will also simultaneously be made to the components shown in FIG. 1.

At step 1105, a first computing device 104 may provide a user interface 170 of the application 160 in which there is a user interface element 172 that is identified by a programming language unit in the program code of the application. For example, the application may be a first instance of an application 160 that is constructed using the SDK 130 provided by the present system 100, such that the user interface elements 172 contained therein are capable of communicating with the development module 120 provided on the server 102.

At step 1110, the server 102 may identify first parameters used by the user interface element 172 in a first instance of the application 160 at a first computing device 104. As discussed above, the first parameters being used by a given user interface element 172 by the application 160 at the first computing device 104 may have been originally inputted at the server 102 by a developer using the developer device 106 and correspondingly, have been transmitted to the computing device 104 from the server 102 (e.g., during an execution of the method of FIG. 2). In various embodiments, prior to transmitting the first parameters to a given computing device 104 for updating the user interface 170 of the application 160 at the first computing device 104, the server 102 may have stored the first parameters (in the UI elements database 124, for example). Thus, in various embodiments, step 1110 may be performed by locating the first parameters that have been transmitted to the computing device 104 stored in the UI elements database 124.

At step 1115, optionally, the server 102 may associate the first parameters with a first test configuration. In various embodiments, a test configuration may be a logical container that the server 102 provides to allow the parameters from multiple user interface elements 172 to be tested at the same time. For example, the user interface 170 being presented on the first computing device 104 may represent a particular test scenario envisioned by a developer, and the developer may want to associate the parameters used in each user interface element 172 of the user interface 170 together so that the usage information that is subsequently received may be analyzed in view of how each of the user interface elements 172 were individually configured.

At step 1120, the first computing device 104 may send first usage information to the server 102. In various embodiments, the usage information transmitted from a given computing device 104, 104' may relate to the overall operation of the application itself. For example, such application-specific usage information may include the number of times the application 160 is activated over a predefined period of time, the day of week or time of day the application 160 is accessed, the duration of time the application 160 is used each time the application 160 is activated, and/or whether certain features of the application are being used more heavily than others.

Additionally or alternatively, the usage information may relate more specifically to the user interface element 172 with which the first parameters is associated. For example, such user interface element-specific usage information may include the number of times a given user interface element 172 is activated (e.g., if the user interface element is a button, the number of times the button is pressed), a timestamp for each time that the user interface element 172 is activated, an amount of time a given user interface element 172 is on screen, an amount of time a user interface element 172 was chosen over another, tracking of scrolling within a user interface element 172 (if applicable), tracking of eye movement within a user interface element 172 (if applicable), and/or a percentage of time the application 160 was exited or paused when a certain user interface element 172 was present on the screen.

Further, the usage information may relate to a group of user interface elements 172. For example, the usage information may indicate a number of times that a particular view (which contains a group of user interface elements 172) has been viewed, a number of times that a particular view has been seen, a duration of time that a given view has been seen, and/or a percentage of time the application 160 was exited or paused when a certain user interface element 172 was present on the screen.

At step 1125, the server 102 may receive the first usage information from the first computing device 104.

At step 1130, the server 102 may process the first usage information as being associated with the first parameters. If the first parameters have been associated with a first test configuration at step 1115, the server 102 may also process the first usage information as being associated with the first test configuration. In various embodiments, the processing of the first usage information at step 1130 may involve storing the first usage information at the server 102.

Additionally or alternatively, the server 102 may transmit the first usage information to an external server (not shown) that provides analytics services. For example, some such analytics services may include Mixpanel™, Flurry™, or Google Analytics™. As will be understood, these analytics services may provide APIs that can be accessed by the server 102 (or an application 160 and/or the computing device 104, as the case may be) so that the server 102 can provide the first usage information to the external services for processing and analysis.

Once the usage information has been processed at the server 102, in various embodiments, various analytics may be performed on the usage information to gain insights about how a given user interface element 172, having being configured with the first parameters, impacts how the given user interface element 172 and/or the application 160 is being used. For example, an association may be made between the first parameters and how often the application 160 is activated and/or the duration of time the application 160 is being used.

Such association may be desirable for a developer to understand how the particular parameters being provided to the user interface elements 172 are impacting end users of their application 160.

In various embodiments, it may be desirable to compare how two different set of parameters for a given user interface element 172 impacts the usage information returned from computing devices 104. Steps 1135 to 1150 describe steps similar steps 1110 to 1130, except that steps 1135 to 1150 are performed in relation to a second computing device 104' that has the user interface element 172 configured with a second set of parameters.

At step 1105', a second computing device 104' may provide a user interface 170 of the application 160 in which there is a user interface element 172 that is identified by a programming language unit in the program code of the application 160. This may be the same application 160 as that which was executing on the first computing device 104.

At step 1135, the server 102 may identify second parameters used by the user interface element 172 in a second instance of the application 160 at a second computing device 104'. This may be performed in a manner as that which was discussed above with respect to step 1110 (e.g., by identifying the second parameters in the UI elements database 124).

At step 1140, the server 102 may, optionally, associate the second parameters with a second test configuration. As discussed above with respect to step 1115, a test configuration may allow the parameters from multiple user interface elements 172 to be tested at the same time. For example, the second test configuration may represent a second version of a user interface 170 for an application 160 that is being tested, in which various user interface elements 172 are configured with parameters which are different from the parameters the user interface elements 172 are configured with under the first test configuration.

At step 1120', the second computing device 104' may then send second usage information to the server 102. This step may be performed in a manner that is analogous to the step 1120 for the first computing device 104.

At step 1145, the server 102 may receive the second usage information from the second computing device 104'.

At step 1150, the server 102 may process the second usage information as being associated with the second parameters. If the second parameters have been associated with a second test configuration at step 1140, the server may also process the second usage information as being associated with the second test configuration.

As in step 1130, this step may involve the second usage information being stored at the server 102. As with step 1130, in various embodiments, the second usage information may also be transmitted to a third-party external analytics service for performing analysis of the second usage information.

At step 1155, the server 102 and/or the external analytics service may compare the first usage information to the second usage information to determine whether one of the first parameters and the second parameters is preferable to the other of the first parameters and the second parameters. As discussed, the present embodiment may allow the usage information to be associated with a given set of parameters that are used with a given user interface element 172 at an application 160 on a computing device 104. As two or more such associations are stored at the server 102, it may be possible to perform analysis on the usage information for each set of parameters to identify whether one set of parameters resulted in more desirable usage information versus another set of parameters.

For example, if one set of parameters configured a user interface element 172 (e.g., a button) to be displayed at the top of the screen and another set of parameters configured the same user interface element 172 to be displayed at the bottom of the screen, usage information that indicates a higher number of activations of the UI element 172 when the second set of parameters are used may indicate that positioning the user interface element 172 at the bottom of the screen may result in higher usage of the user interface element 172.

It will be appreciated that in the embodiments described in FIG. 11, the first parameters and the second parameters may be simultaneously deployed on the first computing device 104 and the second computing device 104' respectively. In this manner, the present embodiments may allow two different versions of a user interface 170 for an application 160 to be tested simultaneously. As will be understood, the term 'A/B testing' is used to describe a testing methodology in which an experiment can be conducted to determine which of two variants, A or B, is preferable. It will be understood that the present embodiments may allow such 'A/B testing' to be performed on the user interfaces 170 of a given application 160 on computing devices 104. While 'A/B testing' is one example type of a testing methodology, it will be understood that the present embodiments may allow the use of other types of testing methodology also.

It will be appreciated that various modifications can be made to the method shown in FIG. 11.

For example, while the above discussion has been with respect to two different computing devices 104, 104' each sending their own usage information for their respective parameters for a given user interface element 172, it will be appreciated that the server 102 may be able to receive the first usage information for the first parameters and the second usage information for the second parameters from the same computing device 104. For example, this may happen if the first computing device 104 which sent the first usage information for the first parameters is subsequently provided with the second parameters from the server 102, and second usage information is then retrieved from the first device 104 afterwards.

Also, as discussed in FIG. 11, the first computing device 104 simply sends the first usage information to the server 102 without having been prompted. However, in various embodiments, it is possible that the first computing device 104 is configured to not send any usage information by default. Instead, the computing device 104 may be configured to only send usage information when it is prompted by the server 102. For example, the server may send, and the computing device 104 may receive, information indicating that the parameters for being used with a given user interface element 172 for an application 160 on the computing device 104 have been associated with a test configuration at the server 102. In response to such information, the computing device 104 may then send the usage information, as is indicated in step 1120. Additionally or alternatively, the computing device 104 may receive user input that activates the functionality for sending the usage information to the server 102, and in response to that input, begin sending the usage information as per step 1120.

As noted above, step 1115 relating to the association of parameters (that are used with a given user interface element 172) with a test configuration is optional, and does not need to be performed. As discussed above, a test configuration provides a logical container for grouping together the parameters from multiple user interface elements 172 so that they can be analyzed together conveniently. However, such grouping may not be necessary, as it may be possible to process the usage information at the server 102 and directly associate them with the various parameters used with user interface elements 172.

Consider, for example, a scenario where the user interface 170 is being updated continuously over time (instead of in well-defined release versions). In such scenario, there may be a large number of different parameters being sent to various user interface elements 172 of the user interface 170 at different points in time over a given time period. If, in the present embodiments, usage information is received throughout the continuous updating process (e.g., before and after each updating of the parameters), it may be possible perform analysis of the usage information to determine how each change to the parameters may have affected the usage information.

In this manner, analytics can be performed on the usage information to gain insights about how historical changes have impacted the usage information, without the need to explicitly associate particular parameters with a test configuration.

As will be understood, the present embodiments allow for a more granular analysis of how usage information is impacted by changes made to particular user interface elements 172 of an application 160. For example, in scenarios where usage information is only associated with particular release versions of a user interface 170, the changes in the usage information may not be attributable specifically to any one change of a given user interface element 172 (e.g., because a large number of changes may have been made to numerous user interface elements 172 as between the two release versions). By receiving and storing usage information on a continuous basis as updates are being made to the user interface elements 172 of the user interface 170 over a period of time, the present embodiments may be able to provide a more granular type of analysis that indicates how a particular modification to a particular user interface element 172 resulted in the changes to the usage information.

In various embodiments, the server 102 may be able to provide recommendations and feedback to a developer for how they may be able to improve their user interface based on the analysis of the usage data. For example, if a certain historical change to a user interface element 172 was made within one view of application 160, and that change had a positive impact on a particular metric that the usage information was measuring (e.g., longer duration of use time), then the server 102 may be able to recommend the same change be made to an analogous user interface element 172 on a different view of the application 160. It will be understood that the recommendations may relate to any parameters of a given user interface element including, without limitation, parameters for defining position on the screen, fonts used, color, button position, and/or preferred style.

Further, while step 1120 and 1120' illustrate the computing devices 104, 104' sending usage information directly to the server 102, in various embodiments where an external third-party analytics service is used, the computing devices 104, 104' may be configured to send the usage information directly to the server that provides the external analytics service. For example, in one example implementation, the code for accessing an API provided by the analytics service may be included in the UI subclasses provided in the SDK 130 so that compiled objects for such subclasses may be configured to communicate directly with the analytics service from a given computing device 104.

Associating User Interface Elements with Themes

As discussed above, the present embodiments may allow a server 102 to send parameters for updating a specific user interface element 172 of a user interface 170 of an application 160 on a computing device 104. As illustrated above with respect to FIGS. 4A-4C, the development module 120 at server 102 may provide a user interface that allows the parameters for each of the user interface elements 172 to be individually updated and deployed to a computing device 104.

While such individual deployment may provide a developer with the flexibility to fine tune the appearance of each user interface element 172 without causing an impact on the remaining user interface elements 172, in certain situations, it may be desirable for the developer to deploy the parameters of a group of user interface elements 172 together.

To allow such group modification, a number of user interface elements 172 may be associated with a group (called a theme, herein).

Figure 12A:
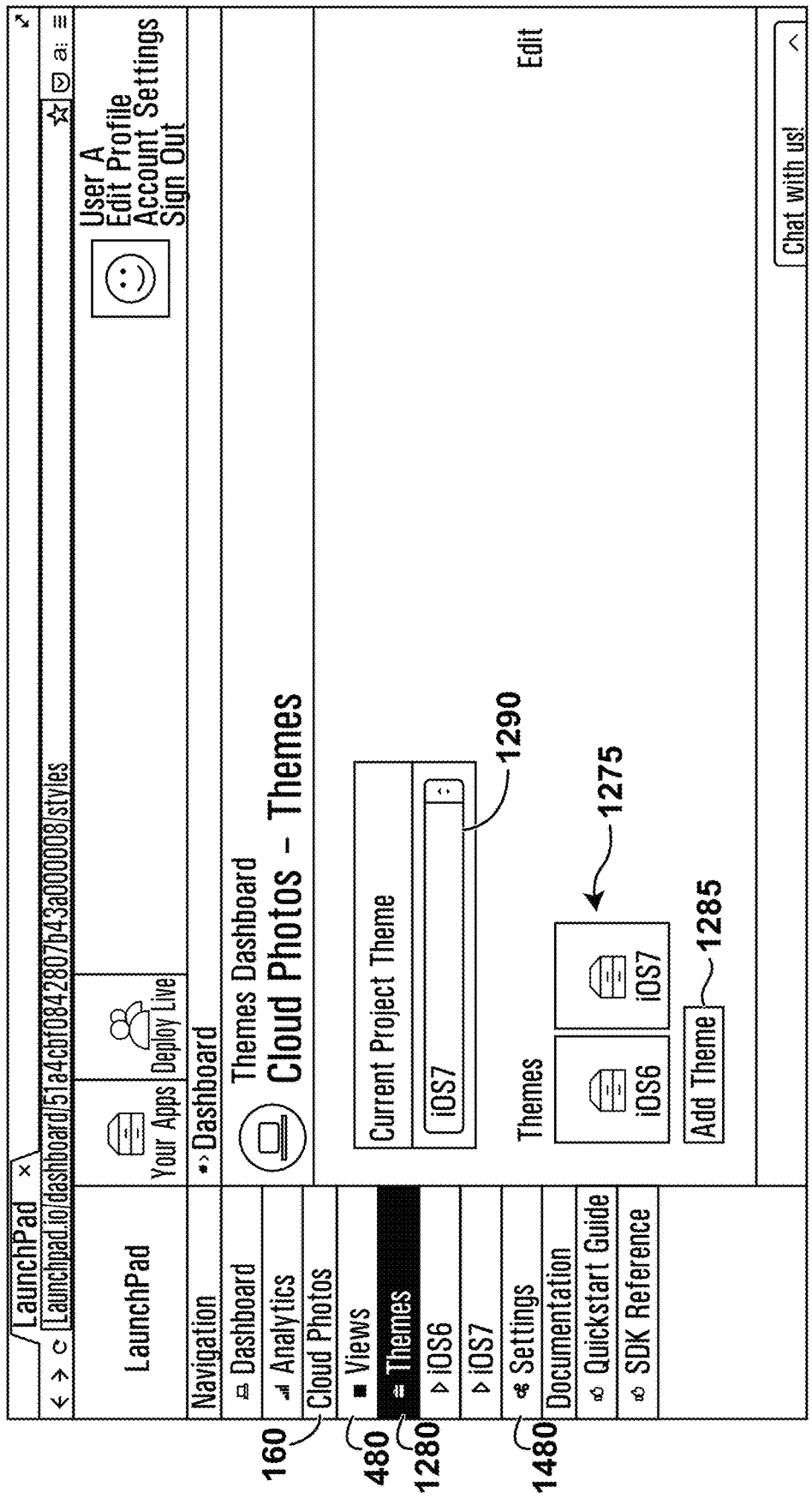
FIGS. 12A and 12B are screenshots of an example user interface in which user interface elements can be associated with a theme, in accordance with at least one example embodiment.
Figure 12B:
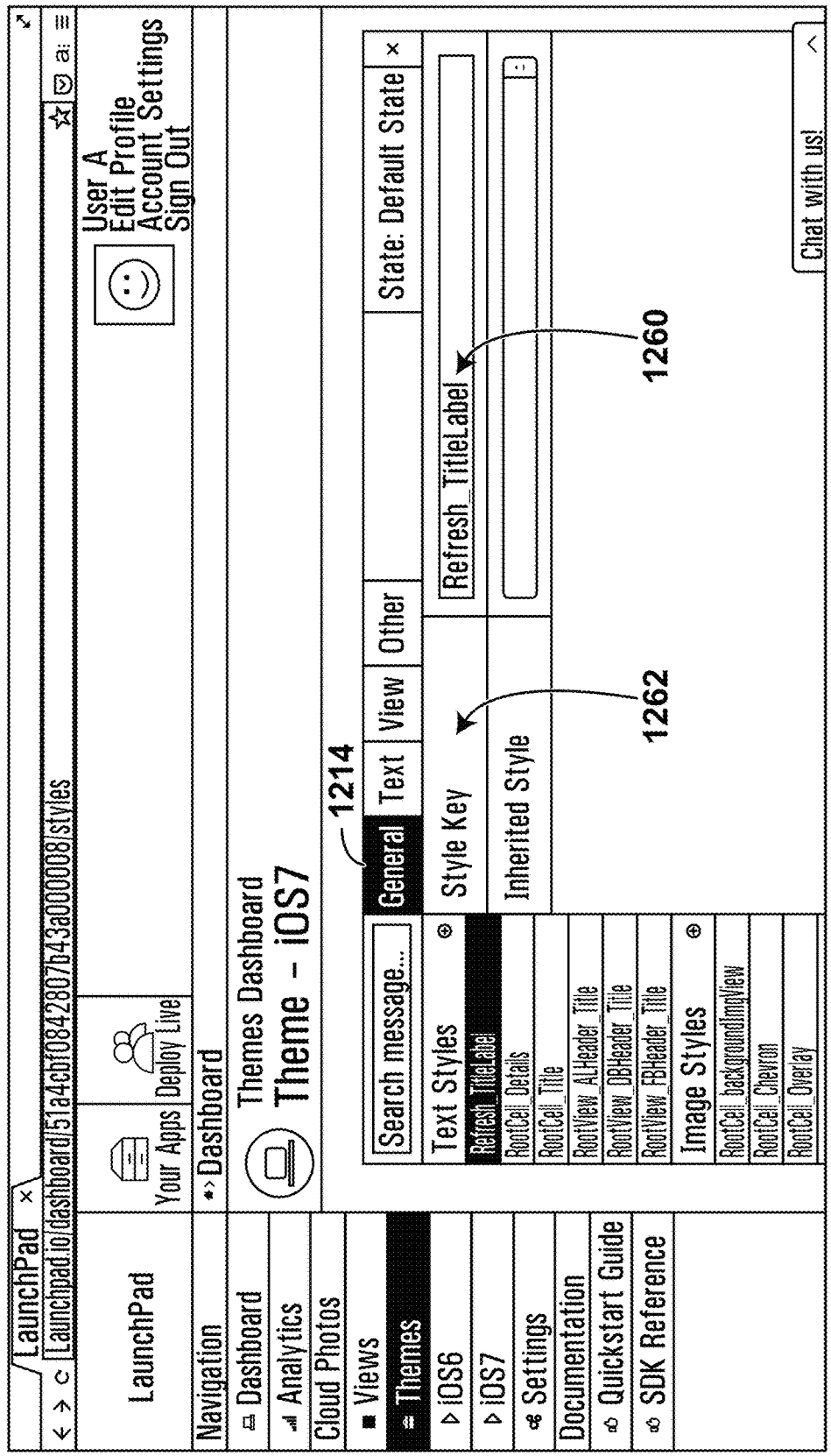

Referring to FIGS. 12A and 12B, shown there generally as 1200 and 1200' are screenshots of an example user interface in which user interface elements 172 can be associated with a theme, in accordance with at least one example embodiment. As will be appreciated, the user interface 1200 is similar to those discussed above with respect to FIGS. 4A-4D, in that there is a pane on the left hand side of the user interface that allows the selection of an application 160 (e.g., as illustrated, the "Cloud Photos" application 160). As shown, there may be a number of options provided for a selected application 160, such as "Views" 480 (discussed above with respect to FIG. 4D), "Themes" 1280, and "Settings" 1480 (which will be discussed below with respect to FIGS. 14A and 14B).

User interface 1200 of FIG. 12A shows an example screenshot where a theme can be created and selected to be modified. As illustrated, two themes 1275 (named "iOS6" and "iOS7") have been already created and can be selected for editing. An option 1285 to add an additional theme 1275 is also provided. Additionally, the user interface 1200 provides a control 1290 that allows selection of one of the available themes as the active or "current" theme. In various embodiments, the selection of a given theme using the control 1290 may cause all the parameters associated with theme to be transmitted to their respective user interface elements 172. In this manner, a developer may be able to deploy parameters for a number of user interface elements 172 at the same time.

Referring now to FIG. 12B, shown there generally as 1200' is a user interface that allows the modification of parameters associated with a user interface element 172 that is associated with a theme 1275. As will be appreciated, the user interface 1200' in FIG. 12B is similar to the user interface shown in FIGS. 4A to 4C, and similar parameters as that which were discussed above with respect to FIGS. 4A to 4C may similarly be entered and stored for a given user interface element 172 in the user interface 1200' of FIG. 12B. Specifically, as illustrated, the general tab 1214 is selected for a user interface element 172 entitled "Refresh_TitleLabel", and a "Style Key" control 1260 may be entered for identifying the user interface element 172. As will be understood, such "Style Key" may serve as similar function to the "Element Key" which was described above with respect to FIG. 4C.

In various embodiments, all of the user interface elements 172 (of a user interface 170 of a given application 160) may be associated with a given theme 1275, and there may be corresponding parameters for each of the user interface elements 172 associated with a theme 1275 so that when the theme 1275 is activated (e.g., selected via control 1290 in FIG. 12A), the entire user interface 170 of the application 160 can be updated to the new theme. In the illustrated example, for example, a theme has been created for the UI design styles associated with two different versions of the iOS™ operating system created by Apple Inc. (e.g., "iOS6" and "iOS7"). When the "iOS7" theme is selected, the various parameters associated with the "iOS7" theme may be sent to their respective user interface elements 172 and the appearance of the application 160 may be uniformly updated. In various embodiments, the theme itself may have parameters associated with it, and such parameters may be modified to indicate that all user interface elements 172 associated with the theme are to have certain properties (e.g., whether the user interface elements 172 are to appear in the "iOS6" or "iOS7" style).

Additionally or alternatively, it may be possible that not all of the user interface elements 172 of a given application 160 need to be associated with a given theme. For example, in various embodiments, different non-overlapping subsets of all the user interface elements 172 of a given application 160 may be associated with different themes, so that multiple themes may be active at any given time.

As discussed above, the user interface elements 172 of a given application 160 may be associated with different types of additional information that may affect the process of updating user interface elements 172 with parameters. For example, FIG. 6 discussed embodiments in which a user interface element 172 may be associated with a development role. Also, FIG. 8 discussed embodiments in which a user interface element 172 may be associated with a setting (e.g., a geographic location setting) that can be satisfied by information from a computing device 104 (e.g., a device geographic location). Further, FIG. 11 discussed the parameters for a user interface element 172 may be associated with a test configuration.

It will be appreciated that in various embodiments, the themes 1275 may be associated with these different types of information (e.g., a development role, a setting, and/or a test configuration), so that the user interface elements 172 associated with the theme can correspondingly be associated with the type of information by virtue of belonging to the theme. This may increase efficiency for a developer by not requiring the developer to individually associate each of the user interface elements 172 of a given application 160 with any one of these types of information.

Figure 13:
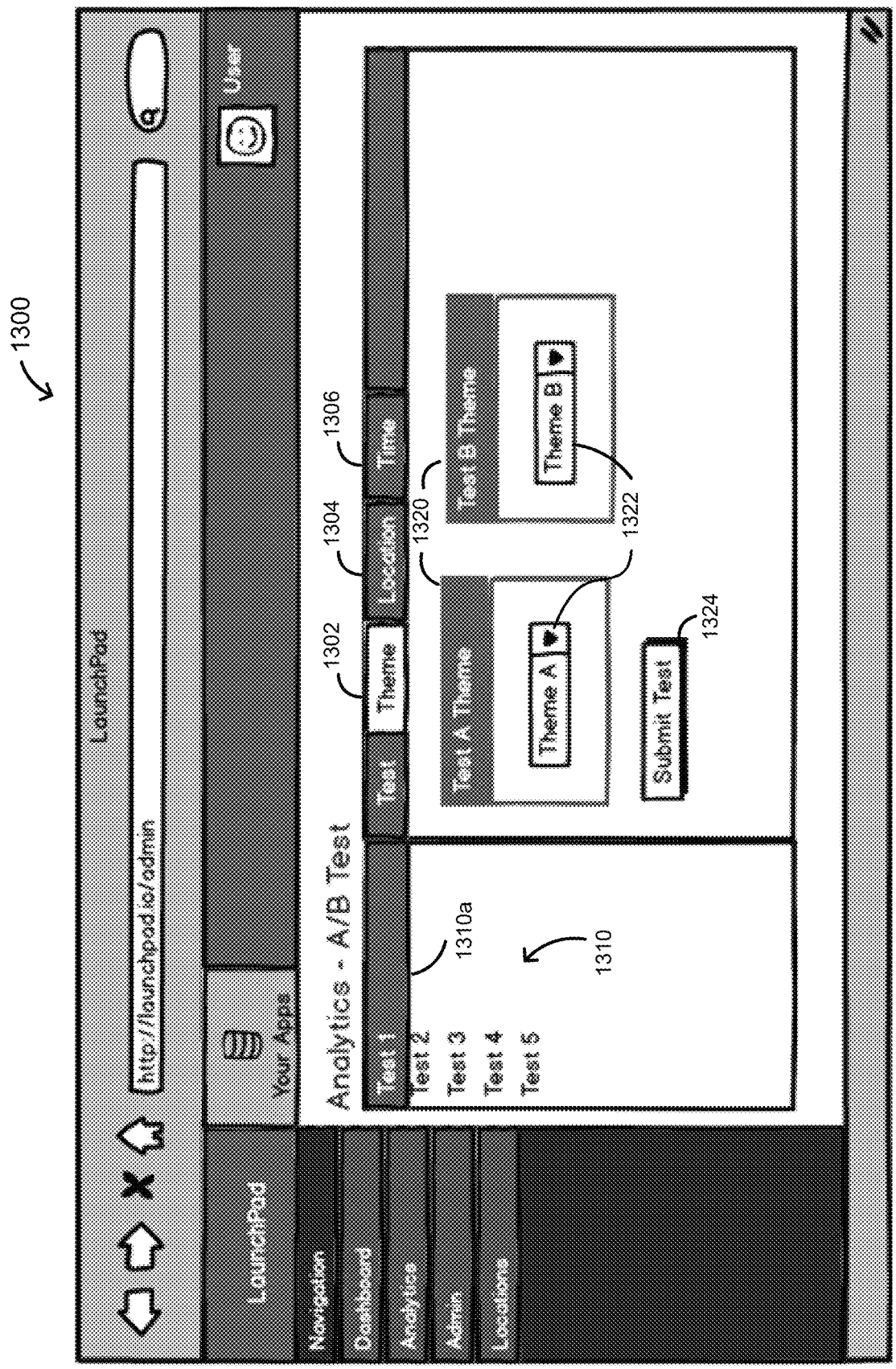
FIG. 13 is a screenshot of an example user interface for associating themes with test configurations, in accordance with at least one example embodiment.

Referring to FIG. 13, shown there generally as 1300 is a screenshot of an example user interface for associating user interface elements 172 of an application 160 executing on a computing device 104 with test configurations, in accordance with at least one example embodiment. The user interface 1300 may provide a pane that allows a number of different experiments or testing scenarios 1310 to be selected (e.g., the illustrated example names the experiments as "Test 1", "Test 2", and so forth). As shown, the test configuration "Test 1" 1310a is selected.

For a given selected test configuration 1310, a number of different tabs may be provided that allow the details of the experiment to be modified. For example, as discussed above, it may be possible to associate the parameters used with a given user interface element 172 with a given test configuration. However, as shown, it may also be possible to associate a particular theme with a test configuration for the purposes of conducting an 'A/B test'. Particularly, as shown, the tab 1302 is selected and test configuration controls 1320 are provided for identifying the theme that is to be associated with a given test configuration (e.g., as shown, there are two test configurations, a 'Test A Theme' test configuration and a 'Test B Theme' test configuration). In the illustrated example, Theme A' and Theme B' are selected in respective controls 1322 to be the respective test configurations, such that the two themes are to be compared against each other. The user interface 1300 further provides a button 1324 that allows the test configuration to be submitted once the test configuration has been decided (e.g., so that the usage information can start to be collected from the computing devices 104).

In various embodiments, the server 102 may be able to provide options to use the geographic location settings discussed above with respect to FIG. 8 in conjunction with the test configurations discussed above with respect to FIG. 11. For example, in FIG. 13, for a selected experiment 1310a, an additional tab 1304 may be provided that allows a developer to select geographic locations settings for each test configuration. For example, using these features in combination, it may be possible to indicate that the 'Test A Theme' test configuration is to be associated with a given geographic location setting that specifies a given city, and that the 'Test B Theme' test configuration is to be associated with another geographic location setting that specifies another city. In this way, the 'Theme A' parameters would be provided to user interface elements 172 on computing devices 104 in the city specified by the first geographic location setting, and the 'Theme B' parameters would be provided to user interface elements 172 on computing devices 104 in the city specified by the second geographic location setting.

In further embodiments, yet another tab 1306 may be provided that allows time settings to be associated with a given test configuration. For example, if such tab 1306 is selected, controls may be provided that allows a given test configuration (e.g. 'Test A Theme' and/or 'Test B Theme') to be additionally or alternatively associated to be associated with a time of day. This may allow the appearance of the user interface 170 to be updated with the certain parameters and/or theme at the particular time of day indicated by the timed setting. This may be desirable, for example, if certain test configurations are desired to be deployed during a certain time of day when there may be fewer users of the application 160 (e.g., if the test configuration contains updates that may be controversial, and it is desired to test such updates out on the small number of users who may use the application 160 in the middle of the night).

It will be understood that the type of information that may be associated with the themes and/or parameters for user interface elements 172 can be combined in various ways. For example, in yet another scenario, the geographic location settings, timed settings, social and demographic settings may be mix and matched to have parameters for user interfaces 172 and/or themes that match specific combinations or sub-combinations of these various settings.

For example, in the user interface of FIG. 13, it may be possible to design an experiment 1310 where a test configuration is only activated for a given geographic location setting, a given time of day, and for a certain demographic (e.g., in the city of 'Chicago' from 12 am to 5 am for males between the ages of 25-33), or just the location setting and a given time of day (e.g., in the city of 'Los Angeles' during prime television viewing hours between 6 pm and 9 pm), or just for geographic location setting alone (e.g., just in the city of 'Chicago') or just for the timed setting alone (e.g., just from 12 am to 5 am).

Additional Aspects of the Application Development System

Various other additional aspects of the system 100 of FIG. 1 will now be described.

Figure 14A:
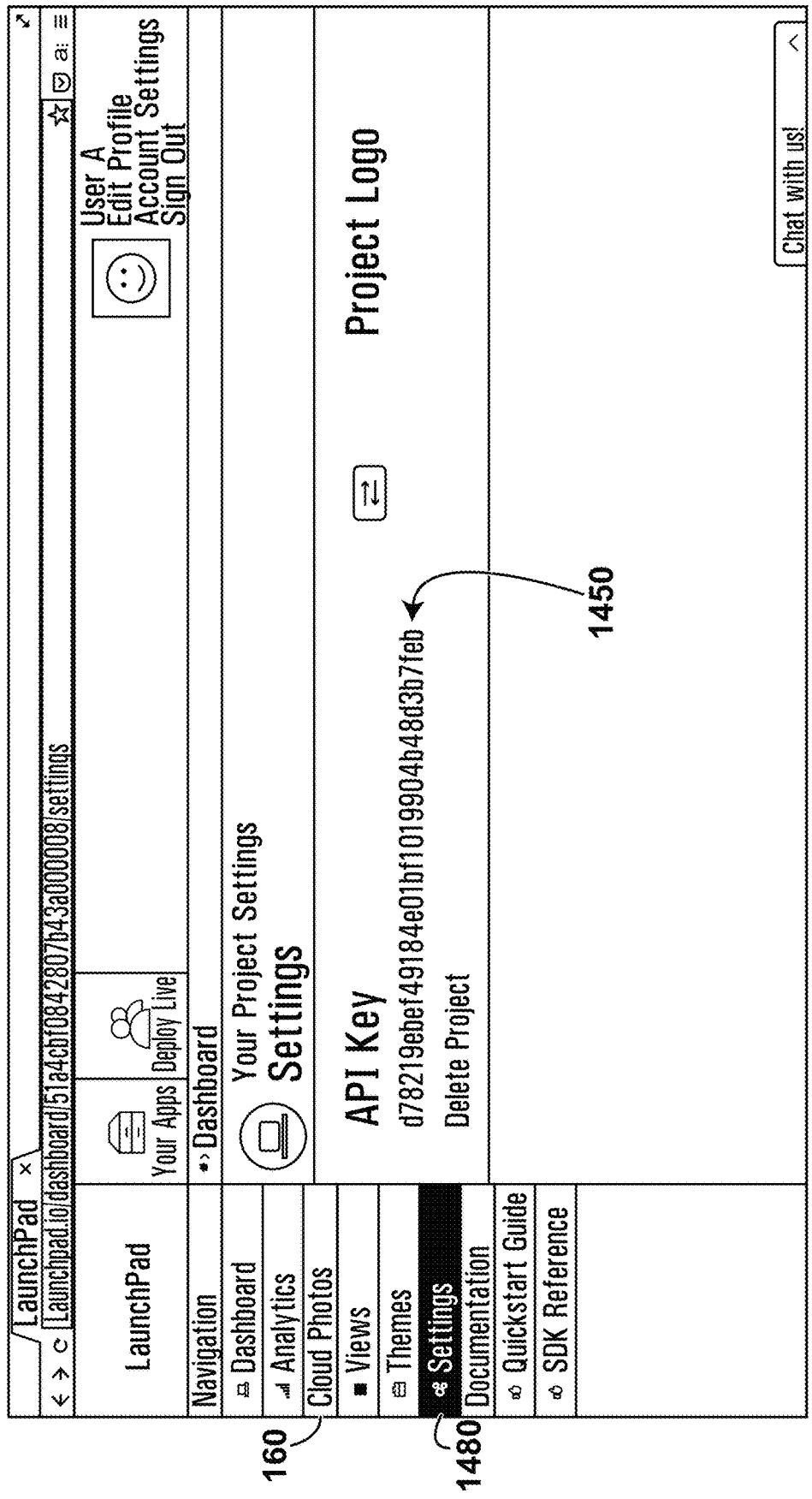
FIGS. 14A and 14B are screenshots of example user interfaces for viewing and modifying settings associated with an application, in accordance with at least one example embodiment.
Figure 14B:
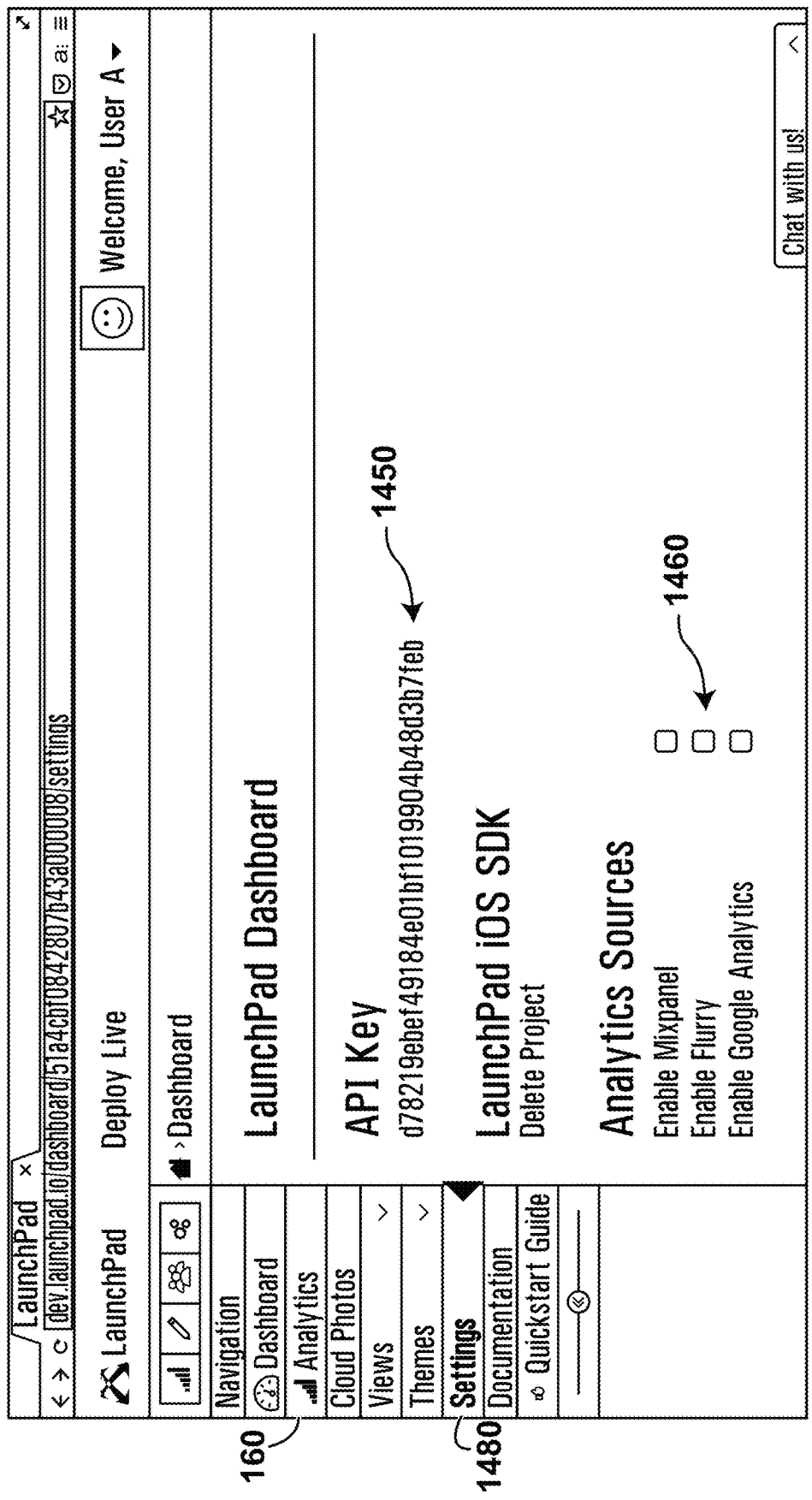

Referring to FIGS. 14A and 14B, shown there generally as 1400 and 1400' respectively are screenshots of example user interfaces for viewing and modifying settings associated with an application 160, in accordance with at least one example embodiment. Referring first to FIG. 14A, shown there is a further screenshot that may be provided by the development module 120 of FIG. 1. The user interface 1400 is similar to the ones discussed earlier with respect to FIGS. 4A-4C and 12A-12B, except that in FIG. 14A, the "Settings" option 1480 is selected for the example application 160 called "Cloud Photos". As shown, the "Settings" user interface may display the API key 1450 that is used to initiate communication between a developer device 106 and the server 102, and ensure the security of the communications between the server 102 and the application 160 on the computing device 104.

Referring now to FIG. 14B, shown there generally as 1400' is a screenshot for a "Settings" option screen that is generally analogous to the one shown in FIG. 14A except that user interface has been updated with a different visual style. As illustrated, the "Settings" option 1480 for the "Cloud Photos" application 160 is again shown, and the API key 1450 similarly shown.

Additionally, FIG. 14B shows an additional section 1460 which allows a developer to select the external analytics engine (called the "Analytical Sources" in FIG. 14B) that the server can interact with. As mentioned above, it may be possible to configure the server 102 and/or user interface elements 172 to provide the usage information that is generated at an application 160 to an external analytics engine. As illustrated, the section 1160 provides a number of different boxes that allows some named external third party analytics engine to be used. Without limitation, the example analytics engines that can be selected include Mixpanel™, Flurry™, and Google™ Analytics™.

In various embodiments, a developer may be required to provide his user identity prior to being provided access to the development module 120 to update an application 160 (e.g., as may be required for identifying a development role that the user identity is associated with in the context of the method of FIG. 6). Referring now to FIGS. 15A and 15B, shown there generally as 1500 and 1500' respectively are screenshots of example sign-in use interfaces for signing into the system for developing an application, in accordance with at least one example embodiment. As will be understood, usernames may be used to identify a given user identity and passwords may be used to authenticate a given user.

Figure 16A:
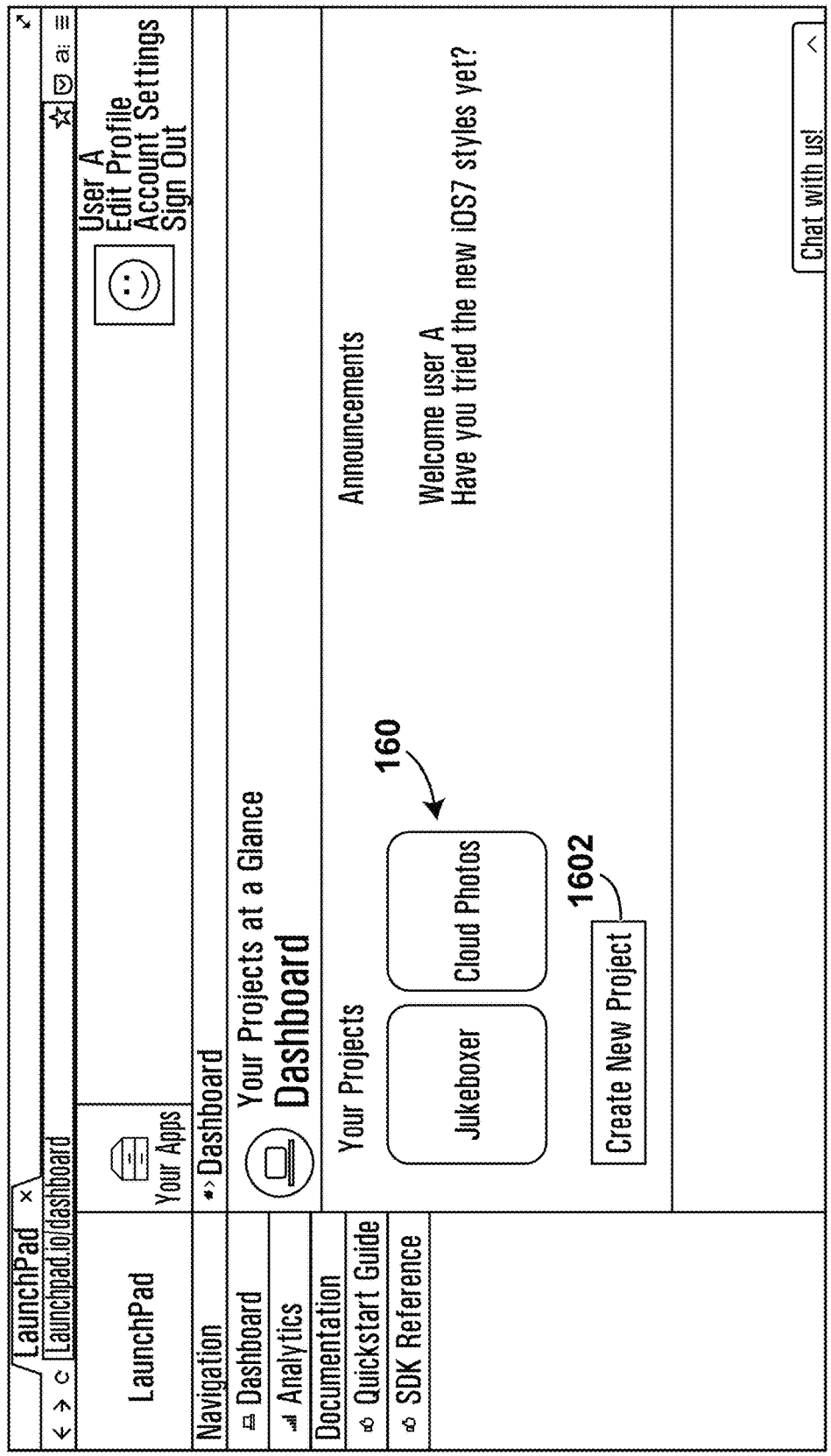
FIGS. 16A and 16B are screenshots of example dashboard user interfaces, in accordance with at least one example embodiment.
Figure 16B:
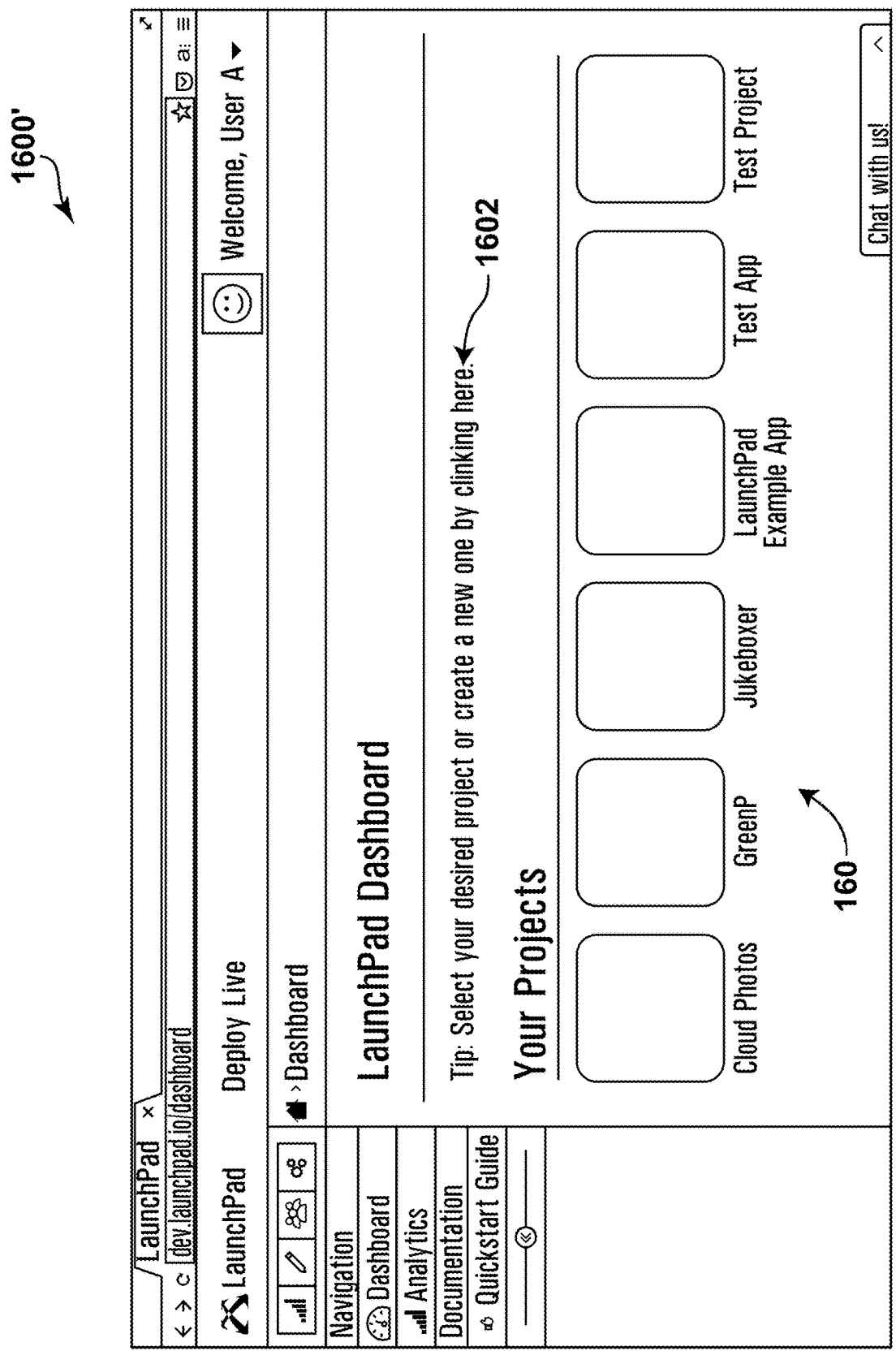

Referring now to FIGS. 16A and 16B are screenshots 1600 and 1600' of example dashboard user interfaces that may be provided by the server 102, in accordance with at least one example embodiment. In various embodiments, once a user has logged in, and prior to selecting a given application 160 to update, they may be presented with a "dashboard" user interface that allows them to select the applications 160 they would like to work on. In the illustrated example, there are two applications "Jukeboxer" and "Cloud Photos" that can be selected for modification. If, for example, the "Cloud Photos" application 160 is selected, user interfaces similar to that which has been discussed above for updating the user interface elements 172 of an application may be provided. The user interface may also include a control 1602 which, when selected, allows the creation of a new project at the server 102. As used herein, the term "project" relates to a particular application 160 executable on a computing device 104 that may be updatable from the server 102.

Referring now to FIG. 16B, shown there generally as 1600' is another example of a "dashboard" user interface that may be shown after a developer logs into the server 102. The user interface 1600' is generally analogous to the user interface shown in FIG. 16A, except that various visual styles have been updated. Specifically, a number of applications 160 may still be selected for modification, and a control 1602 is provided for creating a new project.

Figure 17:
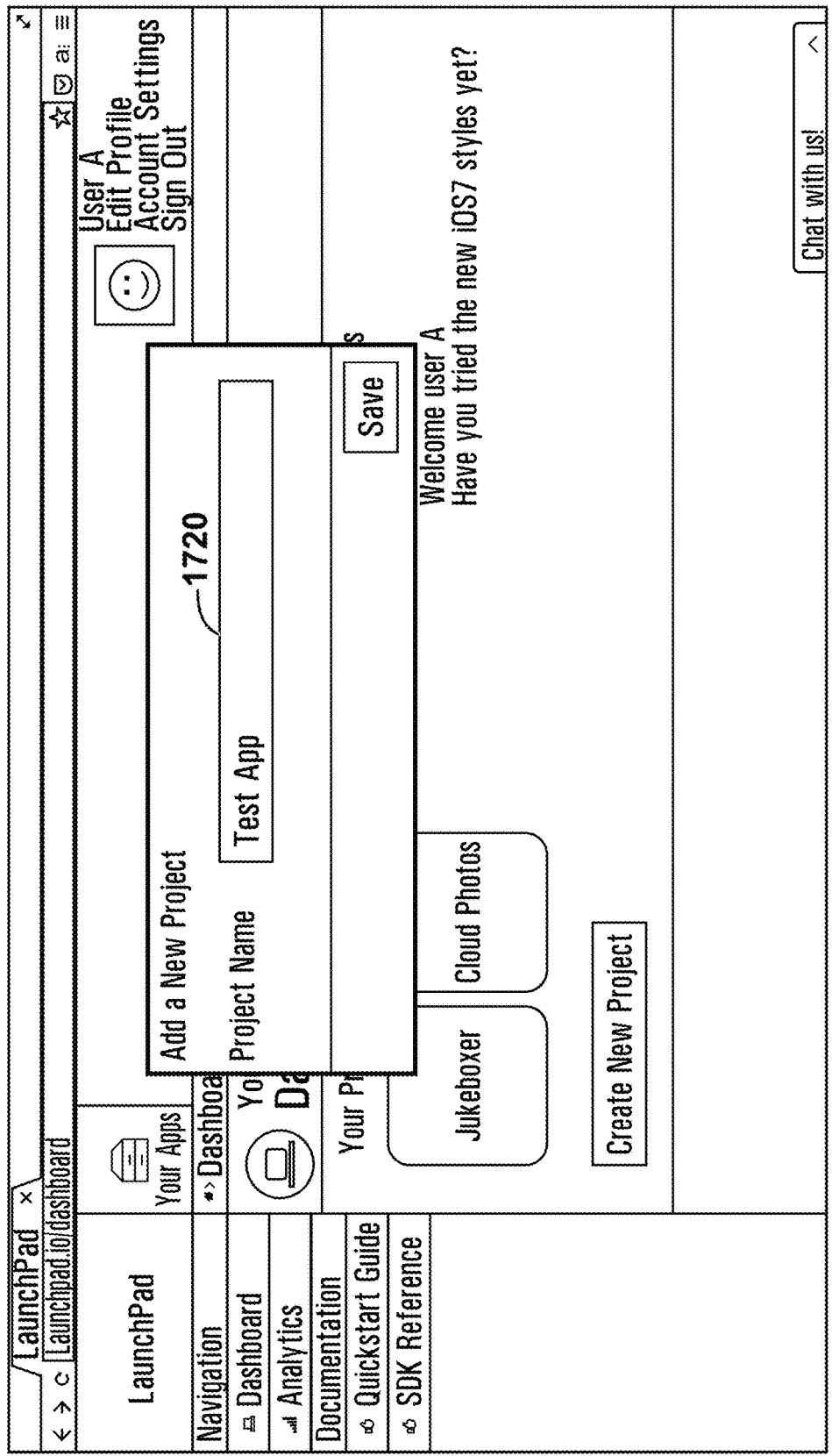
FIG. 17 is a screenshot of an example user interface for adding a new project, in accordance with at least one example embodiment.

Referring to FIG. 17, shown there generally as 1700 is a screenshot of an example user interface for adding a new project, in accordance with at least one example embodiment. For example, the user interface of FIG. 17 may be displayed when the "Create New Project" button 1602 is activated on the user interface of FIG. 16A. As shown, the user interface 1700 may provide a text field 1720 that allows the name of a given application that is to be controlled to be entered.

Figure 18A:
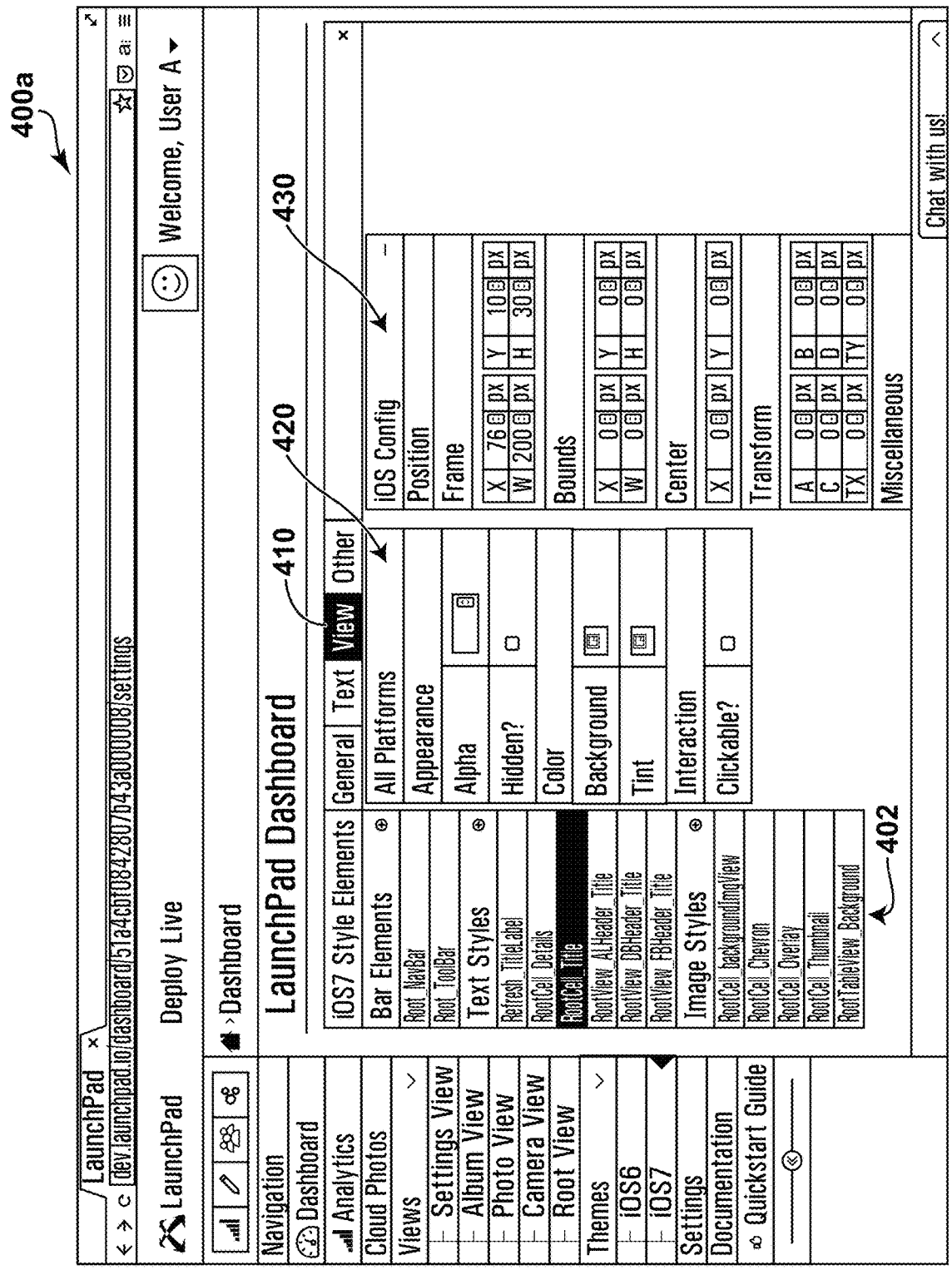
FIGS. 18A-18D are additional screenshots of an example user interface for updating user interface elements for an application executable on the computing device, in accordance with at least one example embodiment.
Figure 18B:
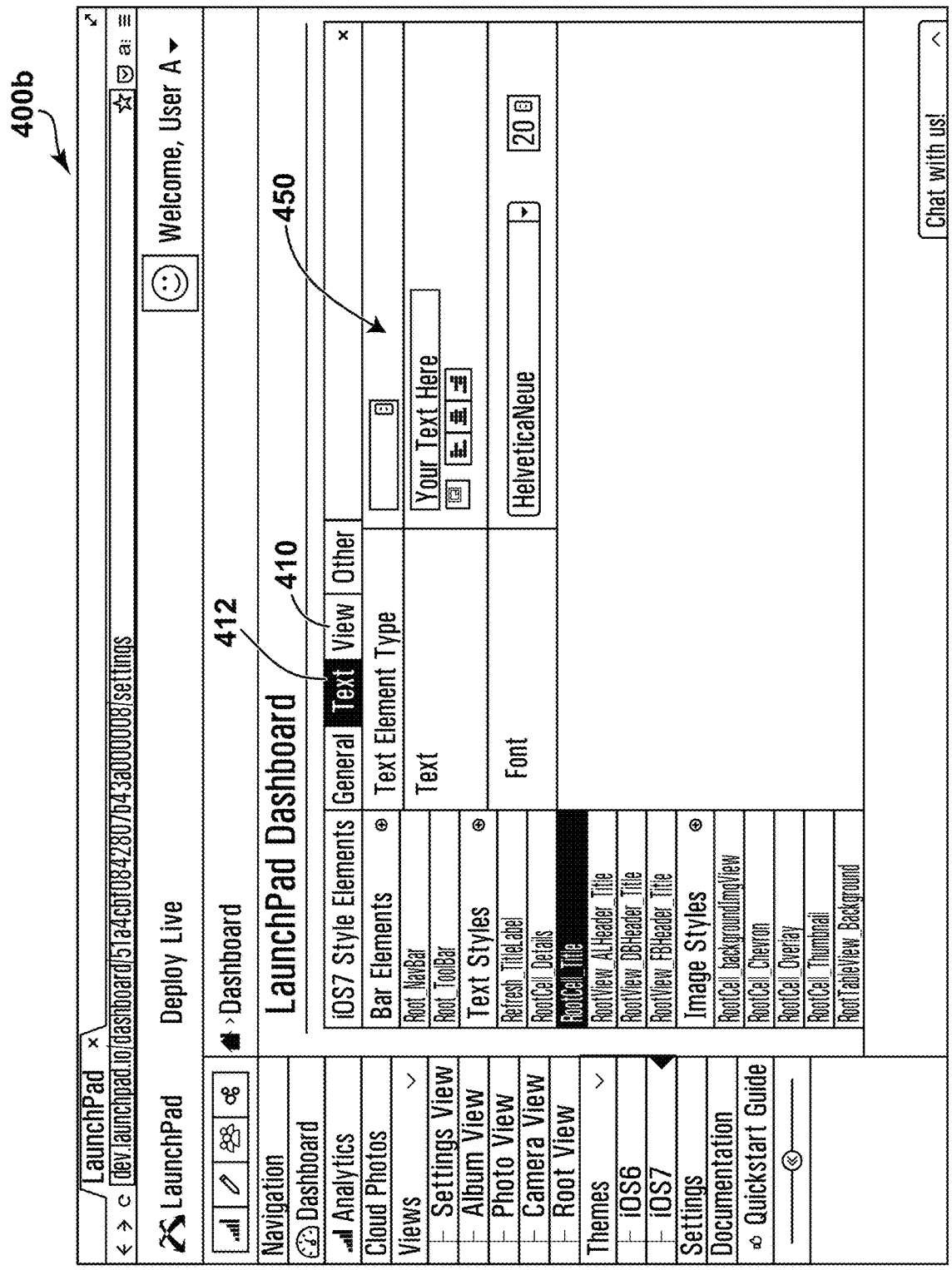
Figure 18C:
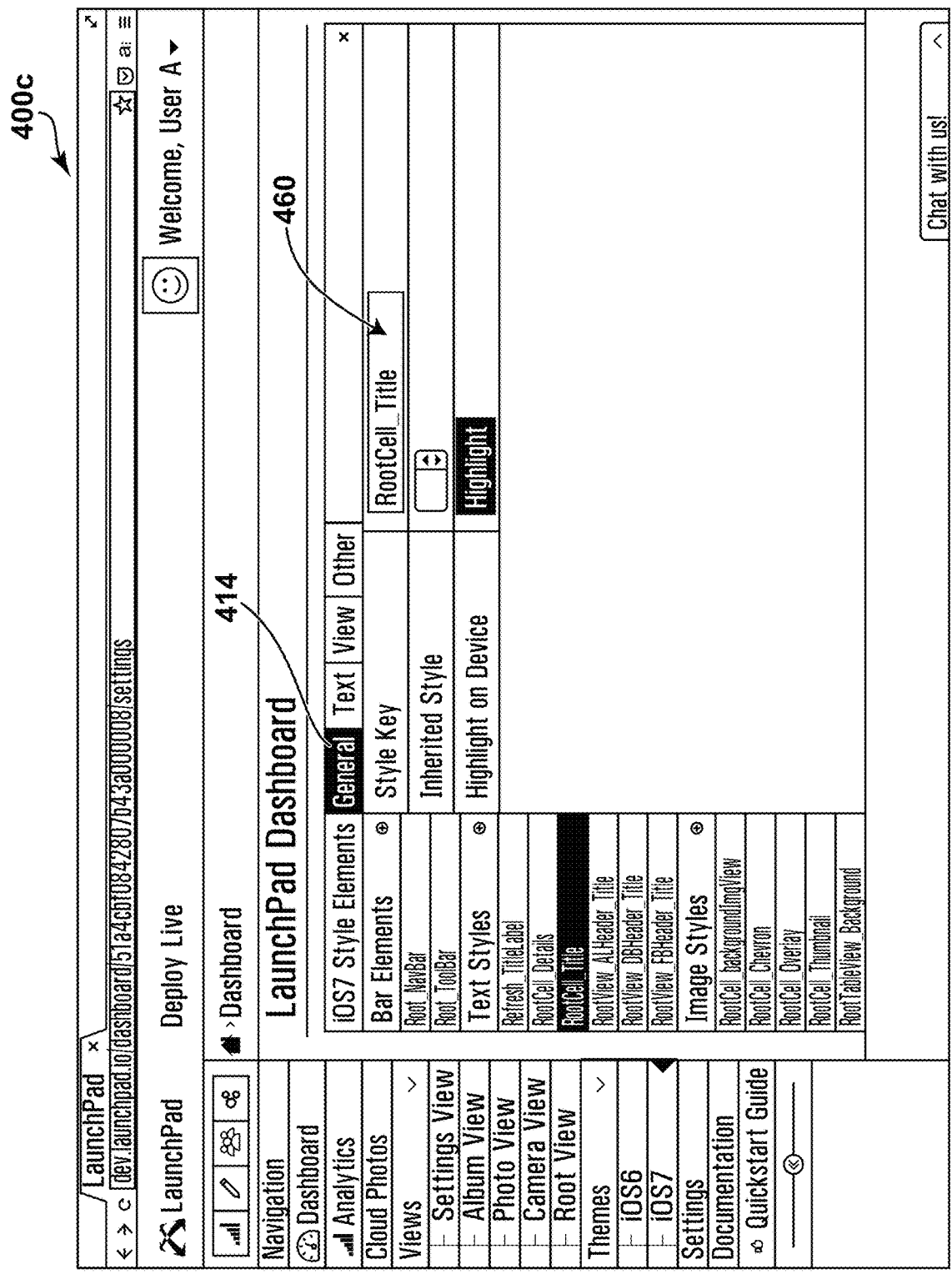
Figure 18D:
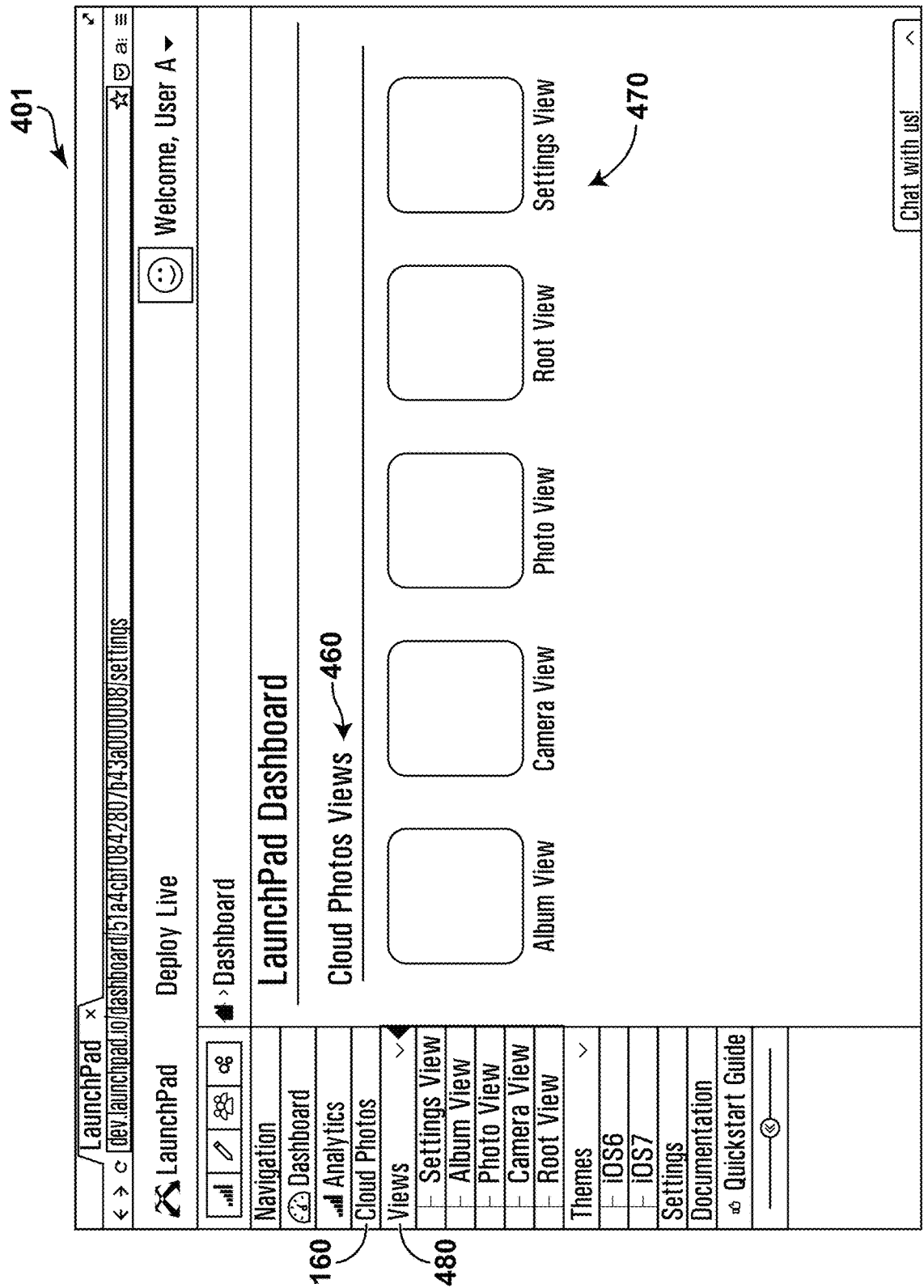

Referring to FIGS. 18A-18D, shown there are additional screenshots of an example user interface for updating user interface elements for an application executing on the computing device, in accordance with at least one example embodiment. FIGS. 18-18D are generally analogous to the user interfaces shown in FIGS. 4A-4D in that they show user interfaces that allow parameters associated with a selected user interface element 172 of an application 160 to be updated. The differences between FIGS. 18A-18D and FIGS. 4A-4D are that FIGS. 18A to 18D have been modified to show a different visual style. Accordingly, the reader is referred to the discussion above with respect to FIGS. 4A-4D for a description of how the corresponding user interfaces in FIGS. 18A-18D respectively may operate. It is noted that the same reference numerals that are used in FIGS. 4A-4D are also used in FIGS. 18A-18D to refer to analogous components.

Figure 19A:
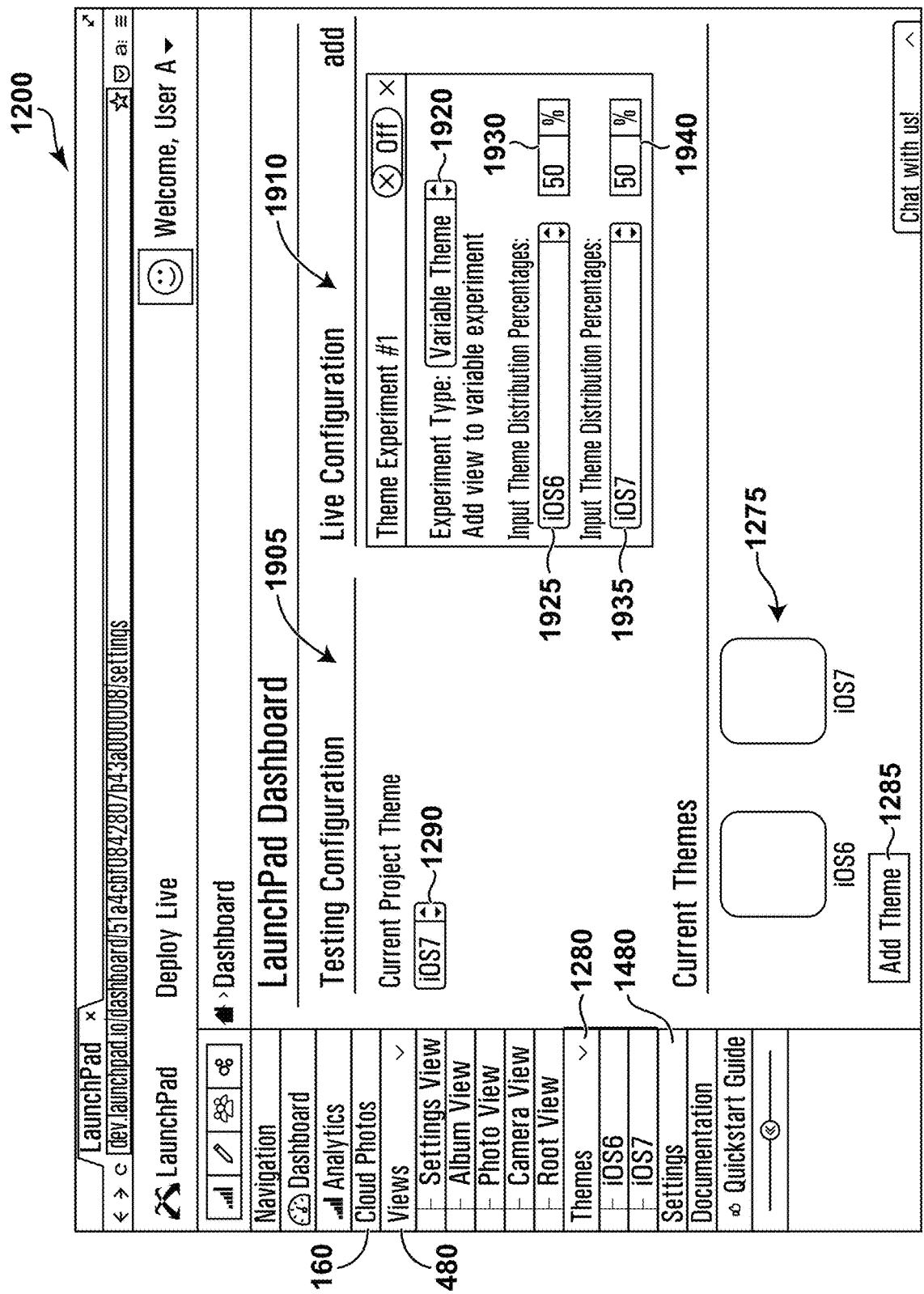
FIGS. 19A and 19B are additional screenshots of an example user interface in which user interface elements can be associated with a theme, in accordance with at least one example embodiment.
Figure 19B:
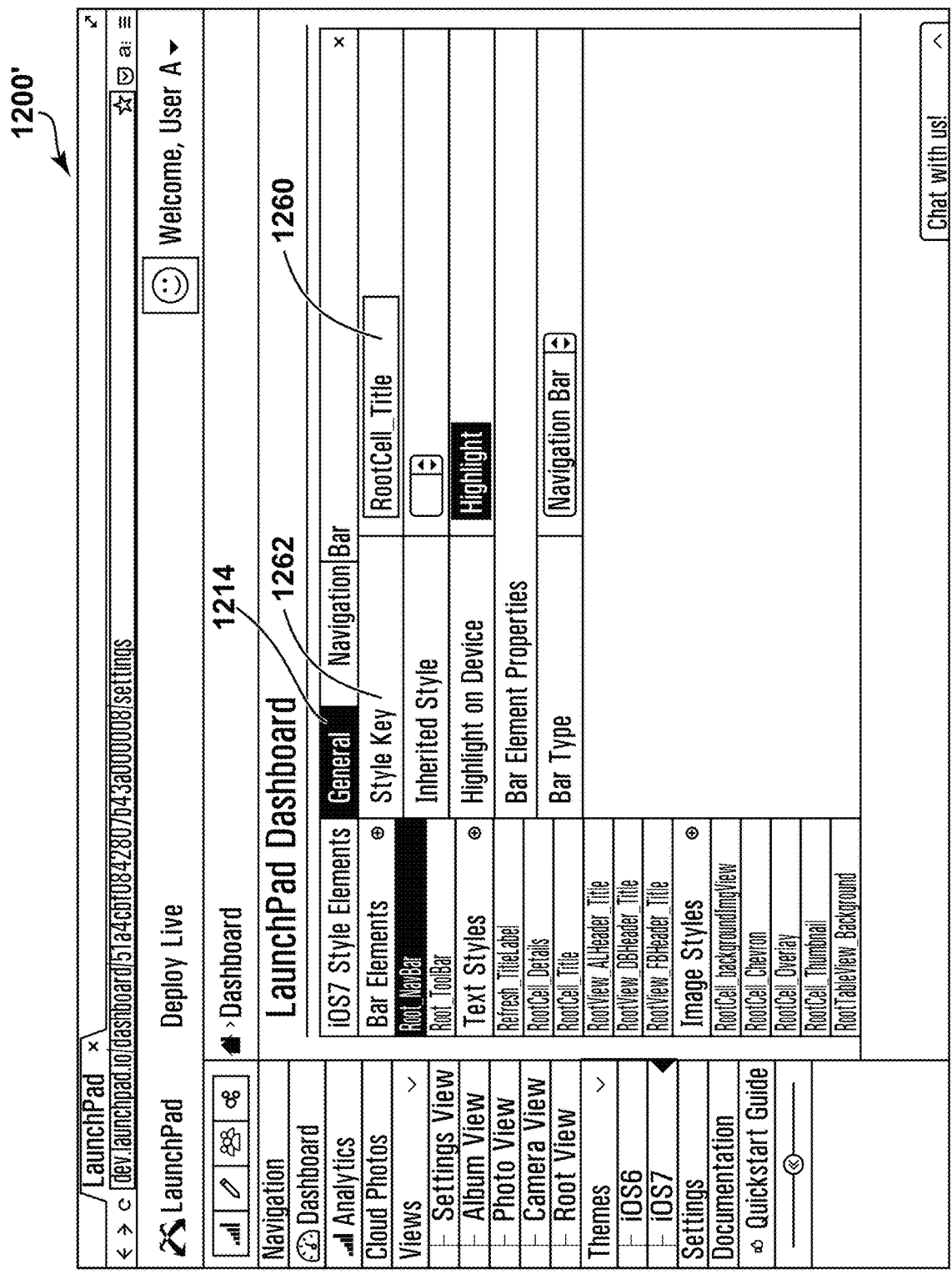

Referring to FIGS. 19A and 19B, shown there generally as 1200 and 1200' respectively are additional screenshots of an example user interface in which user interface elements 172 can be associated with a theme, in accordance with at least one example embodiment. FIGS. 19A and 19B are generally analogous to the user interfaces shown in FIGS. 12A and 12B, except that certain visual styles have been updated. In particular, the same reference numerals that are used in FIGS. 12A-12B are also used in FIGS. 19A-19B to refer to analogous components, and the reader is referred to the discussion above with respect to FIGS. 12A-12B for a description of how the corresponding user interfaces in FIGS. 19A-19B respectively may operate.

Referring specifically to FIG. 19A, the user interface 1200, in addition to allowing the selection of themes, integrates controls that allows themes to be associated with various test configurations. In various embodiments, these controls may be provided additionally or alternatively to the controls discussed above with respect to FIG. 13. As shown, a test configuration entitled "Testing Configuration" 1905 is shown which allows the selection of one of the "iOS6" or the "iOS7" themes to be associated with it. Additionally, FIG. 19A shows another more complex test configuration entitled "Live Configuration" 1910 which allows a percentage of the computing devices 104 which have been deployed with the application 160 to be configured with one theme, and another percentage of the computing devices 104 which have been deployed with the application 160 to be configured with another theme. Specifically, as shown, a control 1920 is provided that allows selection of the experiment type (e.g., shown as "Variable Theme"). Once selected, additional controls may be provided. For example, as shown, controls 1925, 1935 may be provided that allow selection of the themes, as well as the corresponding percentages of computing devices 104 that are to be configured with the theme (e.g., controls 1930, 1940 allow such percentages to be entered).

In some embodiments, user interface elements, such as those associated with themes, for an application executing on the computing device are updated using the techniques of method swizzling or view hierarchy observing. In such embodiments, setting or controlling properties for UI element identifiers, e.g. style keys, as used in FIGS. 12B, 18C and 19B for example, is not required. Instead, method swizzling or view hierarchy observing allows the developer to replace or exchange existing implementation of the UI element with another by, for example, adding a new UI element class or replacing an existing UI element class during runtime.

As used herein the term "programmer", "developer", or "software developer" will generally refer to the same type of users; i.e., creators of applications 160 for execution on a computing device 104.

The present invention has been described here by way of example only. Various modification and variations may be made to these exemplary embodiments without departing from the spirit and scope of the invention, which is limited only by the appended claims.

For example, other variations of the systems and methods described above will be apparent to those in the art and as such are considered to be within the scope of the subject matter described herein. For example, it should be understood that acts and the order of the acts performed in the processing described herein may be altered, modified and/or augmented yet still achieve the desired outcome.

In particular, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting with regards to their appearance. Other suitable ways of arranging and modifying the appearance of user interface elements may be possible.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

We claim:

1. A method of remotely modifying a user interface displayed through an application operating on a plurality of computing devices, the method to be performed at a server that is remote from the computing devices, the method comprising:
    identifying a first set of parameters corresponding to at least one user interface element of the user interface, wherein each user interface element of the at least one user interface element is identified at the server by a programming language unit for the user interface element;
    identifying a second set of parameters corresponding to the at least one user interface element of the user interface;
    receiving first parameter set usage data from at least one first computing device in the plurality of computing devices;
    associating the first parameter set usage data with the first set of parameters;
    receiving second parameter set usage data from at least one second computing device in the plurality of computing devices;
    associating the second parameter set usage data with the second set of parameters;
    determining first parameters set usage metrics and second parameter set usage metrics by analyzing the received first parameter set usage data and second parameter usage data, respectively;
    determining a preferred set of parameters corresponding to the at least one user interface element by comparing the first parameter set usage metrics and the second parameter set usage metrics;
    determining a recommended set of parameters corresponding to modified user interface elements based on the preferred set of parameters; and
    sending the recommended set of parameters to a recommended group of computing devices from the plurality of computing devices.

2. The method of claim 1, wherein each computing device in the recommended group of computing devices:
    updates the at least one user interface element displayed by the application on that computing device using the recommended set of parameters; and
    displays a modified user interface through the application, the modified user interface comprising the modified user interface elements as defined by the recommended set of parameters.

3. The method of claim 1, wherein each of the first and second usage data comprise at least one of: the number of times the application was activated over a predefined period of time on a computing device, days of week application was accessed on the computing device, times of day application is accessed on the computing device, duration of time application is used each time application is activated or extent of use of application features.

4. The method of claim 1, wherein the first usage data comprises element-specific usage data associated with the at least one user interface element corresponding to the first set of parameters.

5. The method of claim 1, wherein the second usage data comprises element-specific usage data associated with one or more user interface elements corresponding to the second set of parameters.

6. The method of claim 1, wherein prior to receiving the first parameter set usage data, the method further comprises:
    sending the first set of parameters to at least one first computing device in the plurality of computing devices by determining that information corresponding to each first computing device satisfies a first parameter setting.

7. The method of claim 6, wherein sending the sending the first set of parameters to the at least one first computing device causes each first computing device in the at least one first computing device to:
    update the at least one user interface element displayed by the application on that first computing device using the first set of parameters; and
    display a modified first user interface through the application, the modified first user interface comprising the at least one user interface element as defined by the first set of parameters.

8. The method of claim 1, wherein prior to receiving the second parameter set usage data, the method further comprises:
    sending the second set of parameters to at least one second computing device in the plurality of computing devices by determining that information corresponding to each second computing device satisfies a second parameter setting.

9. The method of claim 8, wherein sending the sending the second set of parameters to the at least one second computing device causes each second computing device in the at least one second computing device to:
    update the at least one user interface element displayed by the application on that second computing device using the second set of parameters; and
    display a modified second user interface through the application, the modified second user interface comprising the at least one user interface element as defined by the second set of parameters.

10. The method of claim 1, wherein:
    the application is deployed on each computing device and comprises executable code corresponding to the programming language unit for the at least one user interface element; and
    the parameters are received by the executable code.

11. A system for remotely modifying a user interface displayed through an application operating on a plurality of computing devices, the system comprising:
    the plurality of computing devices;
    a server comprising a server processor and a server memory storing instructions which, when executed by the server processor, cause the server processor to:
        identify a first set of parameters corresponding to at least one user interface element of the user interface, wherein each user interface element of the at least one user interface element is identified at the server by a programming language unit for the user interface element;
        identify a second set of parameters corresponding to the at least one user interface element of the user interface;
        receive first parameter set usage data from at least one first computing device in the plurality of computing devices;
        associate the first parameter set usage data with the first set of parameters;

receive second parameter set usage data from at least one second computing device in the plurality of computing devices;

associate the second parameter set usage data with the second set of parameters;

determine first parameters set usage metrics and second parameter set usage metrics by analyzing the received first parameter set usage data and second parameter usage data, respectively;

determine a preferred set of parameters corresponding to the at least one user interface element by comparing the first parameter set usage metrics and the second parameter set usage metrics; and determine a recommended set of parameters corresponding to at least one additional user interface element based on the preferred set of parameters;

send the recommended set of parameters to a recommended group of computing devices from the plurality of computing devices.

12. The system of claim 11, wherein each computing device in the recommended group of computing devices comprises a device processor and a device memory storing instruction, which when executed by the device processor, cause the device processor to:

update the at least one user interface element displayed by the application on that computing device using the recommended set of parameters; and display a modified user interface through the application, the modified user interface comprising the modified user interface elements as defined by the recommended set of parameters.

13. The system of claim 11, wherein each of the first and second usage data comprise at least one of: number of times the application is activated over a predefined period of time on a computing device, day of week application is accessed on the computing device, time of day application is accessed on the computing device, duration of time application is used each time application is activated or extent of use of application features.

14. The system of claim 11, wherein the first usage data comprises element-specific usage data associated with the at least one user interface element corresponding to the first set of parameters.

15. The system of claim 11, wherein the second usage data comprises element-specific usage data associated with one or more user interface elements corresponding to the second set of parameters.

16. The system of claim 11, wherein prior to receiving the first parameter set usage data, the method further comprises:

sending the first set of parameters to at least one first computing device in the plurality of computing devices by determining that information corresponding to each first computing device satisfies a first parameter setting.

17. The system of claim 16, wherein each computing device in the at least one first computing device comprises a device processor and a device memory storing instruction, which when executed by the device processor, cause the device processor to:

update the at least one user interface element displayed by the application on that first computing device using the first set of parameters; and display a modified first user interface through the application, the modified first user interface comprising the at least one user interface element as defined by the first set of parameters.

18. The system of claim 11, wherein prior to receiving the second parameter set usage data, the method further comprises:

sending the second set of parameters to at least one second computing device in the plurality of computing devices by determining that information corresponding to each second computing device satisfies a second parameter setting.

19. The system of claim 18, wherein each computing device in the at least one second computing device comprises a device processor and a device memory storing instruction, which when executed by the device processor, cause the device processor to:

update the at least one user interface element displayed by the application on that second computing device using the second set of parameters; and display a modified second user interface through the application, the modified second user interface comprising the at least one user interface element as defined by the second set of parameters.

20. The system of claim 11, wherein:

the application is deployed on each computing device and comprises executable code corresponding to the programming language unit for the at least one user interface element; and the parameters are received by the executable code.

* * * * *